US012473310B2

(12) United States Patent
Jones et al.

(10) Patent No.: US 12,473,310 B2
(45) Date of Patent: Nov. 18, 2025

(54) VITAMIN D3 PHOSPHATE AND PHARMACEUTICALLY ACCEPTABLE SALTS THEREOF, PHARMACEUTICAL COMPOSITIONS COMPRISING THE COMPOUND AND METHODS FOR PREPARING THE COMPOUND

(71) Applicant: King's College London, London (GB)

(72) Inventors: Stuart Allen Jones, London (GB); Makiko Kawashita, London (GB)

(73) Assignee: King's College London, London (GB)

( * ) Notice: Subject to any disclaimer, the term of this patent is extended or adjusted under 35 U.S.C. 154(b) by 215 days.

(21) Appl. No.: 18/031,836

(22) PCT Filed: Oct. 20, 2021

(86) PCT No.: PCT/GB2021/052702
§ 371 (c)(1),
(2) Date: Apr. 13, 2023

(87) PCT Pub. No.: WO2022/084669
PCT Pub. Date: Apr. 28, 2022

(65) Prior Publication Data
US 2024/0116959 A1 Apr. 11, 2024

(30) Foreign Application Priority Data
Oct. 20, 2020 (GB) ...................... 2016614

(51) Int. Cl.
C07F 9/09 (2006.01)
(52) U.S. Cl.
CPC .................... C07F 9/095 (2013.01)
(58) Field of Classification Search
CPC ...................................... C07F 9/095
USPC .......................................... 558/87
See application file for complete search history.

(56) References Cited

U.S. PATENT DOCUMENTS

| | | |
|---|---|---|
| 2,296,291 A | 9/1942 | Milas |
| 3,993,675 A | 11/1976 | Uskokovic et al. |
| 4,021,423 A | 5/1977 | Baggliolini et al. |
| 4,201,881 A | 5/1980 | DeLuca et al. |
| 4,264,512 A | 4/1981 | Okamura et al. |
| 4,517,125 A | 5/1985 | Takayama et al. |
| 4,632,784 A | 12/1986 | Baggiolini et al. |
| 4,804,502 A | 2/1989 | Baggiolini et al. |
| 5,342,833 A | 8/1994 | Doran et al. |
| 5,389,622 A | 2/1995 | Posner et al. |
| 5,478,816 A | 12/1995 | Shah |
| 5,583,125 A | 12/1996 | Steinmeyer et al. |
| 5,691,328 A | 11/1997 | Peterson et al. |
| 5,789,607 A | 8/1998 | Okabe |
| 6,372,731 B1 | 4/2002 | Kirsch et al. |
| 6,376,480 B1 | 4/2002 | Kirsch et al. |
| 6,531,459 B1 | 3/2003 | Steinmeyer et al. |
| 6,982,257 B1 | 1/2006 | Takayama et al. |
| 7,071,344 B1 | 7/2006 | Steinmeyer et al. |
| 2002/0049344 A1 | 4/2002 | Steinmeyer et al. |
| 2003/0166622 A1 | 9/2003 | Steinmeyer et al. |
| 2005/0032754 A1 | 2/2005 | Takayama et al. |
| 2005/0113349 A1 | 5/2005 | Takayama et al. |
| 2007/0093448 A1 | 4/2007 | Westermann et al. |
| 2007/0299041 A1 | 12/2007 | Gombart et al. |

FOREIGN PATENT DOCUMENTS

| | | |
|---|---|---|
| AU | 4605101 A | 7/2001 |
| CA | 1206882 A | 2/1986 |
| CA | 2539359 A1 | 3/2005 |
| CN | 105859770 A | 8/2016 |
| CN | 107 674 091 | 2/2018 |
| CN | 107661503 A | 2/2018 |
| CN | 107674091 A | 2/2018 |
| CN | 107759636 A | 3/2018 |
| CN | 108003191 A | 8/2018 |
| CN | 109456244 A | 3/2019 |
| CN | 110143979 A | 8/2019 |
| EP | 0191489 A2 | 8/1976 |
| EP | 0055999 A2 | 7/1982 |
| EP | 0094644 A1 | 11/1983 |
| EP | 0115266 A2 | 8/1984 |
| EP | 0207451 A2 | 1/1987 |
| EP | 0312360 A2 | 4/1989 |
| EP | 0387808 A2 | 3/1990 |
| EP | 0529528 A2 | 3/1993 |
| EP | 0603726 A2 | 6/1994 |
| EP | 1047671 A1 | 11/2000 |
| EP | 2025667 A1 | 2/2009 |
| JP | S 58116479 A | 7/1983 |

(Continued)

OTHER PUBLICATIONS

Werner, Egon, "Cholesterol phosphoric acid ester and intermediates in its transformation to vitamin D3 phosphoric acid ester as substrates of alkaline phosphatases," *Hoppe-Seyler's Journal of Physiological Chemistry*, 311 (1): 0018-4888, 178-184 (1958) (English machine translation).

Werner, Egon, "Cholesterin-phosphorsäureester und seine Umwandlungsprodukte zum Vitamin D3-phosphorsäureester als Substrate alkalischer Phosphatasen," *Hoppe-Seyler's Zeitschrift für Physiologische Chemie*, 311 (1): 0018-4888, 178-184 (1958).

International Search Report and Written Opinion issued for International Application No. PCT/GB2021/052702 on Feb. 2, 2022.

Rapi et al., "Steroid Phosphates and Polyphosphates. Part III. Synthesis and Structure of 7-Dehydrocholesterol and Vitamin D3-Phosphoric Esters and Their Salts and Dimethyl Phosphates," *Journal of Chemical Research*, No. 9, pp. 2372-2390, 1982.

Alkilani, et al., "Transdermal drug delivery: innovative pharmaceutical developments based on disruption of the barrier properties of the stratum corneum," *Pharmaceutics*, 7(4), 438-470 (2015).

(Continued)

*Primary Examiner* — Kristin A Vajda
(74) *Attorney, Agent, or Firm* — Klarquist Sparkman, LLP

(57) ABSTRACT

Disclosed is the compound vitamin $D_3$ phosphate and pharmaceutically acceptable salts thereof, pharmaceutical compositions comprising the compound and methods for preparing the compound. Also disclosed are methods of treating vitamin D deficiency using the compound. The compound is particularly suitable for transdermal delivery.

6 Claims, 21 Drawing Sheets

(56) References Cited

FOREIGN PATENT DOCUMENTS

| | | |
|---|---|---|
| JP | H 06341980 A | 12/1994 |
| JP | H 08325226 A | 12/1996 |
| JP | H 10139711 A | 5/1998 |
| JP | H 10158171 A | 6/1998 |
| NZ | 201702 A | 8/1985 |
| PL | 192708 B1 | 12/2006 |
| WO | WO 9630338 A1 | 10/1996 |
| WO | WO 9851678 A1 | 11/1998 |
| WO | WO 0140177 A2 | 6/2001 |
| WO | WO 2006/133506 | 12/2006 |
| WO | WO2006/133506 A1 | 12/2006 |
| WO | WO 2013162047 A1 | 10/2013 |

OTHER PUBLICATIONS

Alsaqr, et al., "Investigating Transdermal Delivery of Vitamin D$_3$," *AAPS PharmSciTech*, vol. 16, No. 4, Aug. 2015.

Bendas, et al., "Influence of propylene glycol as cosolvent on mechanisms of drug transport from hydrogels," *International journal of pharmaceutics*, 116(1), 19-30 (1995).

Bernardo and Saraiva, "A theoretical model for transdermal drug delivery from emulsions and its dependence upon formulation," *Journal of pharmaceutical sciences*, 97(9), 3781-3809 (2008).

Boonen, et al., "Calcium and vitamin D in the prevention and treatment of osteoporosis—a clinical update," *J Intern Med*, 259(6):539-52 (2006).

Bubshait, et al., "Topical vitamin D3: A randomized controlled trial (RCT)," *Clinical Nutrition ESPEN* 27 (2018) 16e19.

Chen, et al., "Phosphorus oxychloride as an efficient coupling reagent for the synthesis of esters, amides and peptides under mild conditions," *RSC advances*, 3(37), pp. 16247-16250 (2013).

Christakos et al., "Vitamin D: Metabolism, Molecular Mechanism of Action, and Pleiotropic Effects", *Physiol Rev* 96: 365-408, 2016.

Crauste, et al., "Insights into the soluble PEG-supported synthesis of cytosine-containing nucleoside 5'-mono-, di-, and triphosphates," *The Journal of organic chemistry*, 74(23), pp. 9165-9172 (2009).

Domon, et al., "Catalytic Chemoselective O-Phosphorylation of Alcohols," *ACS central science*, 6(2), pp. 283-292 (2020).

Fakhree et al., "The importance of dielectric constant for drug solubility prediction in binary solvent mixtures: electrolytes and zwitterions in water+ ethanol," *Aaps Pharmscitech*, 11(4), 1726-1729 (2010).

Galesanu and Mocanu, "Vitamin D deficiency and the clinical consequences," 2015; 119(2): 310-8.

Garg, et al., "Evaluation of vitamin D medicines and dietary supplements and the physiochemical analysis of selected formulations," *The journal of nutrition, health and aging*, 2012; 17(20): 158-161.

Gupta, et al., "Recent Advances in Formulation Strategies for Efficient Delivery of Vitamin D.," *AAPS PharmSciTech*, 20 (1), 11 (2019).

Holick, "Vitamin D deficiency," *New England Journal of Medicine*, 2007; 357(3): 266-81.

Huseini, et al., "Gastrointestinal symptoms in morbid obesity," *Frontiers in medicine*, 1, 49 (2014).

Illy, et al., "Phosphorylation of bio-based compounds: the state of the art," *Polymer Chemistry*, 6(35), pp. 6257-6291 (2015).

Inacio, "An investigation into the influence of local barometric stress upon xenobiotic percutaneous penetration," King's College London, PhD thesis (2016).

Johnson and Widlanski, "Overview of the synthesis of nucleoside phosphates and polyphosphates," *Current protocols in nucleic acid chemistry*, 15(1), pp. 13-1 (2003).

Kubota-Ishida, et al., "In vitro human onychopharmacokinetic and pharmacodynamic analyses of ME1111, a new topical agent for onychomycosis," *Antimicrobial agents and chemotherapy*, 62(1), e00779-17 (2018).

Mccourt, et al., "Efficacy and safety of food fortification to improve vitamin D intakes of older adults," *Nutrition*, 75-76, 110767 (2020).

Milas et al., "Some salts of the phosphoric ester of vitamin d3", *J. Am. Chem. Soc.* 1955, 77, 6, 1640-1643.

Nair and Maseeh, :Vitamin D: The "sunshine" vitamin, *Journal of Pharmacology and Pharmacotherapeutics*, 2012; 3(2): 118-126.

Norman, Cholecalciferol, Encyclopedia of Food Sciences and Nutrition 2nd edition, 1213-1220 (2003).

Padavan, et al., "Synthesis, characterization and in vitro cell compatibility study of a poly (amic acid) graft/cross-linked poly (vinyl alcohol) hydrogel," *Acta biomaterialia*, 7(1), pp. 258-267 (2011).

Prausnitz and Langer, "Transdermal drug delivery," *Nature biotechnology*, 26(11), 1261-1268 (2008).

Sakakura, et al., "Selective synthesis of phosphate monoesters by dehydrative condensation of phosphoric acid and alcohols promoted by nucleophilic bases," *Organic letters*, 7(10), pp. 1999-2002 (2005).

Saurabh et al., "Is Transdermal Multivitamin Patch Effective in Grastric Bypass Patients?" Obesity Surgery (2019) 29:3818-3823.

Shah, et al., "Misleading measures in Vitamin D analysis: A novel LC-MS/MS assay to account for epimers and isobars," *Nutritional Journal*, 2011; 10(1).

Taylor and Davies, "A review of the growing risk of vitamin D toxicity from inappropriate practice," *Br J Clin Pharmacol* (2018) 84 1121-1127 1121.

Unson, et al., "Adherence to calcium/vitamin D and estrogen protocols among diverse older participants enrolled in a clinical trial," *Contemporary clinical trials*, 27(3), 215-26 (2006).

Van Herk, "Bacterial class A acid phosphatases as versatile tools in organic synthesis," Faculty of Science, Institutional Repository of the University of Amsterdam, pp. 1-94 (2008).

Vitamin D Council, "How do I get the vitamin D my body needs?" [online] Available at: https://www.vitamindcouncil.org/about-vitamin-d/how-do-i-get-the-vitamin-d-my-body-needs/ [Accessed Oct. 15, 2018].

Wang, et al., "Vitamin D and Chronic Diseases," *Aging and Disease* vol. 8, 3 346-353 (2017).

Yakhimovich et al., "Synthesis of vitamin D3 esters", *Pharmaceutical Chemistry Journal* vol. 25, pp. 661-664 (1991).

Zetterstrom, "Phosphorylation of Vitamin D2, and the Action of the Phosphorylated Compound on Alkaline Kidney Phosphatase," Nature vol. 167, pp. 409-410 (1951).

Zhang, et al., "Measurement of protein metabolism in epidermis and dermis," *American physiological society*, 286 (6), E1191-E1201 (2003).

| Batch | TLC | Rf value | Yield |
|---|---|---|---|
| 1 |  | Cholecalciferol: 0.77<br><br>Final product: 0.00 | 1.6718 g (3.287 mmol)<br><br>84.26 % |
| 2 |  | Cholecalciferol: 0.73<br><br>Final product: 0.00 | 1.2995 g (2.555 mmol)<br><br>65.16 % |
| 3 |  | Cholecalciferol: 0.73<br><br>Final product: 0.00 | 1.3208 g (2.597 mmol)<br><br>66.36 % |

| Concentration of VDP acid (w/w %) | 2.07 | 5.02 | 7.34 | 9.56 |
|---|---|---|---|---|
| | | | | |
| Concentration of VDP disodium salt (w/w %) | 7.69 | 13.57 | 17.24 | 23.81 |
| | | | | |

Figure 10

VITAMIN D3 PHOSPHATE AND PHARMACEUTICALLY ACCEPTABLE SALTS THEREOF, PHARMACEUTICAL COMPOSITIONS COMPRISING THE COMPOUND AND METHODS FOR PREPARING THE COMPOUND

CROSS REFERENCE TO RELATED APPLICATIONS

This is the U.S. National Stage of International Application No. PCT/GB2021/052702, filed Oct. 20, 2021, which was published in English under PCT Article 21(2), which in turn claims the benefit of GB Application No. 2016614.6, filed Oct. 20, 2020, which is incorporated herein in its entirety.

This invention relates to vitamin $D_3$ phosphate (cholecalciferol phosphate), and a process for preparing vitamin $D_3$ phosphate. This invention also relates to vitamin $D_3$ phosphate for use in the treatment of vitamin D deficiency.

BACKGROUND OF THE INVENTION

Vitamin D is an important pro-hormone that facilitates optimal intestinal calcium absorption to facilitate mineralisation of bone. The main two isoforms of vitamin D are vitamin $D_3$ (cholecalciferol) and vitamin $D_2$ (ergocalciferol). Vitamin D can be produced in the skin as vitamin $D_3$, from 7-dehydrocholesterol upon exposure to ultraviolet B (UVB; 219 nm to 315 nm). Vitamin D can also be obtained from the diet as vitamin $D_2$ or vitamin $D_3$, from foods such as oily fish, egg yolk, and meat.

After vitamin D enters the body, it circulates bound to vitamin D binding protein (DBP). It is transported to the liver and is metabolised to calcidiol 25(OH)D by 25 hydroxylases and then calcitriol 1α,25(OH)$_2$D$_3$ by 1α-hydroxylase in the kidney. Calcitriol is thought to generate the main biological effects by binding to the vitamin D receptor.

However, due to insufficient sun exposure and limited dietary sources, vitamin D deficiency has become a worldwide health issue. It is estimated that approximately 1 billion people have vitamin D deficiency globally (McCourt, A., et al., (2020) Efficacy and safety of food fortification to improve vitamin D intakes of older adults, *Nutrition*, 75-76, 110767). Vitamin D deficiency causes a wide range of disorders including rickets, osteoporosis, infections, and tuberculosis (Nair, R., and Maseeh, A., (2012) *Vitamin D: The "sunshine" vitamin, Journal of pharmacology & pharmacotherapeutics*, 3(2), 118).

The sale and use of vitamin D supplements are increasing globally as a response to the increasing incidence of vitamin D deficiency but, the oral administration of vitamin D suffers from complications such as poor compliance and gastrointestinal (GI) side-effects (Boonen, S. et al., (2006) Calcium and vitamin D in the prevention and treatment of osteoporosis—a clinical update, *J Intern Med*, 259(6):539-52; Unson, C. G. et al., (2006) Adherence to calcium/vitamin D and estrogen protocols among diverse older participants enrolled in a clinical trial, *Contemporary clinical trials*, 27(3), 215-26). In addition, there are a growing number of people who are unable to effectively swallow tablets with 50 to 75% of nursing home residents and up to 50% of obese people having swallowing problems (Huseini, M. et al., (2014) Gastrointestinal symptoms in morbid obesity, *Frontiers in medicine*, 1, 49).

Therefore, there is an ongoing need to deliver vitamin D via an alternative more convenient route of administration.

The transdermal delivery of drugs is an attractive alternative to oral administration because delivery via this route by-passes the GI tract and is user friendly (Prausnitz, M. R. and Langer R., (2008) Transdermal drug delivery, *Nature biotechnology*, 26(11), 1261-1268). However, generally only compounds that display moderate hydrophobic properties (Log P of between 1 to 3) with a Mw of less than 500 g/mol can pass through the skin into the blood via passive diffusion (Alkilani, A. Z. et al., (2015) Transdermal drug delivery: innovative pharmaceutical developments based on disruption of the barrier properties of the stratum corneum, *Pharmaceutics*, 7(4), 438-470). The lipophilicity of cholecalciferol (calculated Log P is 6.58, MarvinSketch) is therefore too high to allow sufficient quantities to pass the skin into the blood.

One means to enhance the penetration of vitamin D through the skin is to modify its chemical structure. Two main types of vitamin D structural modifications have been described in the literature. Firstly, analogues that modify the physicochemical properties of vitamin D to facilitate delivery; and secondly analogues that modify the vitamin D receptor (VDR) binding efficiency, and thus the pharmacological activity of the molecule. Alfacalcidol, doxercalciferol, and calcifediol are analogues which modify the VDR binding efficacy. Like cholecalciferol (vitamin $D_3$) and ergocalciferol (vitamin $D_2$), these analogues are prodrugs that require enzymatic activation to achieve the biological actions of vitamin D. However, all these agents have a log P>5 like cholecalciferol, and are therefore not suitable to be delivered via the skin for vitamin D supplementation (Gupta, R. et al., (2019) Recent Advances in Formulation Strategies for Efficient Delivery of Vitamin D. *AAPS PharmSciTech*, 20 (1), 11). Paracalcitol, maxacalcitrol, and oxacalcitriol are also analogues generated to modify the VDR binding efficacy, but they mimic the active form of vitamin D, calcitriol, and hence do not need the additional metabolism before acting at the VDR. However, the analogues that mimic calcitriol have a short half-life and display the potential to cause hypocalcaemia and therefore they are only used for their antiproliferative or pro-differentiating effects and not for vitamin D supplementation (Christakos, S. et al., (2016) Vitamin D: Metabolism, Molecular Mechanism of Action, and Pleiotropic Effects. *Physiological Reviews*, 96 (1), 365-408).

Analogues that modify the vitamin D physicochemical properties include the vitamin D esters: acetate, sulphate, propionate, butyrate, isobutyrate, isovalerate, caproate, laurate, myristate, palmitate, stearate, benzoate, phenyl acetate, tosylate, nitrobenzoate and dinitrobenzoate (Yakhimovich, R. I. et al., (1991) Synthesis of vitamin $D_3$ esters. *Pharmaceutical Chemistry Journal*, 25, 661-664). However, none of these esters significantly reduce the log P of vitamin D such that it is suitable for transdermal delivery. Vitamin D phosphate has the potential to lower the log P compared to the parent vitamin D molecule, however at physiological pH the phosphate group is ionised and as such the charged molecule would not be expected to penetrate the lipid layer of the skin. In addition, it is problematic to synthesise vitamin D phosphate esters.

U.S. Pat. No. 2,296,291 describes method for preparing a calciferol (vitamin $D_2$) phosphoric ester using pyridine, but this approach was found to give low yields and the product was difficult to purify owing to the dehydrating action of phosphorus oxychloride, which led to undesirable by-products. U.S. Pat. No. 2,296,291 also describes a process using metallic salts of vitamins or vitaminates to form ester salts of the vitaminates, by reacting the metallic salts of vitamins or vitaminates with anhydrides or oxyhalides of polybasic acids, such as phosphorus oxychloride. This document does not describe the synthesis of vitamin $D_3$ phosphate.

Zetterstrom, (1951), Nature, 4245, March 10) describes the phosphorylation of vitamin $D_2$ in pyridine at −5° C. using phosphorus oxychloride for 24 hours. The reaction product is then hydrolysed an aqueous ether at 0° C. for four hours with the same volume of 2% hydrochloric acid, then once again with 2% hydrochloric acid for half an hour. The pyridine-free ether phase is washed repeatedly with ice-cold water and then dried with sodium sulphate. The ether solution is evaporated over a water-bath and the residue dissolved in 10 mL ethanol. After addition of 2-5 mL of 2 percent sodium hydroxide in methanol, the sodium salt of phosphorylated vitamin $D_2$ is slowly precipitated. It was noted that vitamin $D_2$ derivative produced in this reference suspended in water has no influence on the activity of alkaline kidney phosphatase, which suggests that a simple phosphate that could be metabolised by the enzymes was not generated in the work.

Milas N. A. et al., ((1955), Some salts of the phosphoric ester of vitamin $D_3$, Journal of the American Chemical Society, 77 (6), 1640-1643) modified the method described in U.S. Pat. No. 2,296,291, to react a lithium derivative of cholecalciferol at low temperatures with phosphorus oxychloride to form di-tert-butyl cholecalciferol phosphate. This intermediate was hydrolysed with trisodium phosphate or a suspension of calcium hydroxide. However, this method did not form monomeric cholecalciferol phosphate, but rather the bis-cholecalciferol phosphate and other more structurally complex 'polymeric' forms, which have a high molecular weight and hence are not suitable for skin penetration.

CN-107674091 describes certain phosphate esters of vitamin $D_3$ which are stated to exhibit improved oral retention time and improved bioavailability. CN-107674091 describes a method of adding vitamin $D_3$ and triethylamine to dichloromethane, then adding phosphorus oxychloride dropwise in an ice bath, naturally warming to room temperature, reacting for 5 to 6 hours, and evaporating under reduced pressure to obtain dichlorovitamin $D_3$ phosphate ester. This product was added to anhydrous ethanol, heated, refluxed and stirred for 8 to 10 hours. The reaction was quenched by adding ice water, and decompressing the reaction solution to remove ethanol, adding ethyl acetate to extract, and taking the solution for separation by silica gel column chromatography to obtain the di-ethyl vitamin $D_3$ phosphate ester. The phosphate ester disclosed in this document contains a $C_{1-5}$-alkyl group, $CH_2C_6H_5$, $C_6H_5$, $NO_2C_6H_4$, $NO_2C_6H_4CH_2$, $NO_2$, or a halogen atom and a method to generate vitamin $D_3$ phosphate is not provided.

EP 0603726 A2 describes nutritional compositions at an acidic to mid pH containing a vitamin D ester, an amino acid source, a carbohydrate source and a certain amount of a lipid source. This document describes three potential methods to synthesise vitamin D phosphate, namely phosphorylation under "Schotten-Baumann conditions", "Einhorn conditions" and "dehydration", but does not exemplify the approaches.

U.S. Pat. No. 5,478,816 describes liquid vitamin formulations containing vitamin D esters, which are stated to have improved taste and improved storage stability. This document also describes three potential methods to synthesise vitamin D phosphate, namely phosphorylation under "Schotten-Baumann conditions", "Einhorn conditions" and "dehydration", but does not exemplify these approaches.

Although there are a number of attempts to synthesis vitamin D phosphates in the prior art there is not a single report of successfully producing a monomeric vitamin $D_3$ phosphate. As illustrated in the examples herein, attempts to prepare vitamin D3 phosphate using the methods described in the prior failed and no vitamin $D_3$ phosphate was obtained.

Despite the long-felt need for solubilised forms of vitamin $D_3$ no solutions have been provided to this problem.

Therefore, there is a need novel vitamin $D_3$ derivatives and for methods of preparing such derivatives in high yield and purity to enable synthesis on an industrial scale.

As described herein the inventors have for the first time found a method that provides vitamin $D_3$ phosphate. Despite the fact that the phosphate group is ionised at the local pH of the skin, it has unexpectedly been found that vitamin $D_3$ phosphate can penetrate into the skin when topically applied and may be delivered transdermally.

BRIEF SUMMARY OF THE DISCLOSURE

In accordance with the present invention, there is provided a compound of formula

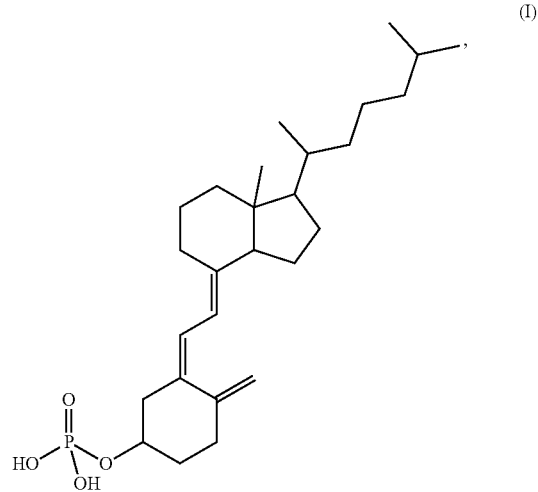 [SMILES: C=C1CCC(OP(=O)(O)O)C/C1=C/C=C1\CCCC2(C)C1CCC2C(C)CCCC(C)C]

(I)

or a pharmaceutically acceptable salt thereof.

Suitably the compound of formula (I) is of the formula (IA):

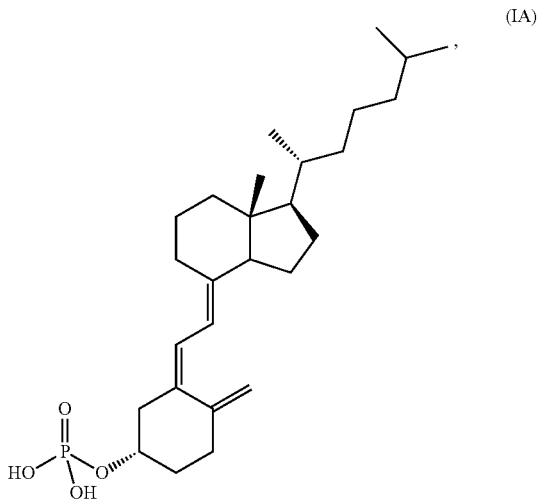

(IA)

or a pharmaceutically acceptable salt thereof.

Also provided is a pharmaceutical composition comprising a compound of the invention, and a pharmaceutically acceptable excipient.

As illustrated in the Examples herein, the inventors have unexpectedly found that the compounds of the invention can be administered transdermally, despite the fact that the phosphate group is ionised at the local pH of the skin. The Examples show that high levels of the compound of the invention penetrate into the skin and that compounds of the invention can pass through the skin. Accordingly, in some embodiments, the pharmaceutical composition is in a form suitable for a topical administration. In further embodiments, the pharmaceutical composition is in a form suitable for topical delivery of a compound of the invention into the skin, for example into stratum corneum, the epidermis and/or the dermis. In further embodiments, the pharmaceutical composition is in a form suitable for transdermal delivery of a compound of the invention. It may be that the pharmaceutical composition is a topical composition (e.g. transdermal composition) comprising a compound of the invention and a permeation enhancer.

It has been found that the compound of the invention is chemically stable in certain organic solvents. Accordingly, in certain embodiments the pharmaceutical composition comprises a compound of the invention and a suitable organic solvent. It may be that the suitable organic solvent is selected from: an ester, a chlorinated organic solvent, an aliphatic hydrocarbon solvent, an aromatic hydrocarbon solvent, a ketone, an aldehyde, an alcohol, a polyetherpolyol. a polyoxyethylene alkyl ether or a carbonate ester. The pharmaceutical composition may comprise a single organic solvent or a mixture of two or more organic solvents. It may be that the suitable organic solvent is an ester, for example ethyl acetate, methyl acetate or isopropyl acetate and the like. It may be that the suitable organic solvent is a chlorinated solvent, for example dichloromethane or chloroform and the like. It may be that the suitable organic solvent is an aliphatic or aromatic hydrocarbon solvent, for example hexane or medium chain alkanes (e.g. octane, nonane, or decane). It may be that the suitable organic solvent is an aromatic hydrocarbon solvent, for example toluene or xylene and the like. It may be that the suitable organic solvent is a ketone, for example acetone, methyl ethyl ketone, methyl isobutyl ketone or methyl n-butyl ketone and the like. It may be that the suitable organic solvent is an ester, for example methyl acetate, ethyl acetate, methyl butyrate or ethyl butyrate and the like. It may be that the suitable organic solvent is an alcohol, for example methanol, ethanol, propanol, isopropyl alcohol, butanol, or a polyol (e.g. glycerol) and the like.

It may be that the organic solvent is a polyetherpolyol for example a polyethylene glycol. It may be that the organic solvent is a glycol, for example ethylene glycol, polyethylene glycol or propylene glycol and the like. It may be that the organic solvent a glycol ether for example 2-(2-ethoxyethoxy)ethanol (also known as diethylene glycol monoethyl ether, or Transcutol). It may be that the organic solvent is a carbonate ester, for example propylene carbonate. It may be that the pharmaceutical composition comprises a compound of the invention and an organic solvent selected from one of more of: a hydrocarbon solvent, an ester, an alcohol, a glycol and a glycol ester. It may be that the pharmaceutical composition comprises a compound of the invention and an organic solvent selected from one of more of: an ester, an alcohol, a glycol and a glycol ester.

In certain embodiments, the pharmaceutical composition comprises a compound of the invention and one or more organic solvent selected from the group consisting of: propylene glycol (PG), polyethylene glycol (PEG), hexane, methanol, ethanol, ethyl acetate and 2-(2-ethoxyethoxy)ethanol (Transcutol). In other embodiments the pharmaceutical composition comprises a compound of the invention and one or more organic solvent selected from the group consisting of: propylene glycol (PG), polyethylene glycol (PEG), methanol, ethanol, ethyl acetate and 2-(2-ethoxyethoxy)ethanol (Transcutol).

In certain embodiments, the pharmaceutical composition comprises a compound of the invention and one or more organic solvent selected from the group consisting of: propylene glycol (PG), polyethylene glycol (PEG), hexane, methanol, ethanol and ethyl acetate. Thus it may be that the pharmaceutical composition comprises a compound of the invention and one or more organic solvent selected from the group consisting of: propylene glycol (PG), ethyl acetate and 2-(2-ethoxyethoxy)ethanol. In particular, it has been found that the compound of the invention is chemically stable in propylene glycol, and is more stable than cholecalciferol in propylene glycol. Accordingly, in a preferred embodiment the pharmaceutical composition comprises a compound of the invention and propylene glycol.

In certain embodiments, there is provided a pharmaceutical composition comprising a compound of the invention and an organic solvent selected from: propylene glycol, PEG, hexane, methanol, ethanol, ethyl acetate and 2-(2-ethoxyethoxy)ethanol. For example a pharmaceutical composition comprising a compound of the invention and an organic solvent selected from: propylene glycol, and 2-(2-ethoxyethoxy)ethanol. Such compositions are expected to be particularly suitable for topical delivery of the compounds of the invention, for example transdermal delivery of the compounds of the invention.

In a particular embodiment there is provided a pharmaceutical composition comprising a compound of the invention and propylene glycol.

It may be that the composition is adapted for topical administration. It may be that the composition is adapted for transdermal administration. Also provided is a topical pharmaceutical composition comprising a compound of the invention and a permeation enhancer. Suitable permeation enhancers are compounds which aid the permeation of a compound of the invention into and/or through the skin. Examples of permeation enhancers include but are not limited the permeation enhancers described herein. In some embodiments the permeation enhancer is an organic solvent, for example one or more of the organic solvents described herein in relation to the pharmaceutical compositions of the invention, for example an organic solvent selected from propylene glycol (PG), ethyl acetate and 2-(2-ethoxyethoxy)ethanol.

The pharmaceutical composition may be in a form suitable for direct topical application (e.g. to the skin or mucous membrane), for example in the form of a spray, lotion, gel or cream. Alternatively the pharmaceutical composition may incorporated into a transdermal patch or dressing as described in more detail herein. Accordingly a pharmaceutical composition of the invention may further comprise a gel-forming agent, for example a gel-forming polymer, to provide a gel which can be applied topically, for example to the skin. In other embodiments a pharmaceutical composition of the invention may be incorporated into a cream base, which can be an aqueous or non-aqueous cream base to provide a cream suitable for topical application of a compound of the invention. Aqueous and non-aqueous cream bases are well-known.

In some embodiments a pharmaceutical composition of the invention is topically applied in the form of a transdermal patch comprising a compound of the invention or a dressing comprising a compound of the invention. Suitably the compound of the invention may be incorporated into an adhesive, which is applied to the skin. Suitably the adhesive comprising a compound of the invention is incorporated into a transdermal patch or other dressing which is applied to the skin of a subject, from which the compound of the invention is delivered. Accordingly in some embodiments the pharmaceutical composition of the invention comprises a compound of the invention and an adhesive. Suitable adhesives for topical use are described herein. In some embodiments the pharmaceutical composition of the invention comprises a compound of the invention, an adhesive and a permeation enhancer. Suitably the permeation enhancer is a permeation enhancer described herein.

In some embodiments the pharmaceutical composition of the invention described herein is a non-aqueous composition. Accordingly, in certain embodiments the pharmaceutical composition comprising the compound of the invention described herein is substantially free from water. For example, the composition comprises less than 5%, 4%, 3%, 2%, 1%, 0.5%, 0.1%, 0.01%, or 0.001% by weight of water. Suitably the composition contains no water.

In certain embodiments the pharmaceutical composition comprising the compound of the invention described herein is substantially free of methanol or ethanol. For example, the composition comprises less than 5%, 4%, 3%, 2%, 1%, 0.5%, 0.1% or 0.01% by weight of methanol or ethanol. Suitably the composition contains no methanol or ethanol.

Aqueous pharmaceutical compositions comprising a compound of the invention are also contemplated. Thus in certain embodiments there is provided a pharmaceutical composition comprising the compound of the invention and water. Suitably the aqueous composition further comprises one or more water-soluble organic solvents. For example the aqueous composition may further comprise one or more organic solvents selected from a water-soluble ether, a water-soluble alcohol, a water soluble glycol, a water-soluble polymeric glycol, a water-soluble glycol ether and a water-soluble ester. Accordingly in embodiments there is provided a pharmaceutical composition comprising the compound of the invention, water and one of more organic solvents selected from: methanol, propylene glycol, ethyl acetate and 2-(2-ethoxyethoxy)ethanol. In a further embodiment there is provided a pharmaceutical composition comprising the compound of the invention, water and one of more organic solvents selected from: methanol, ethyl acetate and 2-(2-ethoxyethoxy)ethanol. Suitably in the aqueous pharmaceutical compositions described herein the volume ratio (v/v) of organic solvent to water is from 5:1 to 30:1, for example from 5:1 to 20:1, from 5:1 to 15:1, from 8:1 to 12:1, or about 10:1.

In some embodiments the compound of the invention is present in the pharmaceutical composition of the invention as the free acid form of the compound (i.e. the phosphate free acid). In some embodiments the pharmaceutical composition is a non-aqueous pharmaceutical composition comprising the compound of the invention in the free acid form. In some embodiments the pharmaceutical composition is an aqueous pharmaceutical composition comprising the compound of the invention in the free acid form.

The Examples herein show that cholecalciferol phosphate di-sodium salt is more stable than cholecalciferol phosphate in the free acid form during storage. The Examples also indicate that the salt provides higher transdermal permeation than the free acid cholecalciferol phosphate. Accordingly, in some embodiments the compound of the invention is present in the pharmaceutical composition of the invention as a pharmaceutically acceptable salt, for example the pharmaceutical composition described herein comprises a sodium salt of the compound of the invention, particularly the di-sodium salt of the compound of the invention. In some embodiments the pharmaceutical composition is an aqueous pharmaceutical composition comprising a pharmaceutically acceptable salt of the compound of the invention. In some embodiments the pharmaceutical composition is a non-aqueous pharmaceutical composition comprising a pharmaceutically acceptable salt of the compound of the invention.

Also provided is a transdermal patch comprising a compound of the invention. In certain embodiments the transdermal patch comprises a pharmaceutical composition according to the invention, for example any of the pharmaceutical compositions described herein.

Also provided is a compound of the invention, or a pharmaceutical composition of the invention, for use in the treatment of vitamin D deficiency in a subject.

Also provided is a method of treating a vitamin D deficiency in a subject, the method comprising administering to the subject an effective amount of a compound of the invention, or a pharmaceutical composition of the invention.

Also provided is the use of a compound of the invention, or a pharmaceutical composition of the invention, for the manufacture of a medicament for the treatment of a vitamin D deficiency in a subject.

Also provided is a compound of the invention, or a pharmaceutical composition of the invention, for use in the treatment of a disease or medical condition associated with vitamin D deficiency in a subject.

Also provided is a method of treating a disease or medical condition associated with vitamin D deficiency in a subject, the method comprising administering to the subject an effective amount of a compound of the invention, or a pharmaceutical composition of the invention.

Also provided is the use of a compound of the invention, or a pharmaceutical composition of the invention, for the manufacture of a medicament for the treating a disease or medical condition associated with vitamin D deficiency in a subject. In any of the embodiments herein relating to the compound for use, methods of treatment or use of the compound, it may be that the compound or pharmaceutical composition of the invention is topically administered to the subject. Thus, it may be that the compound or pharmaceutical composition is administered topically to the skin of the subject.

In some embodiments, the compound or pharmaceutical composition is administered to the subject transdermally. In certain embodiments the compound of the invention is administered to the subject by means of a transdermal patch applied to the skin of the subject.

In any of the embodiments herein relating to the compound for use, methods of treatment or use of the compound, it may be that the compound or pharmaceutical composition of the invention is orally administered to the subject.

As illustrated in the Examples herein, several variations of a synthetic procedure that employed phosphorus oxychloride ($POCl_3$) to phosphorylate cholecalciferol followed by hydrolysis of the phosphodichloridate reaction product were attempted, but each failed to generate the cholecalciferol phosphate product due to degradation of the product during the synthesis (see Comparative Examples herein). In addition, the inventors have repeated the synthetic procedures described in CN-107674091 (Comparative Example 10), EP 0603726 A2 (Comparative Examples 11, 12 and 13), and U.S. Pat. No. 5,478,816 (Comparative Examples 11, 12 and 13). Each of these synthetic procedures also failed to generate the cholecalciferol phosphate product. The inventors have developed a process which not only provides vitamin D₃ phosphate, but also provides vitamin D₃ phosphate in good yield and high purity.

Accordingly, a further aspect provides a process for the preparation of a compound of formula (I), or a pharmaceutically acceptable salt thereof:

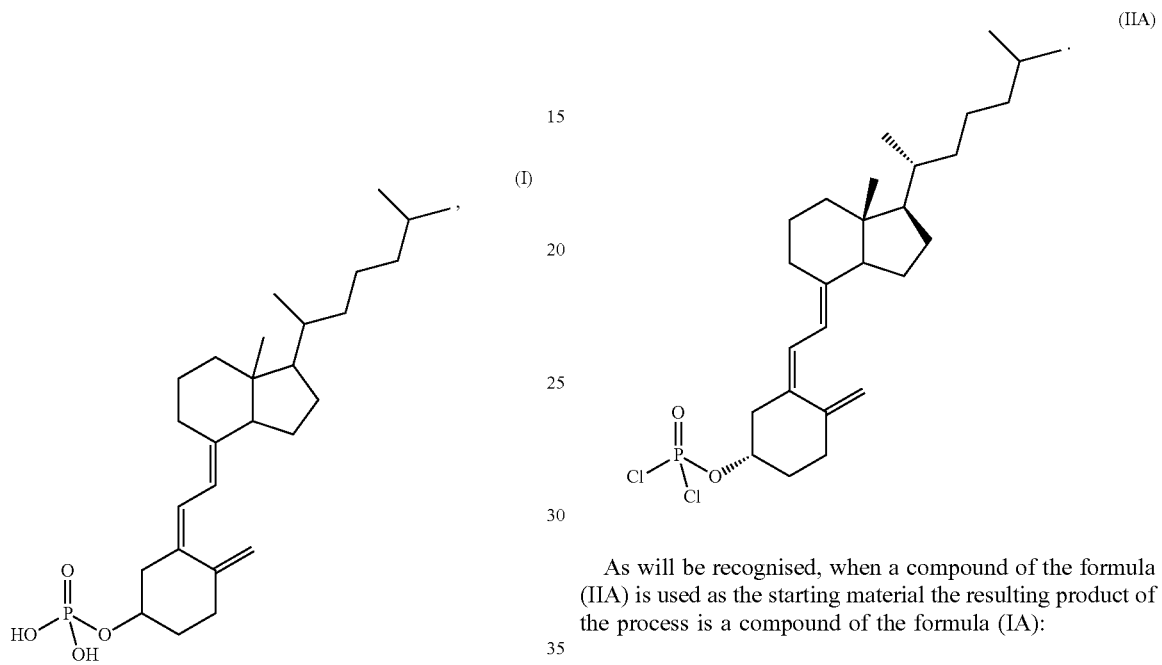

the process comprising contacting a compound of formula (II) with water for about 2 hours or less, to provide the compound of formula (I):

Suitably, the compound of formula (II) used as the starting material is a compound of formula (IIA):

As will be recognised, when a compound of the formula (IIA) is used as the starting material the resulting product of the process is a compound of the formula (IA):

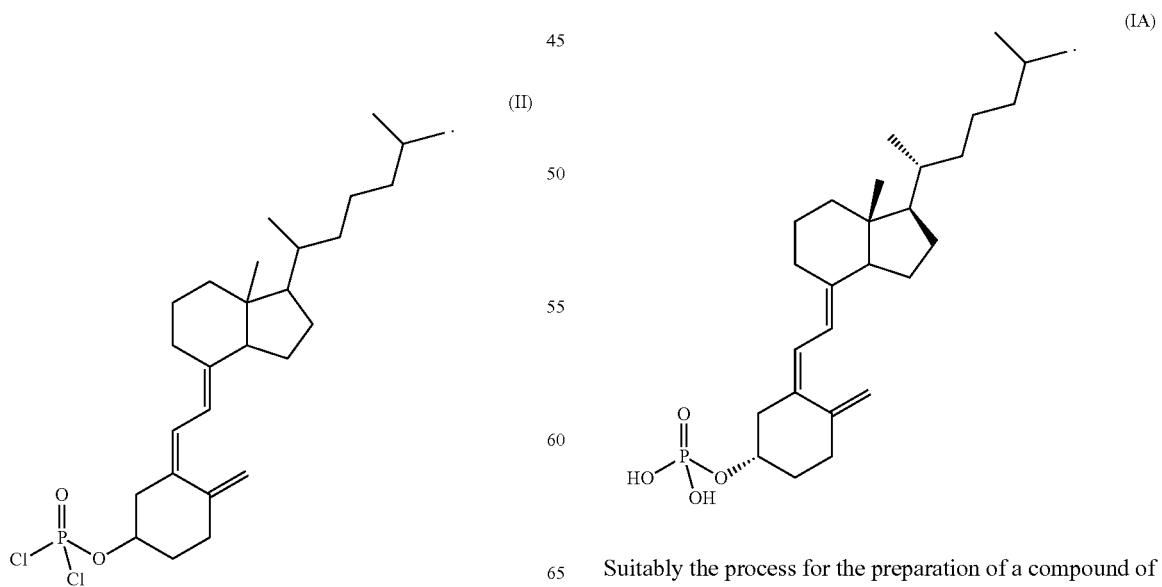

Suitably the process for the preparation of a compound of the formula (I) (or (IA)) is carried out under an inert atmosphere.

Also provided is a process for the preparation of a compound of formula (II):

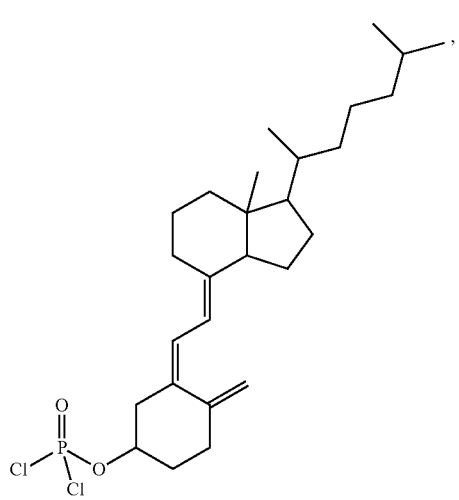

(II)

the process comprising reacting vitamin $D_3$ with a phosphorylating agent in the presence of a suitable base, wherein the reaction is performed in the absence of water and under an inert atmosphere to provide a reaction mixture comprising the compound of formula (11).

Suitably, the compound of formula (II) is a compound of formula (IIA) as defined above.

Also provided is a process for the preparation of a compound of formula (I), wherein the process comprises the following steps:

Step (i) reacting vitamin $D_3$ with a phosphorylating agent in the presence of a suitable base, wherein the reaction is performed in the absence of water and under an inert atmosphere to provide a reaction mixture comprising a compound of formula (II); and then Step (ii) contacting the reaction mixture comprising the compound of formula (II) with water for about 2 hours or less; and then Step (iii) isolating the compound of formula (I).

Suitably, the compound of formula (I) is a compound of formula (IA), and the compound of formula (II) is a compound of formula (IIA) as defined above.

Further aspects and features of the invention are set out in the detailed description below.

BRIEF SUMMARY OF FIGURES

FIG. 10—Development of patch formulations using different concentrations of cholecalciferol phosphate acid (VDP acid)/disodium salt (VDP disodium salt) to determine the saturated concentrations.

FIG. 11B shows the comparison between cholecalciferol (VD) and cholecalciferol phosphate acid (VDP acid)/disodium salt (VDP disodium salt) in patch formulation, showing the mass deposited in the skin and receiver fluid using 1.0 mm porcine skin. Each point represents mean±SD (n=5). *p<0.05, p<0.005, **p<0.0001.

FIG. 13C shows the change of purity of cholecalciferol phosphate acid (VDP acid), and FIG. 13D that of cholecalciferol phosphate disodium salt (VDP salt) over 4 weeks in 3 different storage conditions (room temperature (RT), fridge (4° C.) and freezer (-20° C.)). The samples were prepared (100 μg/mL), by dissolving in MeOH and MeOH:water (90:10), respectively.

DETAILED DESCRIPTION

Definitions

Figure 1:
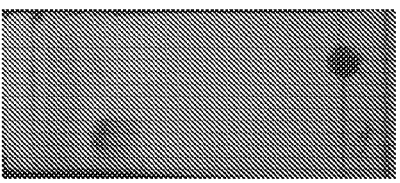
FIG. 1—TLC results and Rf values of cholecalciferol and cholecalciferol phosphate (final product), and yields of 3 batches of cholecalciferol phosphate.
Figure 1:
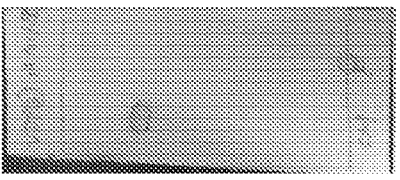
Figure 1:
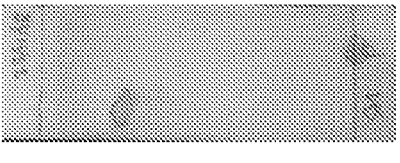

Unless otherwise stated, the following terms used in the specification and claims have the following meanings set out below.

The "subject" treated using the methods described herein is preferably a human subject. However, other animals such as warm-blooded mammals are also contemplated, for example mice, rats, monkeys, rabbits, companion animals such as dogs, cats and horses, and livestock, for example cattle, sheep and pigs.

The terms "treating" or "treatment" refers to any indicia of success in the treatment or amelioration of a disease, pathology or condition, including any objective or subjective parameter such as abatement; remission; diminishing of symptoms or making the pathology or condition more tolerable to the patient; slowing in the rate of degeneration or decline; making the final point of degeneration less debilitating; improving a patient's physical or mental well-being. For example, certain methods herein treat vitamin D deficiency by decreasing a symptom of vitamin D deficiency, for example fatigue, bone pain, muscle weakness, muscle aches, or muscle cramps. Symptoms of vitamin D deficiency are known or may be readily determined by a person of ordinary skill in the art. The term "treating" and conjugations thereof, include prevention of a pathology, condition, or disease.

The term "associated" or "associated with" in the context of a substance or substance activity or function associated with a disease means that the disease is caused by (in whole or in part), or a symptom of the disease is caused by (in whole or in part) the substance or substance activity or function.

When a compound or salt described in this specification is administered to treat a disorder, a "therapeutically effective amount" is an amount sufficient to reduce or completely alleviate symptoms or other detrimental effects of the disorder; cure the disorder; reverse, completely stop, or slow the progress of the disorder; or reduce the risk of the disorder getting worse. For example, an amount sufficient to restore the vitamin D level in a subject to a normal physiological level. The exact amounts will depend on the purpose of the treatment, and will be ascertainable by one skilled in the art using known techniques (see, e.g., Lieberman, *Pharmaceutical Dosage Forms* (vols. 1-3, 1992); Lloyd, *The Art, Science and Technology of Pharmaceutical Compounding* (1999); Pickar, *Dosage Calculations* (1999); and *Remington: The Science and Practice of Pharmacy*, 20th Edition, 2003, Gennaro, Ed., Lippincott, Williams & Wilkins). Dosage amounts and intervals can be adjusted individually to provide levels of the administered compound effective for the particular condition being treated. This determination of a dosage regimen is generally based upon an assessment of the active compound by considering factors such as compound potency, relative bioavailability, patient body weight, presence and severity of adverse side effects, preferred mode of administration and the toxicity profile of the selected agent.

The phrase "compound of the invention" means those compounds which are disclosed herein, both generically and specifically, including the compounds of the formulae (I) and (IA), or a pharmaceutically acceptable salt thereof. Thus, a compound of the invention includes vitamin $D_3$ phosphate, or a pharmaceutically acceptable salt thereof.

References herein to a "pharmaceutical composition of the invention" are directed to pharmaceutical compositions comprising a compound of the invention and one or more pharmaceutically acceptable excipient(s), including the oral and topical pharmaceutical compositions described herein.

"Vitamin $D_3$" and "cholecalciferol" are used interchangeably throughout this specification. When "vitamin $D_3$" or "cholecalciferol" are described in this specification, they refer to compounds of the formula:

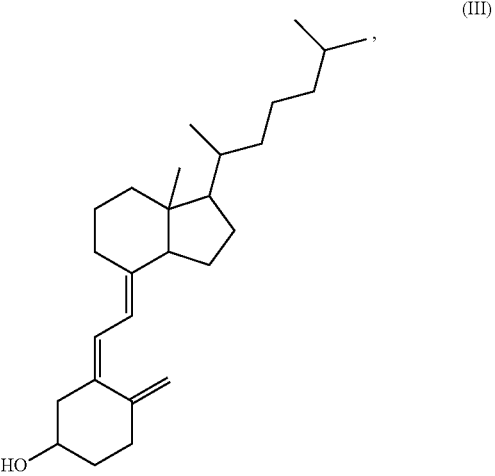 [SMILES: C=C1CCC(O)C/C1=C/C=C1\CCCC2(C)C1CCC2C(C)CCCC(C)C]

(III)

or a pharmaceutically acceptable salt thereof, preferably wherein the compound has its natural conformation:

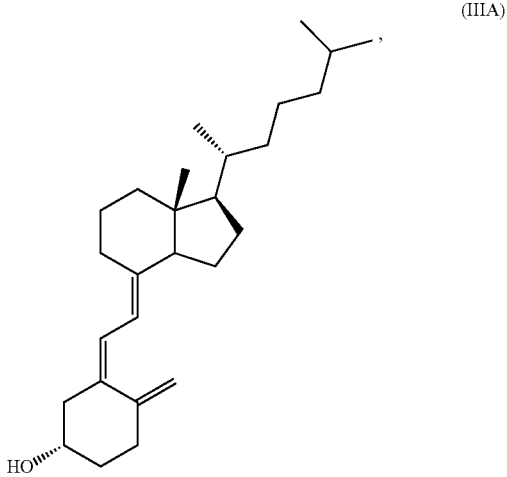

(IIIA)

or a pharmaceutically acceptable salt thereof.

It will be understood that where the starting material used in the processes described herein is vitamin D₃ of the formula (IIIA) the product of the process will be the compound corresponding phosphorylated compound of the formula (IA) (and/or the intermediate of the formula (IIA)).

It will be understood that "phosphorus oxychloride" and "POCl₃" are used interchangeably throughout this specification.

"Topical treatment" or "topical application" refers to the administration of a compound of the invention or pharmaceutical composition of the invention to body surfaces, for example the skin or mucous membranes. Topical medications may also be applied to the surface of tissues other than the skin, for example, rectally, vaginally or by inhalation to the airways and/or lung. Suitably the compounds of the invention and pharmaceutical compositions of the invention are topically applied to the skin of a subject. Topical administration of a compound of the invention results in the compound penetrating into and/or through the tissue to which the compound is topically applied. Thus in the case of topical application to the skin the compound of the invention may pass into the stratum corneum, the dermis and/or the epidermis. A compound of the invention may also penetrate through the skin and into the bloodstream following topical administration. Reference herein to transdermal delivery of a compound of the invention refers to both penetration and deposition of a compound into the tissue (e.g. skin) to which it is topically applied as well as penetration through the tissue and into the blood.

The term "transdermal patch" refers to a medicated patch that is placed on the skin of a subject, to deliver a specific dose of medication (i.e. a compound of the invention) through the skin and into the bloodstream. Generally, the transdermal patch comprises a substrate which carries the compound of the invention and an adhesive configured (e.g. in the form of a layer on the substrate) to attach and retain the patch on the skin of a subject.

Suitable or preferred features of any compounds of the present invention may also be suitable features of any other aspect.

The invention contemplates pharmaceutically acceptable salts of the compounds of the invention. These may include the acid addition and base salts of the compounds. These may be acid addition and base salts of the compounds.

The term "pharmaceutically acceptable salt" refers to salts that retain the biological effectiveness and properties of the compounds described herein and, which are not biologically or otherwise undesirable. A suitable pharmaceutically-acceptable salt of a compound is, for example, an acid-addition salt of a compound, for example an acid-addition salt with an inorganic or organic acid such as hydrochloric, hydrobromic, sulphuric, trifluoroacetic, citric or maleic acid; or, for example, a salt of a compound is sufficiently acidic, for example an alkali or alkaline earth metal salt such as a calcium or magnesium salt, or an ammonium salt, or a salt with an organic base such as methylamine, dimethylamine, trimethylamine, piperidine, morpholine or tris-(2-hydroxyethyl)amine. Suitably, when the compound of the invention is in the form of a pharmaceutically acceptable salt, the salt is a metal salt (e.g. a salt formed with aluminium, calcium, magnesium, potassium, sodium, or zinc), or a salt with an organic base. It may be that the pharmaceutically acceptable salt is selected from an aluminium, calcium, magnesium, potassium, sodium, and zinc salt. For example, it may be that the pharmaceutically acceptable salt is a calcium or sodium salt. Preferably the pharmaceutically acceptable salt is a sodium salt. It may be that the pharmaceutically acceptable salt is a salt with an organic base, preferably an organic amine. For example, it may be that the pharmaceutically acceptable salt is methylamine, dimethylamine, trimethylamine, or tris-(2-hydroxyethyl)amine. Hemisalts of acids and bases may also be formed, for example a hemicalcium salt. For a review on suitable pharmaceutically acceptable salts, see "Handbook of Pharmaceutical Salts: Properties, Selection, and Use" by Stahl and Wermuth (Wiley-VCH, Weinheim, Germany, 2002).

Compounds that have the same molecular formula but differ in the nature or sequence of bonding of their atoms or the arrangement of their atoms in space are termed "isomers". Isomers that differ in the arrangement of their atoms in space are termed "stereoisomers". Stereoisomers that are not mirror images of one another are termed "diastereomers" and those that are non-superimposable mirror images of each other are termed "enantiomers". When a compound has an asymmetric centre, for example, it is bonded to four different groups, a pair of enantiomers is possible. An enantiomer can be characterized by the absolute configuration of its asymmetric centre and is described by the R- and S-sequencing rules of Cahn and Prelog, or by the manner in which the molecule rotates the plane of polarized light and designated as dextrorotatory or levorotatory (i.e., as (+) or (−)-isomers respectively). A chiral compound can exist as either individual enantiomer or as a mixture thereof. A mixture containing equal proportions of the enantiomers is called a "racemic mixture". Where a compound of the invention has two or more stereocentres any combination of (R) and (S) stereoisomers is contemplated. The combination of (R) and (S) stereoisomers may result in a diastereomeric mixture or a single diastereoisomer. The compounds of the invention may be present as a single stereoisomer or may be mixtures of stereoisomers, for example racemic mixtures and other enantiomeric mixtures, and diastereomeric mixtures. Where the mixture is a mixture of enantiomers the enantiomeric excess may be any of those disclosed above. Where the compound is a single stereoisomer the compounds may still contain other diastereoisomers or enantiomers as impurities. Hence a single stereoisomer does not necessarily have an enantiomeric excess (e.e.) or diastereomeric excess (d.e.) of 100% but could have an e.e. or d.e. of about at least 85%.

The compounds of this invention possess one or more asymmetric centres; such compounds can therefore be produced as individual (R)- or (S)-stereoisomers or as mixtures thereof. Unless indicated otherwise, the description or naming of a particular compound in the specification and claims is intended to include both individual enantiomers and mixtures, racemic or otherwise, thereof. The methods for the determination of stereochemistry and the separation of stereoisomers are well-known in the art (see discussion in Chapter 4 of "Advanced Organic Chemistry", 4th edition J. March, John Wiley and Sons, New York, 2001), for example by synthesis from optically active starting materials or by resolution of a racemic form. Some of the compounds of the invention may have geometric isomeric centres (E- and Z-isomers). It is to be understood that the present invention encompasses all optical, diastereoisomers and geometric isomers and mixtures thereof.

Compounds and salts described in this specification may be isotopically-labelled (or "radio-labelled"). Accordingly, one or more atoms are replaced by an atom having an atomic mass or mass number different from the atomic mass or mass number typically found in nature. Examples of radionuclides that may be incorporated include $^2H$ (also written as "D" for deuterium), $^3H$ (also written as "T" for tritium), $^{11}C$, $^{13}C$, $^{14}C$, $^{15}O$, $^{17}O$, $^{18}O$, $^{18}F$ and the like. The radionuclide that is used will depend on the specific application of that radio-labelled derivative. For example, for in vitro competition assays, $^3H$ or $^{14}C$ are often useful. For radio-imaging applications, $^{11}C$ or $^{18}F$ are often useful. In some embodiments, the radionuclide is $^3H$. In some embodiments, the radionuclide is $^{14}C$. In some embodiments, the radionuclide is $^{11}C$. And in some embodiments, the radionuclide is $^{18}F$.

It is also to be understood that certain compounds of the invention may exist in solvated as well as unsolvated forms such as, for example, hydrated forms.

It is also to be understood that certain compounds of the invention may exhibit polymorphism.

Compounds of the invention may exist in a number of different tautomeric forms and references to compounds of the invention include all such forms.

Unless stated otherwise, reference herein to a "% by weight of a compound or a pharmaceutically acceptable salt thereof" is intended to refer to the amount of the free acid (i.e. non-salt form) compound. For example, reference to a composition comprising "5% by weight of compound or a pharmaceutically acceptable salt thereof" refers to a composition comprising 5% by weight of the compound as the free acid. Accordingly, where such a composition comprises a salt of the compound, the absolute amount of the compound salt in the composition will be higher than 5% by weight in view of the salt counter ion that will be also be present in the composition.

Reference to "about" in the context of a numerical is intended to encompass the value+/−10%. For example, about 20% includes the range of from 18% to 22%.

The term "gel" is used herein refers to a semi-solid, apparently homogeneous substance that may be elastic and jelly-like (as in, for example, gelatin). The gel comprises a three-dimensional polymeric or inorganic matrix within which is dispersed a liquid phase. The liquid phase may comprise an aqueous (e.g. water) or non-aqueous liquid. The matrix of the gel comprises a network of physically or chemical cross-linked polymers or copolymers that swell but do not dissolve in the presence of a solvent (for example the low molecular weight PEG). The cross-linking within the gel matrix may be physical cross linking (for example by hydrogen bonding or ionic cross-linking) or may be covalently cross-linked. In some embodiments the gel composition is a non-aqueous gel composition wherein the compound of the invention is dissolved or dispersed in a suitable non-aqueous liquid medium (e.g. PG or PEG) which forms the liquid phase of the gel. The non-aqueous gel may be prepared by forming a non-aqueous solution or dispersion of the compound in the liquid and then mixing the solution or dispersion with a suitable gel-forming polymer. Alternatively, a compound of the invention may be incorporated into a gel by simply dissolving or dispersing the compound into a gel. The gels are preferably clear in appearance; however, turbid gels are also contemplated. Generally, the gel-forming agent, for example gel-forming polymer, is present in the gel in an amount of from about 0.5-15% by weight, typically 0.5-2% by weight.

Reference to a "non-aqueous" composition (e.g. a non-aqueous topical composition), or "in the absence of water" in the context of the processes described herein means that the composition is anhydrous and/or the reaction is carried out under anhydrous conditions and therefore substantially water free. For example, the non-aqueous compositions disclosed herein (e.g. a non-aqueous gel, cream or foam) contain less than 5%, less than 1% or suitably less than 0.01%, preferably less than 0.001% by weight water. Preferred non-aqueous compositions are those which are anhydrous and contain no detectable water. Similarly, the reactions described herein that take place in the absence of water are reaction media that contain less than 5%, less than 1% or suitably less than 0.01%, preferably less than 0.001% by weight water, preferably wherein the reaction is carried out under conditions where there no detectable water present.

Protic organic solvents are those that are capable of hydrogen bonding. The most common examples of protic organic solvents include but are not limited to alcohols and carboxylic acids. Aprotic organic solvents are those that are not capable of hydrogen bonding.

Common aprotic organic solvents include but are not limited polar aprotic solvents, for example ethers (e.g. tetrahydrofuran, (THF)), dimethylformamide (DMF), dimethylsulfoxide (DMSO) and acetonitrile.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Compounds

In an embodiment, the compound of the invention is a compound of formula (I), or preferably formula (IA), or a pharmaceutically acceptable salt thereof:

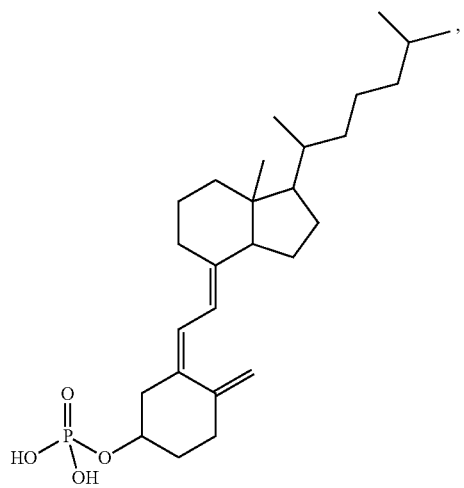

(I)

preferably

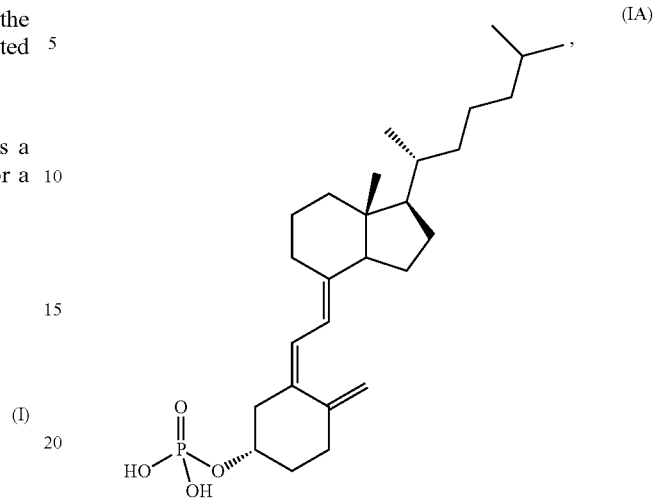

(IA)

In an embodiment, the compound of the invention is:

(IA)

or a pharmaceutically acceptable salt thereof.

In certain embodiments, the compound of formulae (I) or (IA), is in the free acid form.

As illustrated in the examples herein, the disodium salt of the compound of the invention exhibits good storage stability compared to free acid for of the compound. Accordingly, in certain embodiments, the compound of formulae (I) or (IA) is in the form of a pharmaceutically acceptable salt, for example a sodium salt, or a calcium salt. In one embodiment the compound is a sodium salt of a compound of the formulae (I) or (IA), preferably the di-sodium salt of a compound of the formulae (I) or (IA).

As will be understood the phosphate group present in the compounds of formulae (I) and (IA) is ionisable. Accordingly, when in solution, it may be that the phosphate group is mono- or di-protonated. All such ionised and non-ionised forms of the compounds of the invention are encompassed by the present invention.

In certain embodiments, the compound of formulae (I) or (IA) is substantially pure. For example, the compound of formulae (I) or (IA) is more than 70% pure. It may be that the compound of formulae (I) or (IA) is more than 60%, 65%, 75%, 80%, 85%, 90%, or 95% pure. In certain embodiments, the compound of formulae (I) or (IA) is more than 80% pure. In certain embodiments, the compound of formulae (I) or (IA) is more than 85% pure. In certain embodiments, the compound of formulae (I) or (IA) is more than 90% pure. In certain embodiments, the compound of formulae (I) or (IA) is more than 95% pure. In certain embodiments, the compound of formulae (I) or (IA) is more than 96% pure. In certain embodiments, the compound of formulae (I) or (IA) is more than 97% pure. In certain embodiments, the compound of formulae (I) or (IA) is more than 98% pure. In certain embodiments, the compound of formulae (I) or (IA) is more than 99% pure. In certain embodiments, the compound of formulae (I) or (IA) is more than 99.5% pure. In certain embodiments, the compound of formulae (I) or (IA) is more than 99.9% pure. Thus it may be that the compound of formulae (I) or (IA) is from 65% to 99.9% pure. It may be that the compound of formulae (I) or (IA) is from 75% to 99.5% pure. It may be that the compound of formulae (I) or (IA) is from 85% to 99.5% pure. It may be that the compound of formulae (I) or (IA) is from 90% to 99.5% pure. Methods for determining the degree of purity are well-known in the art, for example, HPLC, NMR and LC/MS.

Pharmaceutical Compositions

According to a further aspect there is provided a pharmaceutical composition comprising the compound of the invention, and a pharmaceutically acceptable excipient.

Conventional procedures for the selection and preparation of suitable pharmaceutical compositions are described in, for example, "Pharmaceuticals—The Science of Dosage Form Designs", M. E. Aulton, Churchill Livingstone, 1988. Pharmaceutical excipients suitable for the preparation of dosage forms are well known, for example as described in the Handbook of Pharmaceutical Excipients, Seventh Edition, Rowe et al.

The compound of the invention is suitably compounded with an appropriate and convenient amount of excipients which may vary from about 1 to about 99 percent by weight of the total composition. In certain embodiments the compound of the invention is dissolved in pharmaceutical composition of the invention. In certain embodiments the compound of the invention is present in the pharmaceutical composition as a dispersion. The compositions may be prepared using conventional procedures well known in the art.

The compositions may be in a form suitable for oral use (for example as tablets, films, lozenges, hard or soft capsules, aqueous or oily suspensions, emulsions, solutions, dispersible powders or granules, syrups, sprays or elixirs), for topical use (for example as creams, ointments, gels, sprays, transdermal patches, foams or aqueous, non-aqueous or oily solutions or suspensions), for administration by inhalation (for example as a finely divided powder or a liquid aerosol), for administration by insufflation (for example as a finely divided powder) or for parenteral administration (for example as a sterile aqueous or oily solution for intravenous, subcutaneous, intramuscular or intraperitoneal dosing or as a suppository for rectal dosing). Preferably the composition is in a form suitable for topical administration, for example in the form of a lotion, droplets, spray, cream, gel or foam composition. Thus, it may be that the pharmaceutical composition is any one of the pharmaceutical compositions described herein in a form suitable for topical, preferably, transdermal administration. Also contemplated is a dressing or transdermal patch comprising a compound of the invention or a pharmaceutical composition of the invention.

In certain embodiments, there is provided a pharmaceutical composition comprising a compound of the invention, and at least one solvent, suitably a non-aqueous solvent. It may be that the solvent is selected from the group consisting of, but not limited to one or more of: esters such as ethyl acetate, methyl acetate, isopropyl acetate and the like; chlorinated solvents such as dichloromethane, chloroform and the like; aliphatic and aromatic hydrocarbon solvents such as hexane, toluene, xylene and the like; ketones such as acetone, methyl ethyl ketone, methyl isobutyl ketone, methyl n-butyl ketone and the like; alcohols such as methanol, ethanol, propanol, butanol and the like; esters, such as methyl acetate, ethyl acetate, methyl butyrate or ethyl butyrate and the like; glycols such as ethylene glycol, polyethylene glycol, propylene glycol and the like; and a glycol ether such as 2-(2-ethoxyethoxy)ethanol. In certain embodiments, the solvent is one or more solvent selected from the group consisting of: a non-polymeric glycol (for example an alkylene glycol, e.g. a $C_{2-8}$ alkylene glycol such as propylene glycol), ethanol, methanol, polyethylene glycol (PEG) and mineral oil. Where the solvent is PEG it suitably a low molecular weight PEG, for example a PEG with an average molecular weight of 1000 or less, for example a PEG may be selected from PEG 200, PEG 400, PEG 600, PEG 800 and PEG 1000.

In certain embodiments, a compound of the invention is formulated as a pharmaceutical composition comprising a compound of the invention, and a non-polymeric glycol (for example an alkylene glycol, e.g. a $C_{2-8}$ alkylene glycol such as propylene glycol). Preferably, a compound of the invention is formulated as a pharmaceutical composition comprising a compound of the invention and propylene glycol (PG).

Suitably, the pharmaceutical composition described herein is a non-aqueous pharmaceutical composition. Accordingly, in certain embodiments, there is provided a non-aqueous pharmaceutical composition comprising:
(i) a compound of the invention, or a pharmaceutically acceptable salt thereof; and
(ii) one or more solvents selected from propylene glycol, ethyl acetate and 2-(2-ethoxyethoxy)ethanol.

In certain embodiments, there is provided a non-aqueous pharmaceutical composition comprising:
(i) a compound of the invention, or a pharmaceutically acceptable salt thereof; and
(ii) propylene glycol (PG).

In certain embodiments, the pharmaceutical composition is a non-aqueous gel composition comprising a compound of the invention, or a pharmaceutically acceptable salt thereof, a gel-forming agent and a non-aqueous liquid medium. The gel-forming agent may be any of the gel-forming agents disclosed herein. Suitably, the non-aqueous liquid medium comprises a non-aqueous solvent selected from a PEG, a non-polymeric glycol (e.g. propylene glycol) and a glycol ether (e.g. 2-(2-ethoxyethoxy)ethanol). For example, the non-aqueous liquid medium comprises a PEG or a non-polymeric glycol (e.g. propylene glycol).

Also contemplated is an aqueous composition comprising a compound of the invention. The aqueous composition (e.g. aqueous topical composition) suitably comprises at least 5% by weight of water and one or more pharmaceutically acceptable excipients.

In some embodiments the pharmaceutical composition is an aqueous gel composition comprising a compound of the invention, or a pharmaceutically acceptable salt thereof, a gel-forming agent and an aqueous liquid medium. The gel-forming agent may be any of the gel-forming agents disclosed herein. Suitably, the aqueous liquid medium comprises water, and a solvent selected from an alcohol (e.g. methanol or ethanol), a PEG, a non-polymeric glycol (e.g. propylene glycol), and a glycol ether (e.g. 2-(2-ethoxyethoxy)ethanol).

In some embodiments, the pharmaceutical composition may be in the form of an aqueous cream or ointment comprising a compound of the invention, and a suitable aqueous cream or non-aqueous ointment base. In some embodiments, the composition may be in the form of a non-aqueous cream or ointment comprising a compound of the invention and a suitable non-aqueous cream or non-aqueous ointment base. Suitably the aqueous or non-aqueous cream or ointment is suitable for topical administration to a subject, preferably wherein the cream or ointment is adapted for topical administration to the skin.

The cream or ointment compositions above may be prepared using known carriers or "bases" in which the compound of the invention, is dissolved or dispersed. For example, the composition may comprise a compound of the invention dissolved or dispersed in a suitable base formulation selected from an oleaginous base (e.g. petrolatum, white petrolatum, yellow ointment or white ointment), an absorption base (e.g. hydrophilic petrolatum or lanolin), a water-removable base (oil in water emulsion); a water-soluble base (e.g. a polyethylene glycol).

In some embodiments the pharmaceutical composition is in a form suitable for oral administration to a subject, for example wherein the composition is in the form of a solution, suspension, tablet or granule formulation. For example the pharmaceutical composition may be in the form of an oral composition comprising a compound of the invention and a pharmaceutically acceptable excipient. Suitable pharmaceutical excipients are well-known to the skilled person and include for example fillers, binders and disintegrants and can be found in standard text books such as the Handbook of Pharmaceutical Excipients, Seventh Edition, Rowe et al. In certain embodiments the oral composition may be a tablet, granule or capsule formulation. The composition may be an instant release which releases the active agent substantially in the upper GI tract, such as the stomach or upper intestine. Also contemplated are delayed release, modified release or controlled release oral compositions. Other oral compositions contemplated are sublingual or buccal films or tablets comprising a compound of the invention.

In certain embodiments, the pharmaceutical compositions described herein further comprises a stabiliser, in order to prevent the degradation of the active compound and to provide a longer shelf life. It may be that the stabiliser is an antioxidant, a chelating compound or a photo-protective compound, or a combination thereof. Suitably, the pharmaceutical compositions described herein further comprises an antioxidant. It may be that the antioxidant is selected from the group consisting of ascorbyl palmitate, ascorbic acid, butylated hydroxyanisol, butylated hydroxytoluene, potassium metabisulphite, sodium metabisulphite, propyl gallate and vitamin E. Preferably, the pharmaceutical composition described herein further comprises vitamin E.

The stabiliser (e.g. vitamin E), when present, may be in an amount of from about 0.01% to 15% by weight of the composition. For example, from 0.1 to 10%, from 0.1 to 5%, from 0.1 to 2% or from 0.1 to 1% by weight of the composition.

It may be that a compound of the invention is present in an amount of up to about 90% by weight of the composition, for example up to 80%, up to 70%, up to 60%, up to 50%, up to 40%, up to 30% up to 20% or up to 10% by weight of the composition. It may be that a compound of the invention is present in an amount of about 40% or less by weight of the composition. For example, from about 0.001% to about 40%; from about 0.1% to about 40%, from about 1% to about 40%, from about 0.1% to about 30%, from about 0.1% to about 25%, from about 0.1% to about 20%, from about 0.1% to about 10%, from about 0.1% to about 5%, about 1% to about 30%, from about 1% to about 25%, from about 1% to about 20%, from about 1% to about 10%, from about 1% to about 5% by weight of the composition. It may be that the compound of the invention is present in an amount of 0.001% by weight of the composition. It may be that the compound of the invention is present in an amount of 0.01% by weight of the composition. It may be that the compound of the invention is present in an amount of 0.05% by weight of the composition. It may be that the compound of the invention is present in an amount of 0.1% by weight of the composition. It may be that the compound of the invention is present in an amount of 0.5% by weight of the composition. It may be that the compound of the invention is present in an amount of 1% by weight of the composition.

It may be that the compound of the invention is present in an amount of 2% by weight of the composition. It may be that the compound of the invention is present in an amount of 5% by weight of the composition. It may be that the compound of the invention is present in an amount of 10% by weight of the composition. It may be that the compound of the invention is present in an amount of 15% by weight of the composition. It may be that the compound of the invention is present in an amount of 20% by weight of the composition. It may be that the compound of the invention is present in an amount of 25% by weight of the composition. It may be that the compound of the invention is present in an amount of 30% by weight of the composition. It may be that the compound of the invention is present in an amount of 35% by weight of the composition. It may be that the compound of the invention is present in an amount of 40% by weight of the composition.

In some embodiments the compound of the invention is present in the pharmaceutical composition as the free acid form of the compound and is present in an amount of up to 20% by weight of the composition, for example up to 15%, up to 10%, up to 8%, up to 7%, up to 6% or up to 5% by weight of the composition. Thus it may be that a pharmaceutical composition described herein comprises the compound of the invention in the free acid form in an amount of 0.1% to 20%, 0.5% to 15%, 0.5% to 10%, or 0.5% to 5% by weight of the composition.

When the compound of the invention is formulated in the form of a pharmaceutically acceptable salt, the compound generally has a higher solubility and may be present in the composition in higher amounts than the free acid form of the compound. Accordingly in some embodiments the compound of the invention is present in the pharmaceutical composition as a pharmaceutically acceptable salt of the compound (e.g. a sodium salt) and is present in an amount of up to 30% by weight of the composition, for example up to 25%, up to 20%, up to 15%, up to 10%, up to 8%, up to 7%, up to 6% or up to 5% by weight of the composition.

Thus it may be that a pharmaceutical composition described herein comprises the compound of the invention in the form of a pharmaceutically acceptable salt of the compound (e.g. a sodium salt) in an amount of 0.1% to 40%, 0.1% to 30%, 0.1% to 25%, 0.1 to 24%, 0.1 to 20%, 0.5 to 15%, 0.5 to 10%, or 0.5 to 5% by weight of the composition.

Permeation Enhancers

Where the pharmaceutical composition of the invention is a topical composition, the composition optionally comprises one or more permeation enhancers (also known as absorption enhancers or penetration enhancers) for transdermal drug delivery. Suitable penetration enhancers include the transdermal absorption enhancers disclosed in for example Smith and Maibach (2005) Percutaneous Penetration Enhancers, Second Edition ISBN 9780849321528, incorporated herein by reference.

Accordingly also provided is a pharmaceutical composition comprising a compound of the invention or a pharmaceutically acceptable salt thereof and a permeation enhancer.

In some embodiments the compound of the invention is dissolved or dispersed in the permeation enhancer. In some embodiments the pharmaceutical composition is a topical pharmaceutical composition, for example in the form of a gel or cream or lotion comprising the compound of the invention and permeation enhancer. In other embodiments the composition further comprises a matrix in which the compound of the invention and the absorption enhancer are dissolved or dispersed. For example the composition of the invention may be dissolved or dispersed in a polymeric matrix, wherein said matrix is applied to the skin of a subject directly or as part of a dressing or transdermal patch. Thus in particular embodiments pharmaceutical composition comprises an adhesive matrix, a compound of the invention or a pharmaceutically acceptable salt thereof and a permeation enhancer.

In certain embodiments the pharmaceutical composition of the invention comprises a permeation enhancer selected from one or more of: fatty acids, aromatic organic acids, fatty alcohols, aromatic alcohols, terpenes, polyols, cyclic oligosaccharides, alkyl ethers, aryl ethers, aromatic fatty acid esters and alkyl esters. In certain embodiments the permeation enhancer comprises a nicotinate (e.g. methyl nicotinate, benzyl nicotinate, 2-butoxyethyl nicotinate, isobutyl nicotinate, n-butyl nicotinate, 1-carbamoylethyl nicotinate or phenyl nicotinate). In certain embodiments the permeation enhancer comprises a fatty acid, for example oleic acid, undecanoic acid, valeric acid, heptanoic acid, pelargonic acid, capric acid, caprylic acid, caproic acid, lauric acid, eicosapentaenoic acid, myristic acid, palmitic acid, stearic acid, linoleic acid or linolenic acid. In some embodiments the permeation enhancer comprises a fatty alcohol, for example octanol, nonanol, decyl alcohol, lauryl alcohol, myristyl alcohol, oleyl alcohol or cetyl alcohol. In some embodiments the permeation enhancer comprises a fatty acid ester, for example, methyl laurate, isopropyl myristate, myristyl myristate, octyldecyl myristate, cetyl palmitate, isopropyl palmitate, sorbitan monooleate, glycerol monolaurate, glycerol monooleate, propylene glycol monolaurate, sorbitan monolaurate, sucrose monolaurate, polysorbate 20, polyethylene glycol monolaurate, polyethylene glycol monostearate. In some embodiments the permeation enhancer comprises a terpene, for example menthol, thymol, limonene, and terpineol. In some embodiments the permeation enhancer comprises a polyol, for example, propylene glycol, polyethylene glycol, glycerol or a glycol ether, for example 2-(2-ethoxyethoxy)ethanol. In some embodiments the permeation enhancer comprises an ester, for example an alkyl ester such as ethyl acetate. In some embodiments the permeation enhancer is a surfactant, preferably a non-ionic surfactant. In some embodiments the permeation enhancer is selected from a glycol, a glycol ether and an alkyl ester. For example it may be that the permeation enhancer is selected from a polyethylene glycol, propylene glycol, ethyl acetate and 2-(2-ethoxyethoxy)ethanol. The permeation enhancer may be a single agent or a combination of two or more agents, for example two or more of the permeation enhancers described herein. As will be recognised certain components of the pharmaceutical compositions described herein may function as both an organic solvent and as a permeation enhancer. For example, a glycol such as propylene glycol or a glycol ether such as 2-(2-ethoxyethoxy)ethanol present in any of the pharmaceutical compositions described herein may function as both a solvent and permeation enhancer for the compound of the invention.

In certain embodiments the absorption enhancer is selected from a fatty acid ester and an aliphatic alcohol. Accordingly in certain embodiments the absorption enhancers is selected from one or more of isopropyl palmitate, propylene glycol monolaurate and oleyl alcohol. In certain embodiments the absorption enhancer is 2-(2-ethoxyethoxy)ethanol (Transcutol).

In certain embodiments the penetration enhancer is selected from oleic acid, oleyl alcohol, lauryl alcohol, lauryl acetate, lauryl lactate, ethyl acetate, dimethyl isosorbide, isostearic acid and linoleic acid.

Suitably the penetration enhancer is present in an amount of about 0.1% to 25% by weight of the pharmaceutical composition of the invention, for example from about 0.1% to 20%, from about 1% to 10%, or about 1% to 5% by weight of the pharmaceutical composition of the invention.

Optional Components

The pharmaceutical compositions of the invention optionally further comprise one or more excipients selected from viscosity modifying agents, emulsifiers, surfactants, humectants, oils, waxes, additional solvents, preservatives, pH modifying agents (for example a suitable acid or base, for example an organic acid or organic amine base), buffers, antioxidants (for example butylated hydroxyanisol, butylated hydroxytoluene or vitamin E), crystallisation inhibitors (for example a cellulose derivative such as hydroxypropylmethyl cellulose), colorants, and fragrances. Representative examples of such additional excipients are well known, for example as listed in the Handbook of Pharmaceutical Excipients, $7^{th}$ Edition, Rowe et al.

Examples other components which may be present in any of the pharmaceutical compositions of the invention, for example compositions suitable for topical administration, include, for example:

Oils
- Plant oils (e.g. sunflower oil, olive oil, peanut oil, corn oil, almond oil, cottonseed oil, sesame oil, soybean oil, canola, oil, castor oil, hydrogenated castor oil, and hydrogenated vegetable oil); animal oils (e.g. fish liver oil and omega 3 lipids); mineral oils; silicone oil (e.g. dimethicone, simethicone or cyclomethinone); medium chain triglycerides;
- Fatty acid esters and ethers: e.g.; ethyl oleate; ethylene glycol palmitostearate; glyceryl esters such as glycerol behenate, glyceryl monooleate, glyceryl monostearate, and glyceryl palmitostearate; fatty alcohols (e.g. stearoyl alcohol or stearyl alcohol); isopropyl myristate; isopropyl palmitate;
- Semisolid materials: e.g. cholesterol, ergosterol, lanolin and lanolin alcohols, petrolatum; solid fatty materials, such as tallow and lard; waxes, such as paraffin, beeswax, carnuba wax, microcrystalline wax, and non-ionic and anionic emulsifying wax;
- Lipids: e.g. lysolipids, phospholipids, phosphatidylcholines (e.g. lecithin);
- Plasticisers: e.g. dibutyl phthalate; dibutyl sebacate;
- Surfactants: for example, ionic and non-ionic surfactants: e.g. poloxomers, polyoxyethylene castor oil derivatives, polyoxyethylene sorbitan fatty acid esters, polyoxyethylene stearates or sorbitan esters; alkyl sulfonates (e.g. SDS);
- Polymers and resins: e.g. crosprovidone; polyethylene oxide; polyvinyl alcohol, polyvinylpyrrolidine, polyacrylamide, silicone, hydrophobic resins, gums (e.g. locust bean gum, guar gum or xanthan gum) gelatin, alginates cellulose derivatives (e.g. hydroxypropyl methyl cellulose, hydroxyethyl cellulose, ethylcellulose, microcrystalline cellulose) carboxyvinylpolymers (carbomers);
- Soaps: e.g. magnesium stearate and zinc stearate;

and combinations thereof.

Transdermal Delivery Via a Patch or Dressing

In certain embodiments, the compound of the invention, or a pharmaceutically acceptable salt thereof, is administered to a subject via dressing or transdermal patch applied to the skin of a subject. In certain embodiments there is provided a transdermal patch comprising a compound of the invention or a pharmaceutical composition of the invention.

It may be that a transdermal patch described herein may comprise a pharmaceutical composition of the invention, for example it may be that the transdermal patch comprises a topical pharmaceutical composition of the invention as described herein.

Suitably the transdermal patch comprises one or more layers, wherein at least one of the one or more layers of the transdermal patch comprises a compound of the invention, or a pharmaceutical composition of the invention. Suitably, at least one of the one or more layers of the transdermal patch comprises a pharmaceutical composition of the invention suitable for topical application, for example any of the formulations described herein.

In certain embodiments, the transdermal patch comprises one layer. It may be that the one layer is an adhesive layer comprising a compound of the invention, or a pharmaceutical composition of the invention, wherein the adhesive layer has a first surface that contacts the skin during use.

In certain embodiments, the transdermal patch comprises a backing layer (substrate) and one or more layers selected from the group consisting of an adhesive layer, a membrane layer and a reservoir layer.

In certain embodiments, the transdermal patch comprises at least two layers. It may be that the at least two layers comprise an adhesive layer and a backing layer, wherein the adhesive layer has a first surface that contacts the backing layer and a second opposing surface that contacts the skin during use.

In certain embodiments, the transdermal patch comprises at least three layers. It may be that the at least three layers comprise an adhesive layer, a reservoir layer and a backing layer, wherein the adhesive layer has a first surface that contacts the reservoir layer and a second opposing surface that contacts the skin during use. Similarly, the reservoir layer has a first surface that contacts the backing layer, and a second opposing surface that contacts adhesive the layer.

In certain embodiments, the transdermal patch comprises at least four layers. It may be that the at least four layers comprise an adhesive layer, a membrane layer, a reservoir layer and a backing layer, wherein the adhesive layer has a first surface that contacts the membrane layer and a second opposing surface that contacts the skin during use. Similarly, the membrane layer has a first surface that contacts the reservoir layer, and a second opposing surface that contacts the adhesive layer. Further, the reservoir layer has a first surface that contacts the backing layer and a second opposing surface that contacts the membrane layer.

In certain embodiments, the membrane layer controls the rate of release of the active (e.g. the compound of the invention, or a pharmaceutically acceptable salt thereof, or a pharmaceutical composition of the invention) from the reservoir layer.

In certain embodiments, the adhesive layer comprises a pharmaceutically acceptable adhesive. In certain embodiments the compound of the invention is dispersed or dissolved in the adhesive layer and the compound of the invention is delivered to the skin through the adhesive layer. In certain embodiments the adhesive layer is substantially free from a compound of the invention. In this embodiment the adhesive layer may be configured to surround a reservoir/membrane layer, wherein the adhesive acts to bond the patch to the skin of a subject and the compound of the invention is delivered to the skin via the reservoir/membrane layer.

In certain embodiments, the transdermal patch comprises one layer, wherein the one layer is an adhesive layer comprising a compound of the invention, or a pharmaceutical composition of the invention, and wherein the adhesive layer has a first surface that contacts the skin during use. In certain embodiments, the compound of the invention is dispersed or dissolved in the one adhesive layer and the compound of the invention is delivered to the skin through the adhesive layer. In some embodiments the adhesive layer comprises an adhesive, a compound of the invention and a permeation enhancer. Suitably the permeation enhancer is one or more of the permeation enhancers described herein.

In certain embodiments, the transdermal patch comprising a compound of the invention or a pharmaceutical composition of the invention is applied to the skin of a subject for up to 6 months. It may be that the transdermal patch is applied to the skin of a subject for 1 day, 2 days, 3 days, 4 days, 5 days, 6 days, 7 days, 10 days, two weeks, 3 weeks, 1 month, 6 weeks, 2 months, 3 months, 4 months, 5 months or 6 months. For example, it may be that the transdermal patch is applied to the skin of a subject for 7 days.

Adhesives

The adhesive used for the adhesive layer of the transdermal patch preferably provides long lasting adhesion to the skin (e.g. up to 7 days), a high degree of flexibility, a permeability to moisture, and compatibility with the compounds of the invention. Suitably the adhesive is a pressure-sensitive adhesive. Preferred pressure sensitive adhesives provide a material that adheres with finger pressure. Suitably the pressure sensitive adhesive when in contact with the skin, is "self-adhesive", such that it provides sufficient adhesion to the that typically no further aid for fixation of the transdermal patch to the skin is required.

In some embodiments the adhesive comprises a polymeric pressure-sensitive adhesive. For example, the pressure-sensitive adhesive may comprise a polymer selected from a silicone polymer (e.g. a polysiloxane), polyisobutylene, polyacrylate and copolymers or mixtures thereof. In some embodiments the adhesive comprises a polysiloxane or polyisobutylene. These pressure-sensitive adhesives may provide for suitable tack for quick bonding to various skin types, including wet skin.

In certain embodiments the pressure-sensitive adhesive comprises a polyisobutylene adhesive. Suitably the polyisobutylene comprises a blend of a high molecular weight polyisobutylene (about 450,000 to 4,000,000 viscosity average molecular weight) and a low molecular weight polyisobutylene (about 40,000 to 450,000 viscosity average molecular weight).

In certain embodiments the pressure-sensitive adhesive comprises a polyacrylate adhesive. The polyacrylate adhesive are suitably obtained by copolymerizing one or more acrylate monomers (e.g. acrylates, acrylamides and methacrylates), one or more modifying monomers, and one or more functional group-containing monomers in an organic solvent. Suitably the acrylate monomers comprise alkyl acrylates of 4-17 carbon atoms (e.g. 2-ethylhexyl acrylate, butyl acrylate, and isooctyl acrylate). The modifying monomers alter the glass transition temperature of the resulting polymer and include vinyl acetate, ethyl acrylate and methacrylate, and methyl methacrylate. Such monomers may be further functionalized to provide functional group containing monomers comprising e.g. one or more carboxy or hydroxy functional groups (e.g. acrylic acid, methacrylic acid and hydroxyethyl acrylate).

In certain embodiments the pressure-sensitive adhesive is a polyacrylate based pressure-sensitive adhesive. Polyacrylate based pressure-sensitive adhesives are commercially available, e.g. under the trademark DURO-TAK®, especially the 87 series such as DURO-TAK 87-2051. It may be that the polyacrylate based pressure-sensitive adhesive is DURO-TAK 87-2051.

In certain embodiments the pressure-sensitive adhesive comprises a silicone adhesive, for example pressure sensitive adhesives prepared from silicone polymer and resin. The polymer to resin ratio can be varied to achieve different levels of tack, for example a polymer to resin ratio in the range of about 80:20 to about 20:80. Suitably the silicone adhesive further comprises a plasticiser, for example comprising a mineral oil and/or silicone fluid (e.g. dimethicone).

The adhesive layer in the patch optionally further comprises a plasticiser, which may also function as a tackifier to increase the adhesiveness/tackiness of the adhesive layer. Suitably, the plasticiser/tackifier comprises an inert, organic, apolar, hydrophobic liquid, for example selected from selected from polybutene, silicone oils, glycerine esters of hydrogenated resin acids, hydroabietyl alcohol, resin esters, hydrogenated methyl ester of wood rosin, esters of partially hydrogenated wood rosin and rosin esters, long-chain aliphatic esters and alcohols (e.g. polybutene, octyl palmitate, isobutyl stearate, isopropyl palmitate, isostearyl alcohol or oleyl alcohol) and an oil (e.g. mineral oil, linseed oil, olive oil silicone oil or squalane.

In those embodiments where the compound of the invention is dispersed or dissolved in the adhesive layer, the adhesive (e.g. pressure sensitive adhesive) is present in an amount of about 45 to 75% by weight of the adhesive layer.

In those embodiments where the compound of the invention is dispersed or dissolved in the adhesive layer, the adhesive layer may comprise an adhesive (e.g. pressure sensitive adhesive) and a pharmaceutical composition of the invention. The pharmaceutical may be any of the pharmaceutical compositions described herein comprising a compound of the invention. In certain embodiments the adhesive layer comprises a compound of the invention, an adhesive (e.g. pressure sensitive adhesive) and a permeation enhancer. The permeation enhancer may be any of the permeation enhancers described herein.

In certain embodiments, the transdermal patch further comprises a peelable release liner that extends across substantially all of the surface of the adhesive layer that contacts the skin during use, wherein said release liner can be removed to expose the surface of the adhesive layer prior to application of the transdermal patch to the skin.

The release liner is typically disposed on an opposite surface of the transdermal patch (i.e. the second surface of the adhesive layer) to the backing layer and provides a removable protective or impermeable layer, usually but not necessarily rendered non-stick so as to not adhere to the adhesive layer. The release liner serves to protect the adhesive layer during storage and transit, and is intended to be removed prior to application to the skin. The release liner may be formed from the same materials used for the backing layer, but may be formed from metal foils, Mylar®, polyethylene terephthalate, siliconised polyester, fumed silica in silicone rubber, polytretrafluoroethylene, cellophane, siliconised paper, aluminised paper, polyvinyl chloride film, composite foils or films containing polyester such as polyester terephthalate, polyester or aluminised polyester, polytetrafluoroethylene, polyether block amide copolymers, polyethylene methyl methacrylate block copolymers, polyurethanes, polyvinylidene chloride, nylon, silicone elastomers, rubber-based polyisobutylene, styrene, styrene-butadiene, and styrene-isoprene copolymers, polyethylene, and polypropylene.

Suitably, the release liner is an occlusive or semi-occlusive backing film being compatible with the pharmaceutically acceptable adhesive present in the adhesive layer.

Suitably, the backing layer is occlusive. The backing layer may be of any thickness, but is suitably between about 2.5 µm to 2.5 mm thick. Suitable materials include, but are not limited to, synthetic polymers including, for example, polyesters, polycarbonates, polyimides, polyethylene, poly(ethylene terephthalate), polypropylene, polyurethanes and polyvinylchlorides. The backing layer may also be a laminate comprising additional layers that may include vapour deposited metal, such as aluminium, additional synthetic polymers, and other materials, to enable a heat seal, such as EVA copolymer.

In certain embodiments, the compound of the invention, or a pharmaceutically acceptable salt thereof, or a pharmaceutical composition of the invention, is present in a reservoir layer in the patch. It may be that the reservoir layer is disposed between at least two layers of the transdermal patch, for example the backing layer and the adhesive layer. It may be that the reservoir layer is disposed between at least two layers of the transdermal patch, for example the backing layer and the membrane layer. Alternatively, it may be that the reservoir layer is in direct contact with the skin.

In certain embodiments, the reservoir layer comprises a pharmaceutical composition comprising a compound of the invention as defined herein (e.g. a topical pharmaceutical composition comprising a compound of the invention described herein). In certain embodiments, the reservoir layer comprises an aqueous or non-aqueous topical pharmaceutical composition as defined herein. It may be that the reservoir layer comprises a non-aqueous topical pharmaceutical composition. Preferably, the non-aqueous topical pharmaceutical composition comprises propylene glycol.

In other embodiments, the reservoir layer comprises an aqueous or, preferably, non-aqueous gel comprising a compound of the invention and a gel forming agent. The gel forming agent may be any suitable gel-forming agent, including, but not limited to any of the gel forming agents described herein.

In certain embodiments, the compound of the invention, or a pharmaceutical composition of the invention, is dissolved or dispersed in the adhesive layer. It may be that the adhesive layer comprising the compound of the invention, or a pharmaceutically acceptable salt thereof, is in direct contact with the skin. It may be that the transdermal patch comprises at least two layers, for example, a backing layer and an adhesive layer, wherein the adhesive layer further comprises the compound of the invention.

The amount of the compound of the invention, in the transdermal patch will depend on how much of said compound is required in order to achieve the desired therapeutic effect. Typically, the compound of the invention is present in an amount of about 1 to about 40% w/w in the adhesive or reservoir layer. For example, the compound of the invention is present in an amount of about 1 to about 30%, for example 1 to 25%, 1 to 20%, or 1 to 10% w/w in the adhesive layer. Also contemplated are patches wherein the compound of the invention is present in both an adhesive layer and a reservoir layer. In this embodiment the compound on the invention may be present in an amount of about 1 to 20% (e.g. 1 to about 10%) w/w in the adhesive layer and about 1 to 20% (e.g. about 10%) w/w of the reservoir layer.

In certain embodiments, the compound of the invention is present in an amount of about 1% to about 25% w/w of the adhesive layer. It may be that the amount of said compound present is about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25% w/w of the adhesive layer. It may be that the amount of said compound present is about 2.5% to about 20% w/w of the adhesive layer. It may be that the amount of said compound present is about 5% to about 15% w/w of the adhesive layer.

In certain embodiments, the compound of the invention is present in an amount of about 1% to about 6% w/w of the transdermal patch. Suitably, the amount of said compound present is about 2% to about 5% w/w, more suitably about 2% to about 4% w/w, and most suitably about 2% to about 3% w/w of the transdermal patch.

In certain embodiments, the transdermal patch comprises one layer, wherein the one layer is an adhesive layer, and wherein the compound of the invention is present in an amount of about 1% to about 25% w/w of the adhesive layer, for example from about 1 to about 20%, or about 1 to about 10% w/w of the adhesive layer. In certain embodiments, the compound of the invention is present in an amount of about 2% to about 8% w/w of the adhesive layer. Suitably, the amount of said compound present is about 3% to about 7% w/w, more suitably about 4% to about 6% w/w, and most suitably about 5% w/w of the adhesive layer.

In another embodiment, the compound of the invention is present in the transdermal patch in a non-salt form, i.e. as the free acid. In certain embodiments, the compound of the invention is present in the transdermal patch in a non-salt form, i.e. as the free acid, in an amount of about 1% to about 10% w/w of the transdermal patch. It may be that the compound of the invention is present in an amount of about 1% to 10% w/w (e.g. from about 2% to about 8% w/w) of an adhesive layer comprising the patch, wherein the compound of the invention is in a non-salt form, i.e. as the free acid. Suitably, the amount of said compound present is about 3% to about 7% w/w, more suitably about 4% to about 6% w/w, and most suitably about 5% w/w of the adhesive layer in a non-salt form, i.e. as the free acid.

In certain embodiments, the transdermal patch comprises one adhesive layer, wherein the adhesive layer comprises a polyacrylate based pressure-sensitive adhesive. It may be that the polyacrylate based pressure-sensitive adhesive comprises DURO-TAK 87-2051. It may be that the adhesive layer comprises a polyacrylate based pressure-sensitive adhesive (e.g. DURO-TAK 87-2051), hexane, and the compound of the invention, wherein the compound of the invention is present in the adhesive layer as the free acid, in an amount of about 1% to about 20% w/w of the adhesive layer. Suitably, the amount of said compound present in about 1 to about 10% w/w, or about 2% to about 8% w/w, more suitably about 4% to about 6% w/w, and most suitably about 5% w/w of the adhesive layer.

In another embodiment, the compound of the invention is present in the transdermal patch in a salt form. For example, it may be that the compound of the invention is present in the transdermal patch as a disodium salt. In certain embodiments, the compound of the invention is present in the transdermal patch in a salt form in an amount of about 1% to about 25% w/w of the transdermal patch. It may be that the compound of the invention is present in an amount of about 1% to 25% (e.g. about 3% to about 23% w/w) of an adhesive layer comprising the transdermal patch, wherein the compound of the invention is in the form of a pharmaceutically acceptable salt. Suitably, the amount of said compound present is about 5% to about 20% w/w, more suitably about 8% to about 17% w/w, and most suitably about 13% w/w of an adhesive layer comprising the transdermal patch.

It may be that the transdermal patch comprises one adhesive layer, wherein the adhesive layer is a polyacrylate based pressure-sensitive adhesive. It may be that the polyacrylate based pressure-sensitive adhesive comprises DURO-TAK 87-2051, ethyl acetate, and the compound of the invention, wherein the compound of the invention is present in the adhesive layer as a disodium salt, in an amount of about 1% to about 25% w/w of the transdermal patch. Suitably, the amount of said compound present is about 5% to about 20% w/w, more suitably about 8% to about 17% w/w, and most suitably about 13% w/w of the transdermal patch in a salt form.

In certain embodiments, there is provided a transdermal patch comprising a pharmaceutical composition of the invention (e.g. a topical pharmaceutical composition) as described herein, may further comprise one or more permeation enhancers for transdermal drug delivery, for example one or more of the permeation enhancers described herein. Accordingly, in certain embodiments the transdermal patch comprises a compound of the invention and a permeation enhancer selected from oleic acid, oleyl alcohol, lauryl alcohol, lauryl acetate, lauryl lactate, ethyl acetate, dimethyl isosorbide, isostearic acid and linoleic acid. In certain embodiments the transdermal patch comprises a compound of the invention and a permeation enhancer selected from a polyol, for example, propylene glycol, polyethylene glycol or glycerol. In certain embodiments the transdermal patch comprises a compound of the invention and 2-(2-ethoxyethoxy)ethanol. In certain embodiments the transdermal patch comprises a compound of the invention and propylene glycol. In certain embodiments the transdermal patch comprises a compound of the invention and ethyl acetate.

In those embodiments where the transdermal patch comprises a permeation enhancer in a total amount by weight of about 0.1% to about 15% w/w of the transdermal patch. In an embodiment, one or more pharmaceutically acceptable permeation enhancers are present in a total amount by weight between about 2% and about 12% w/w of the transdermal patch, or between about 4% and about 10% w/w, or between about 4% and about 7% w/w, or between about 4% and about 6% w/w, or between about 4.5% and about 5.5 w/w, or between about 4% and about 5% w/w, or about 5% w/w of the transdermal patch.

In certain embodiments, the transdermal patch further comprises hydrophilic materials which aid absorption of the compound of the invention into the skin and/or enhance the solubility of said compound in the excipients present in the patch, for example within the adhesive and/or reservoir layer(s) of the patch. Suitably, the hydrophilic material, and the quantities in which it is added, should be non-toxic, non-irritating, non-allergenic, and compatible with said compound of the invention and the other excipients described herein.

In certain embodiments, the hydrophilic material will have a surfactant (for example a non-ionic surfactant), preferably a surfactant with a hydrophilic-lipophilic balance (HLB) of greater than 7. Other examples of hydrophilic materials which may be incorporated into the patch include, but are not limited to, propylene glycol, dipropylene glycol, glycerol, polyethylene glycol, short chain water soluble esters of citric acid, acetic acid, hexylene glycol and alcohols, including diols and polyols. In certain embodiments, the hydrophilic material incorporated into the patch is propylene glycol or dipropylene glycol.

In certain embodiments the hydrophilic material comprises a hydrophilic polymer. The hydrophilic polymer may, for example, provide a means to absorb aqueous constituents (e.g. sweat) from the skin, and/or to improve the adhesive (e.g., tack, cohesive strength) of the adhesive composition present in the patch. Examples of hydrophilic polymers which may be present in the patch include cellulose derivatives (,e.g. carboxymethyl cellulose, carboxymethyl cellulose sodium, methyl cellulose, hydroxypropylmethyl cellulose, cellulose acetate phthalate, hydroxypropyl cellulose or hydroxyethyl cellulose), starch derivatives (e.g. pullulan), polyvinyl alcohol, polyvinylpyrrolidone, crosslinked polyvinylpyrrolidone, polyvinyl acetate, carboxyvinyl polymer, ethylvinyl acetate copolymer, gelatin, polyacrylic acid, sodium polyacrylate, polyisobutylene-maleic anhydride copolymer, alginic acid, sodium alginate, carrageenan, Arabian gum, tragacanth gum, karaya gum and polyvinyl methacrylate.

In certain embodiments the hydrophilic polymer is present in an adhesive layer of the patch. In certain embodiments the hydrophilic polymer is present in a reservoir layer of the patch. In certain embodiments the hydrophilic polymer is present in a reservoir layer and an adhesive layer of the patch.

The hydrophilic material (e.g. hydrophilic polymer and/or surfactant) may be present in an amount of about 0.01% to about 20% by weight, and preferably about 1% to about 10% by weight of the transdermal patch. Suitably, when present, the hydrophilic material is present in an amount of between 1.0% w/w and 20% w/w of the patch. Suitably, the hydrophilic material, when present, is in an amount of between 0.5% w/w and 10% w/w, and more suitably between 1% w/w and 8% w/w of the patch.

A pharmaceutical composition comprising a compound of the invention and an adhesive forms a further aspect of the invention. In certain embodiments the pharmaceutical composition comprises 1% to 25% by weight of a compound of the invention and an adhesive.

In certain embodiment the pharmaceutical composition comprises:
1% to 25% a compound of the invention;
10% to 90% adhesive; and
0.1% to 20% permeation enhancer,
wherein all % are by weight of the composition.

In certain embodiments the pharmaceutical composition further comprises a stabiliser, for example one or more of the stabilisers described herein. Preferably the stabiliser is an antioxidant. More preferably the stabiliser is vitamin E. The stabiliser is suitable present in an amount of from 0.1 to 10% by weight of the composition.

In certain embodiments the pharmaceutical composition comprises:
1% to 20% a compound of the invention;
40% to 90% adhesive;
0.1% to 20% permeation enhancer; and
0 to 10% (e.g. 0.1 to 10%) antioxidant (e.g. vitamin E).
wherein all % are by weight of the composition.

In some embodiments the composition is a non-aqueous composition. In some embodiments the composition is an aqueous composition, wherein the composition further comprises water, for example from 5% to 50% by weight water.

The permeation enhancer is suitably one of more of the permeation enhancers described herein, for example propylene glycol or Transcutol.

In some embodiments the pharmaceutical composition comprises:
(i) a compound of the invention;
(ii) a permeation enhancer selected from propylene glycol, ethyl acetate and 2-(2-ethoxyethoxy)ethanol;
(iii) adhesive; and
(v) optionally an antioxidant, preferably vitamin E.

In some embodiments the pharmaceutical composition comprises:
(i) 1% to 20% (e.g. 1 to 15%) of a compound of the invention;
(ii) 0.1% to 20% of a permeation enhancer selected from propylene glycol, ethyl acetate and 2-(2-ethoxyethoxy) ethanol;
(iii) 10% to 90% (e.g. 40% to 90%) adhesive; and
(v) optionally an antioxidant, preferably vitamin E;
wherein all % are by weight of the composition.

In some embodiments the composition comprises:
(i) 1% to 20% (e.g. 1 to 15%) a compound of the invention;
(ii) 0.1% to 60% (e.g. 0.1 to 20%) ethyl acetate;
(iii) 0.1% to 10% 2-(2-ethoxyethoxy)ethanol;
(v) 10% to 90% (e.g. 40% to 90%) adhesive; and
(vi) 0.1% to 10% vitamin E;
wherein all % are by weight of the composition.

In some embodiments the adhesive composition comprises: (i) a compound of the invention; (ii) water; (iii) one of more organic solvents selected from: methanol, propylene glycol, ethyl acetate and 2-(2-ethoxyethoxy)ethanol; and (iv) an adhesive.

In some embodiments the pharmaceutical composition comprises:
(i) 1% to 20% (e.g. 1 to 15%) a compound of the invention;
(ii) 1% to 90% (e.g. 5% to 50%) water;
(iii) 1% to 90% (e.g. 1% to 50%) of one or more organic solvents selected from methanol and ethyl acetate;
(iv) 0.1% to 10% of a permeation enhancer, preferably 2-(2-ethoxyethoxy)ethanol; (v) 10% to 90% (e.g. 40% to 90%) of an adhesive; and
(vi) optionally an antioxidant, preferably vitamin E;
wherein all % are by weight of the composition.

In certain embodiments the adhesive composition comprises:
(i) 1% to 20% (e.g. 1 to 15%) of a compound of the invention;
(ii) 5% to 50% water;
(ii) 1% to 50% methanol;
(iv) 1% to 90% (e.g. 1% to 50%) of ethyl acetate;
(v) 0.1% to 10% 2-(2-ethoxyethoxy)ethanol;
(vi) 10% to 90% (e.g. 40% to 90%) of an adhesive; and
(vii) 0.1% to 10% vitamin E;
wherein all % are by weight of the composition.

The adhesive present in the pharmaceutical compositions described herein may be any adhesive suitable for use in transdermal patches, including any of the adhesives disclosed herein. For example, the adhesive may comprise a polyacrylate pressure-sensitive adhesive, such as a DURO-TAK® adhesive (e.g. DURO-TAK 87-2051).

The adhesive layer comprising the transdermal patch is suitably prepared using an adhesive composition comprising a compound of the invention, adhesive, an organic solvent, optionally a permeation enhancer and optionally a stabiliser. The adhesive composition forms a further aspect of the invention. The adhesive layer is suitably formed by casting the adhesive composition onto a suitable substrate (e.g. a tray) and allowing the organic solvent to evaporate, thereby providing the adhesive layer. The organic solvent may be evaporated under ambient conditions or under vacuum. Once formed the adhesive layer can be applied directly to the skin of a subject. Preferably however the adhesive layer is applied to other components of the transdermal patch, for example a suitable backing layer or one of the other transdermal patch configurations described herein. In some embodiments the substrate is a layer of a transdermal patch. For example, the adhesive composition may be cast directly onto a suitable backing layer and the organic solvent evaporated to provide a transdermal patch comprising an adhesive layer and a backing layer.

The organic solvent may be any of the organic solvents disclosed herein in relation to pharmaceutical compositions according to the invention. When the adhesive composition comprises a permeation enhancer (e.g. such as Transcutol), the organic solvent is suitably more volatile than the permeation enhancer.

In some embodiments the organic solvent used in the adhesive composition is selected from esters such as ethyl acetate, methyl acetate, isopropyl acetate and the like, a ketone such as acetone and the like, aliphatic or aromatic hydrocarbon solvents such as hexane, medium chain alkanes (e.g. heptane, octane, nonane, or decane), toluene, or xylene and the like, chlorinated hydrocarbons, for example trichloromethane and the like, or an organic nitrile such as acetonitrile. Preferably, the one or more organic solvents are selected from ethyl acetate, hexane and/or heptane.

Thus it may be that the adhesive composition comprises (i) a compound of the invention; (ii) an organic solvent selected from: propylene glycol, hexane, ethyl acetate and 2-(2-ethoxyethoxy)ethanol; and (iii) an adhesive.

The adhesive present in the adhesive compositions described herein may be any adhesive suitable for use in transdermal patches, including any of the adhesives disclosed herein. For example, the adhesive may comprise a polyacrylate pressure-sensitive adhesive, such as a DURO-TAK® adhesive (e.g. DURO-TAK 87-2051).

It may be that the adhesive composition comprises a compound of the invention, a polyacrylate pressure-sensitive adhesive (preferably DURO-TAK 87-2051) and ethyl acetate.

It may be that the adhesive composition comprises a compound of the invention, a polyacrylate pressure-sensitive adhesive (preferably DURO-TAK 87-2051) and heptane. It may be that the adhesive composition comprises a compound of the invention, a polyacrylate pressure-sensitive adhesive (preferably DURO-TAK 87-2051) and hexane.

Transdermal administration of a compound of the invention may also be achieved using a suitable dressing impregnated with a compound of the invention, or a pharmaceutical composition of the invention, wherein the dressing is applied to the skin of a subject. Also contemplated is the topical application of a pharmaceutical composition of the invention to the skin of a subject (e.g. as a gel, cream or lotion), wherein a suitable dressing is placed over the skin coated with the composition to prevent the composition rubbing off or evaporating. The dressing may be, for example, a bandage, tape, gauze, plater or similar wound dressing.

Uses and Applications

A compound of the invention may be used to treat any condition where increasing vitamin D levels in a subject would be beneficial. Accordingly in some embodiments the compound of the invention may be used non-therapeutically, for example as a vitamin supplement. In other embodiments the compound of the invention may be used as a therapeutic treatment of a disease or medical condition caused by, or associated, with low vitamin D levels in a subject.

It is to be understood that any reference herein to a compound or pharmaceutical composition for use in a treatment of a disease or condition is also intended to be a reference to (a) the use of the compound of the invention, or a pharmaceutical composition of the invention, for the manufacture of a medicament for the treatment of that disease or condition; and (b) a method of treating the disease or condition in a subject, the method comprising administering to the subject a therapeutically effective amount of the compound of the invention, or pharmaceutically acceptable salt thereof, or a pharmaceutical composition of the invention.

In accordance with another aspect there is provided a compound of the invention, or a pharmaceutical composition of the invention, for use in the treatment of vitamin D deficiency in a subject. In an embodiment, a compound of the invention, or a pharmaceutical composition of the invention, for use in the topical (e.g. transdermal) treatment of vitamin D deficiency in a subject.

In another aspect, there is provided a method of treating a vitamin D deficiency in a subject, the method comprising administering to the subject an effective amount of a compound of the invention, or a pharmaceutical composition of the invention. In an embodiment of the method, the compound or composition of the invention is administered topically to the subject. Preferably, transdermally (for example, via a transdermal patch or a via topical administration to the skin of a subject of a composition described herein).

In certain embodiments a compound of the invention or pharmaceutical composition of the invention is for use in the treatment of a symptom of vitamin D deficiency. In certain embodiments a compound of the invention or pharmaceutical composition of the invention is for use in the topical (e.g. transdermal) treatment of a symptom of vitamin D deficiency. In certain embodiments, the symptom of vitamin D deficiency treated by the compound or composition of the invention is selected from one or more of, for example, fatigue, bone pain, muscle weakness, muscle aches, and/or muscle cramps.

Subjects with vitamin D deficiency have reduced vitamin D levels compared to normal levels in healthy subjects. Accordingly, the compounds of the invention, or pharmaceutically acceptable salts thereof, or pharmaceutical compositions of the invention, may increase vitamin D levels in a subject. Thus, it may be that the compound or pharmaceutical composition of the invention provides a vitamin D supplement in a subject. It may be that the compound or pharmaceutical composition of the invention provides a non-therapeutic vitamin D supplement, for example by maintaining vitamin D levels in a patient within normal physiological ranges. It may be that the compound or pharmaceutical composition of the invention increases vitamin D levels in the subject without providing a therapeutic effect in the subject (e.g. without treating symptoms or medical conditions caused by or associated with vitamin D deficiency).

Also provided is a compound of the invention, or a pharmaceutical composition of the invention, for use in the treatment of a disease or disorder associated with (or mediated by) vitamin D deficiency. Thus it may be that the a compound of the invention, or a pharmaceutical composition of the invention, for use in the treatment of a disease or disorder wherein increasing vitamin D levels in a subject is beneficial. Also provided is a compound of the invention, or a pharmaceutical composition of the invention, for use in the topical (e.g. transdermal) treatment of a disease or disorder associated with (or mediated by) a vitamin D deficiency.

Examples of diseases and disorders associated with vitamin D deficiency that may be treated with a compound or composition of the invention include, for example, a cancer (e.g. breast cancer, colon cancer, prostate cancer, liver cancer), cardiovascular diseases, autoimmune diseases (e.g. multiple sclerosis, inflammatory bowel disease), bone metabolic disorders, diabetes, neuropsychiatric disorders (e.g. depression, Alzheimer disease, epilepsy, neurocognitive decline), liver diseases, chronic hepatitis C virus infection, non-alcoholic fatty liver disease (NAFLD), psoriasis, chronic kidney disease, osteoporosis, osteomalacia, rickets, tuberculosis and infectious diseases (Christakos, S. et al., (2016); Wang, H. et al., (2017) Vitamin D and Chronic Diseases, *Aging and Disease* vol. 8, 3 346-353).

The compound or composition of the invention may also be used as a non-therapeutic supplement to increase or maintain vitamin $D_3$ levels in a subject. Accordingly, also provided is the use of a compound or composition of the invention as a vitamin D supplement. Also provided is the use of a compound or composition of the invention as a vitamin supplement to increase or maintain vitamin $D_3$ levels in a subject. Also provided is a method of increase or maintain vitamin $D_3$ levels in a subject, the method comprising administering to the subject an effective amount of the compound or pharmaceutical composition of the invention.

In any of the uses and applications described herein the compound or pharmaceutical composition of the invention may be administered to the subject by any of the routes described herein. In some embodiments the compound or pharmaceutical composition of the invention is administered orally. In some preferred embodiments the compound or composition of the invention is administered topically, more preferably transdermally to the subject.

Dosages and Dosage Regimens

The compound or composition of the invention may, for example, administered (e.g. topically or orally) for a period selected from 1 day, 2 days, more than 3 days, 1 week, more than 1 week, more than 2 weeks, more than 3 weeks, more than 4 weeks, more than 6 weeks, more than 12 weeks, more than 6 months.

The frequency of administration (e.g. topical or oral administration) of a compound or composition of the invention will depend upon a number of factors that may readily be determined by a physician or nutritionist. Suitably, the compound or composition of the invention may be administered to the subject once per day, twice per day, once every other day or once per week or once per month, once every two months or once every six months. When the compound of the invention is administered transdermally using a transdermal patch, the patch will generally provide a dose of the compound over a prolonged period. Accordingly the frequency that a transdermal patch is applied to a subject may be, for example once per week, once every two weeks, once per month, once every two months, once every three months, or longer. For oral administration a compound or composition of the invention may be administered to a subject at a frequency of, for example, once per day, twice per day, once every other day or once per week. Also contemplated is oral administration once per month, once every two months or once every three months.

The dosage of the compound of the invention will vary depending upon a number of factors including, for example, the age, weight and gender of the subject and the nature of the condition being treated. Suitably, the compound is administered (for example topically) in a dose of less than about 600,000 IU (15 mg) of vitamin D. It may be that the compound is administered (for example topically) in a dose of about 500,000 IU (12.5 mg) of vitamin D. It may be that the compound is administered (for example topically) in a dose of about 400,000 IU (10 mg) of vitamin D. It may be that the compound is administered (for example topically) in a dose of about 300,000 IU (7.5 mg) of vitamin D. It may be that the compound is administered (for example topically) in a dose of about 200,000 IU (5 mg) of vitamin D. It may be that the compound is administered (for example topically) in a dose of about 100,000 IU (2.5 mg) of vitamin D. It may be that the compound is administered (for example topically) in a dose of less than about 100,000 IU (2.5 mg) of vitamin D, for example, about 300 IU (7.5 µg), 500 IU (12.5 µg), 1000 IU (25 µg), 5000 IU (125 µg), 10,000 IU (250 µg), 20,000 IU (500 µg) and 50,000 IU (1.25 mg) of vitamin D.

A suitable dosage for topical application can be readily determined by a physician. Suitably the composition of the invention is topically applied in an amount of from about 0.01 to about 10000 $mg/cm^2$, for example from about 0.1 to about 1000 $mg/cm^2$, preferably from about 1 to about 100 $mg/cm^2$.

Routes of Administration

The compound of the invention, or the pharmaceutical composition of the invention may be administered to a subject by any convenient route of administration, whether systemically, peripherally or topically (i.e. at the site of desired action).

Routes of administration include, but are not limited to, oral (e.g., by ingestion, tablets, sprays, solutions or suspensions etc.); buccal; sublingual; transdermal (including, e.g., by a patch, plaster, dressing etc.); transmucosal (including, e.g., by a patch, plaster, etc.); intranasal (e.g., by nasal spray); ocular (e.g., by eyedrops); pulmonary (e.g., by inhalation or insufflation therapy using, e.g., an aerosol, or powder e.g., through the mouth or nose, or using e.g. an inhaler or nebuliser); rectal (e.g., by suppository or enema); vaginal (e.g., by pessary); parenteral, for example, by injection, including subcutaneous, intradermal, intramuscular, intravenous, intraarterial, intracardiac, intrathecal, intraspinal, intracapsular, subcapsular, intraorbital, intraperitoneal, intratracheal, subcuticular, intraarticular, subarachnoid, and intrasternal; or by implant. Preferably the compound or compound of the invention are administered topically, more preferably transdermally to the subject.

The compound of the invention, or the pharmaceutical composition of the invention may be co-administered with calcium and/or other vitamins, such as oil-soluble vitamins. It may be that the compound of the invention, or the pharmaceutical composition of the invention is co-administered with calcium. It may be that the compound of the invention, or the pharmaceutical composition of the invention is co-administered with other vitamins, such as oil-soluble vitamins, for example one or more of vitamin A, E or K.

Method of Preparation

As described hereinbefore, the present invention also provides a process for the preparation of a compound of the invention.

In an embodiment, there is provided a process for the preparation of a compound of formula (II):

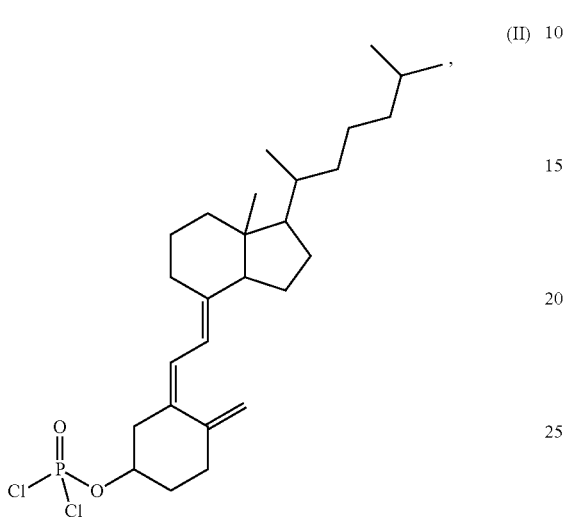

the process comprising:

Step (i) reacting vitamin $D_3$ with a phosphorylating agent in the presence of a suitable base, wherein the reaction is performed in the absence of water and under an inert atmosphere to provide a reaction mixture comprising the compound of formula (11).

Also provided is a process for the preparation of a compound of formula (I):

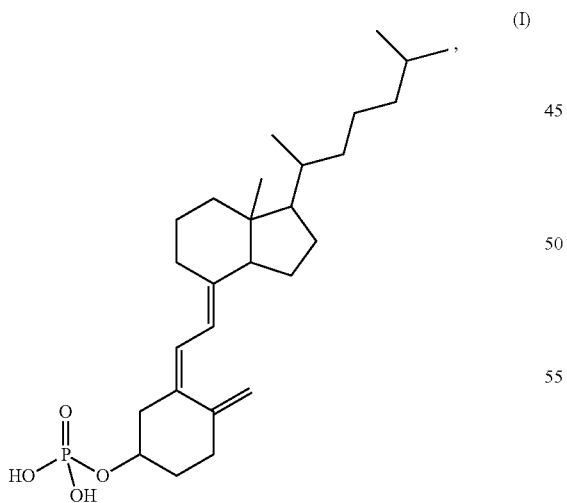

or a pharmaceutically acceptable salt thereof,
the process comprising:

Step (ii) contacting a compound of formula (II) with water for about 2 hours or less, to provide the compound of formula (I).

Also provided is a process for the preparation of a compound of formula (I):

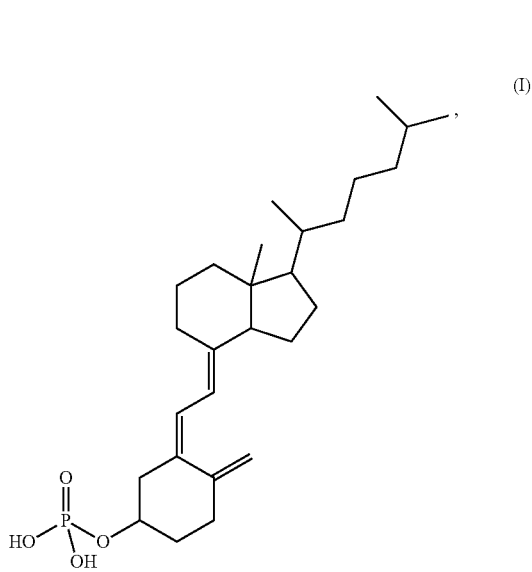 [SMILES: C=C1CCC(OP(=O)(O)O)C/C1=C/C=C1\CCCC2(C)C1CCC2C(C)CCCC(C)C]

or a pharmaceutically acceptable salt thereof,
wherein the process comprises the following steps:

Step (i) reacting vitamin $D_3$ with a phosphorylating agent in the presence of a suitable base, wherein the reaction is performed in the absence of water and under an inert atmosphere to provide a reaction mixture comprising a compound of formula (II); and then Step (ii) contacting the reaction mixture comprising the compound of formula (II) with water for about 2 hours or less; and then Step (iii) isolating the compound of formula (I).

As will be recognised when the "vitamin $D_3$" is used as the starting material in step (i), vitamin $D_3$ is a compound of the formula (111):

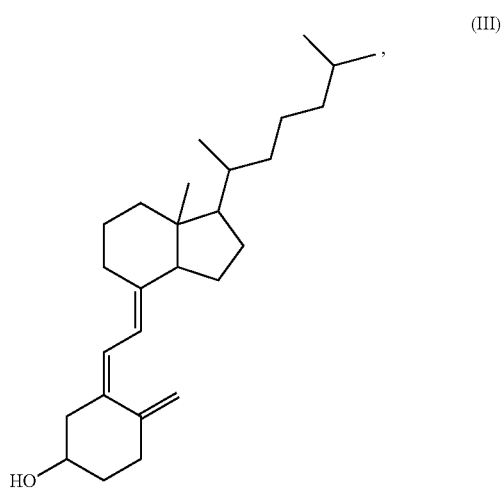 [SMILES: C=C1CCC(O)C/C1=C/C=C1\CCCC2(C)C1CCC2C(C)CCCC(C)C]

or a pharmaceutically acceptable salt thereof, thus the compound of the invention resulting from step (iii) of the process will be a compound of the formula (I):

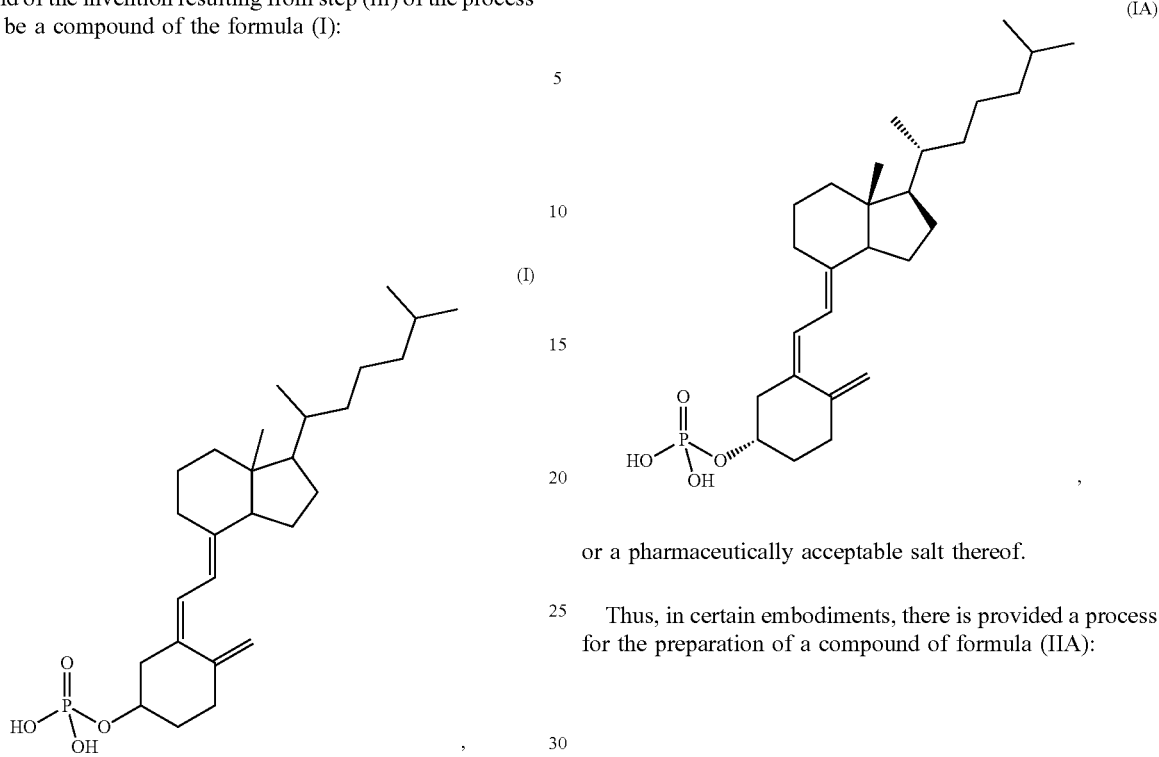

or a pharmaceutically acceptable salt thereof.

Preferably, the vitamin D$_3$ starting material used in step (i) is cholecalciferol of the formula (IIIA):

or a pharmaceutically acceptable salt thereof, and the compound of the invention resulting from step (iii) of the process is a compound of the formula (IA):

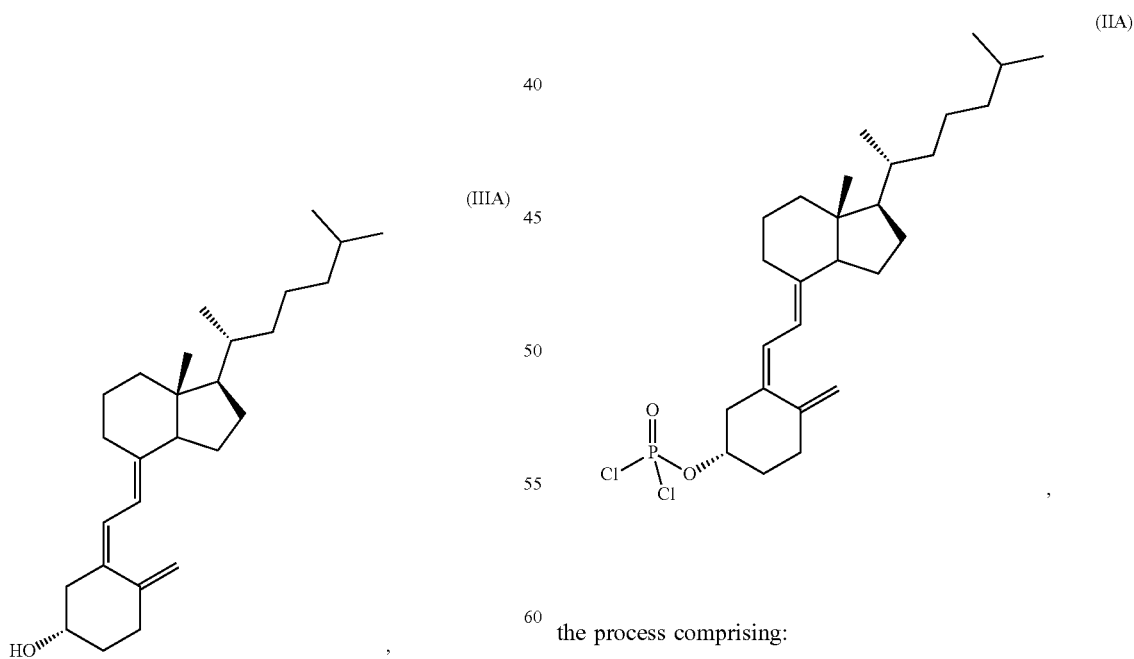

or a pharmaceutically acceptable salt thereof.

Thus, in certain embodiments, there is provided a process for the preparation of a compound of formula (IIA):

the process comprising:

Step (i) reacting vitamin D$_3$ with a phosphorylating agent in the presence of a suitable base, wherein the reaction is performed in the absence of water and under an inert atmosphere to provide a reaction mixture comprising the compound of formula (IIA).

In certain embodiments, there is provided a process for the preparation of a compound of formula (IA):

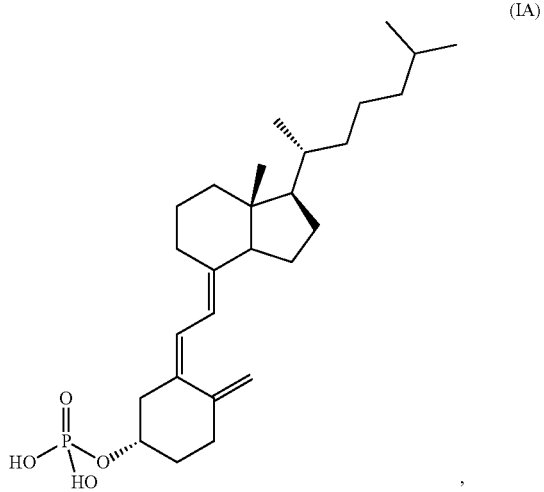

(IA)

or a pharmaceutically acceptable salt thereof,
the process comprising:
Step (ii) contacting a compound of formula (IIA) with water, to provide the compound of formula (IA); optionally wherein the compound of formula (IIA) is contacted with water for about 2 hours or less.

In certain embodiments, there is provided a process for the preparation of a compound of formula (IA), or a pharmaceutically acceptable salt thereof,
wherein the process comprises the following steps:
Step (i) reacting vitamin $D_3$ with a phosphorylating agent in the presence of a suitable base, wherein the reaction is performed in the absence of water and under an inert atmosphere to provide a reaction mixture comprising a compound of formula (IIA); and then
Step (ii) contacting the reaction mixture comprising the compound of formula (IIA) with water for about 2 hours or less; and then
Step (iii) isolating the compound of formula (IA).

In certain embodiments, the phosphorylating agent used in the processes described herein is selected from the group consisting of: phosphorus oxychloride, phosphorus oxybromide and phosphoric acid. Preferably, the phosphorylating agent is phosphorus oxychloride.

Step (i) is carried out under an inert atmosphere, such as, for example, a nitrogen or argon atmosphere, preferably under a nitrogen atmosphere. Suitably the atmosphere in step (i) of the process is substantially free from oxygen, for example less than 2%, less than 1%, less than 0.1%, less than 0.001% or less than 0.0001% oxygen is present in the reaction vessel during the reaction in step (i).

In certain embodiments, step (i) is performed in the presence of a solvent. Suitably the solvent is an organic solvent. It may be that the organic solvent is selected from the group consisting of, but is not limited to, ethers (e.g. tetrahydrofuran, 1,4-dioxane, diethyl ether, methyl-t-butylether); ketones (e.g. acetone and methyl isobutyl ketone); halogenated solvents (e.g. dichloromethane, chloroform and 1,2-dichloroethane); and amides (e.g. DMF, NMP); hexane; acetonitrile; DMSO; or mixtures thereof. In certain embodiments the solvent is a polar aprotic solvent, for example one or more solvent selected from an ether (e.g. tetrahydrofuran, (THF)), dimethylformamide (DMF), dimethylsulfoxide (DMSO) and acetonitrile. In certain embodiments the solvent is THF. In other embodiments, the solvent is hexane.

Step (i) of the process is carried out in the absence of water. Suitably the reaction mixture is substantially free from water, for example less than about 2%, less than 1%, less than 0.1% or less than 0.001% by weight water.

In certain embodiments, the suitable base is a nitrogen base. For example, a nitrogen base selected from N-alkylimidazoles, (e.g. N-methyl imidazole (NMI)), imidazole, optionally substituted pyridines, (e.g. collidine, pyridine, 2,6-lutidine) and a tertiary organic amine, for example a trialkylamine (e.g. triethylamine, and diisopropylethylamine). Alternatively, the base may be an organometallic base or metal hydride base (e.g. NaH, n-BuLi). Thus, the base may be a Grignard reagent (i.e. an alkylmagnesium halide). Exemplary Grignard reagents include t-butylmagnesium halides such as tBuMgCl, tBuMgBr, MeMgCl—LiCl. It may be that the base is a nitrogen base. Preferably, the base is a tertiary organic amine or pyridine. Still more preferably, the suitable base is a tertiary organic amine. Most preferably the base is a trialkylamine. In an especially preferred embodiment the base is triethylamine. In certain embodiments the base is not pyridine. In certain embodiments the base is not an organometallic base, for example the base is not an alkali metal oxide (e.g. lithium tert-butoxide).

In certain embodiments, in step (i), the phosphorylating agent is phosphorus oxychloride.

In certain embodiments, step (i) is performed in the presence of a solvent. Preferably, the solvent is tetrahydrofuran.

In certain embodiments, in step (i), the suitable base is triethylamine and the solvent is tetrahydrofuran.

In certain embodiments, in step (i), the phosphorylating agent is phosphorus oxychloride and the suitable base is triethylamine.

In certain embodiments, in step (i), the phosphorylating agent is phosphorus oxychloride, the suitable base is triethylamine and the solvent is tetrahydrofuran.

Step (i) is performed by reacting the vitamin $D_3$ directly with the phosphorylating agent (e.g. $POCl_3$). Accordingly, step (i) is performed without forming an alkali metal vitaminate (e.g. lithium vitaminate) prior to reaction with the phosphorylating agent.

In certain embodiments, step (i) is performed at about room temperature. It may be that step (i) may be performed at about 35° C. or less. It may be that step (i) may be performed at about 30° C. It may be that step (i) is performed at about 15° C. to about 25° C. It may be that step (i) is performed at 18° C. to 23° C. It may be that step (i) is performed at 19° C. to 22° C. It may be that step (i) is performed at 20° C. to 21° C. It may be that step (i) is performed at about 15, 16, 17, 18, 19, 20, 21, 22, 23, 24 or 25° C.

In certain embodiments, step (i) takes place over a period of about 5 hours or less. It may be that step (i) takes place over a period of about 1 hour to about 5 hours. It may be that step (i) takes place over a period of 1.5 h to 4 h. It may be that step (i) takes place over a period of 2 hours to 3.5 hours. It may be that step (i) takes place over a period of 2 hours to 3 hours. Preferably, it may be that step (i) takes place over a period of about 2.5 hours.

In certain embodiments, it may be that step (i) may be performed at about room temperature over a period of about 1 hour to about 5 hours. Suitably, it may be that step (i) may be performed at about 15° C. to about 25° C. over a period of about 2.5 hours.

In certain embodiments, step (i) further comprises step (i-a), wherein a reaction by-product is removed from the reaction mixture. It may be that the reaction by-product is the hydrochloride acid addition salt of the base, for example when the base is triethylamine, the reaction by-product is triethylamine hydrochloride. The reaction by product may be removed during, or preferably after completion of step (i) of the process. The reaction by product may be removed using any suitable method. Suitably, where the acid addition salt of the base precipitates from the reaction mixture in step (i), it may be removed by filtration. However, other well-known separation methods could be used.

The reaction mixture resulting from step (i) of the process comprises the phosphodichloridate intermediate compound of the formula (II) or (IIA) (depending on whether the compound of formula (III) or (IIIA) was used as the starting material):

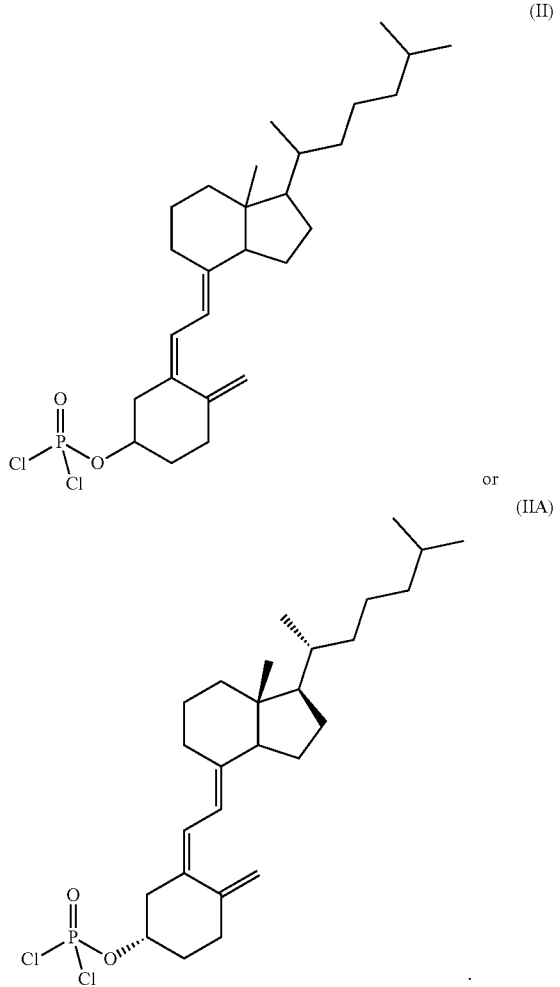

Suitably, step (ii) is performed without isolating the phosphodichloridate intermediate formed in step (i). Thus, the reaction mixture of step (i) may be hydrolysed to form the final product directly.

In certain embodiments the process of step (ii) is performed in the presence of a suitable solvent. It may be that step (ii) is carried out in an organic solvent, preferably one or more of the solvents set out above in relation to the step (i) process.

In certain embodiments, the water used in step (ii) is deionised water.

The reaction conditions used for the hydrolysis reaction are important for the yield of the final product. In certain embodiments, in step (ii), the reaction mixture is contacted with water for about 2 h or less. It may be that in step (ii) the reaction mixture is contacted with water for about 5 min. It may be that in step (ii) the reaction mixture is contacted with water for about 10 min. It may be that in step (ii) the reaction mixture is contacted with water for about 30 min. It may be that in step (ii) the reaction mixture is contacted with water for about 45 min. It may be that in step (ii) the reaction mixture is contacted with water for about 1 h.

It may be that in step (ii) the reaction mixture is contacted with water for about 1 h 15 min. It may be that in step (ii) the reaction mixture is contacted with water for about 1 h 30 min. It may be that in step (ii) the reaction mixture is contacted with water for about 1 h 45 min. It may be that in step (ii) the reaction mixture is contacted with water for about 2 h. In some embodiments it may be that in step (ii) the reaction mixture is contacted with water for about 1 h.

The Table 6 in the Examples show that high yields of the compound of the invention with high purity are obtained when in step (ii) the reaction mixture is contacted with water for from about 15 to about 80 minutes, for example from about 20 to about 70 minutes, from about 25 to about 65 minutes, or from about 30 to about 60 minutes.

Table 6 in the Examples also shows that longer hydrolysis reaction times lead to a reduction in yield of the compound, however the compound of the invention is obtained in very high purity. Accordingly, in some embodiments in step (ii), the reaction mixture is contacted with water for from about 30 minutes to about 36 hours, for example from 30 minutes to about 24 hours, 50 minutes to 24 hours, 60 minutes to 24 hours, 70 minutes to 24 hours, 80 minutes to 24, 90 minutes to 24 hours, or 2 hours to 24 hours. It may be that in step (ii), the reaction mixture is contacted with water for about 24 h or less. It may be that in step (ii), the reaction mixture is contacted with water for about 30 min, 40 min, 50 min, 60 min, 90 min, 2 h, 2 h 30 min, 3 h, 4 h, 5 h, 6 h, 7 h, 8 h, 9 h, 10 h, 11 h, 12 h, 13 h, 14 h, 15 h, 16 h, 17 h, 18 h, 19 h, 20 h, 21 h, 22 h, 23 h or 24 h. It may be that in step (ii), the reaction mixture is contacted with water for about 24 h.

Suitably, the reaction mixture is contacted with water by adding water to the reaction mixture resulting from step (i). The duration of the contact of the reaction mixture with water may be controlled by isolating the final product after the desired contact time with the water by initiating the isolation step (iii) of the process.

In certain embodiments, step (ii) is performed at about room temperature. It may be that step (ii) may be performed at about 35° C. or less. It may be that step (ii) may be performed at about 30° C. It may be that step (ii) may be performed at about 25° C. It may be that step (ii) may be performed at about 20° C. It may be that step (ii) may be performed at about 15° C. It may be that step (ii) may be performed at about 15, 16, 17, 18, 19, 20, 21, 22, 23, 24, 25, 26, 27, 28, 29 or 30° C. It may be that step (ii) may be performed at about 10° C. It may be that step (ii) may be performed at greater than about 4° C.

In certain embodiments, it may be that in step (ii) the reaction mixture is contacted with water for about 2 h or less, at about room temperature. Suitably, it may be that in step (ii) the reaction mixture is contacted with water for about 1 h at about 15° C. to about 25° C.

In certain embodiments, step (ii) is not carried out under an inert atmosphere. In other embodiments step (ii) is carried out under an inert atmosphere.

In certain embodiments the hydrolysis reaction in step (ii) is carried out in the absence of a base. For example, it may be that step (ii) is carried out in the absence of sodium or calcium hydroxide.

Suitably the water in step (ii) is present in an equimolar, or preferably, a molar excess relative to the vitamin $D_3$ (cholecalciferol) starting material used in step (i). For example, the molar ratio of water in step (ii) to the vitamin $D_3$ starting material used in step (i) is at least 1:1, at least 5:1, at least 10:1 at least 50:1 at least 100:1, at least 500:1, at least 1000:1, or at least 2000:1.

However, as illustrated in the Example 7 herein, if large volumes of water are used in step (ii) relative to the vitamin $D_3$ starting material used in step (i), the yield and purity of the vitamin $D_3$ phosphate product (compound of the formula (IA)) is reduced. Accordingly, in some embodiments the mass/volume percent (% m/v) of the vitamin $D_3$ starting material in step (i) relative to the volume of water in step (ii) is at least 5%. The % m/v is calculated according to the equation:

$$\% \ m/v = \frac{\text{mass of vitamin } D3 \text{ starting material in step } (i)(g)}{\text{volume of water in step } (ii)(mL)} \times 100$$

By way of an illustrative example, if the mass of vitamin $D_3$ used in step (i) is 1.5 g and the volume of water used in the hydrolysis reaction in step (ii) is 7 mL the % m/v is 21.4%.

In some embodiments the % m/v of the vitamin $D_3$ starting material in step (i) relative to the volume of water in step (ii) is at least 10%, at least 15%, at least 20%, at least 25% at least 30% or at least 40%. Thus it may be that the % m/v is from 5% to 40%, from 10% to 30%. Suitably the % m/v is from 15% to 25%. For example, the % m/v is about 15%, about 16%, about 17%, about 18%, about 19%, about 20%, about 21%, about 22%, about 23% about 24% or about 25%.

In certain embodiments, the process steps (i) and (ii) take place over a total period of about 5 h or less. It may be that it takes place over a period of about 4.5 h or less. It may be that it takes place over a period of about 4 h or less. It may be that it takes place over a period of about 3.5 h or less. It may be that it takes place over a period of about 3 h or less.

In certain embodiments, step (iii) comprises extracting the product (i.e. vitamin $D_3$ phosphate (a compound of formula (I) or (IA))) with a water immiscible organic solvent and recovering the product. The product can be isolated by, for example, evaporation of the organic solvent. Other methods for isolating the compound can also be used, for example by adding a suitable anti-solvent to cause the product to precipitate.

Examples of water immiscible organic solvents useful in extraction include esters such as ethyl acetate, methyl acetate, isopropyl acetate and the like; chlorinated solvents such as dichloromethane, chloroform and the like; aliphatic and aromatic hydrocarbon solvents such as hexane, toluene, xylene and the like. Suitably the water immiscible organic solvent is hexane or dichloromethane. For example, the water immiscible organic solvent is hexane. Similar methods can be used to isolate the compounds of formula (II) or (IIA) at the completion of step (i), if desired.

In certain embodiments, step (iii) comprises extracting the product (i.e. vitamin $D_3$ phosphate (a compound of formula (I) or (IA))) with hexane and recovering the product by, for example, evaporation of the organic solvent.

Extraction of a compound of the invention from the reaction mixture using dichloromethane provides the compound in very high purity. Accordingly in a preferred embodiment, step (iii) comprises extracting the product (i.e. vitamin $D_3$ phosphate (a compound of formula (I) or (IA))) with dichloromethane and recovering the product by, for example, evaporation of the organic solvent.

In certain embodiments, it may be desirable to purify the compound of the invention obtained from the process described herein. Methods of purification are well known to those skilled in the art and include chromatography (e.g. column chromatography), recrystallisation and distillation. In other embodiments, no purification is necessary.

In certain embodiments, the compound of the invention isolated from step (iii) may be purified by dissolving and extracting the product in an organic solvent and an aqueous solution of a base followed by isolating the compound of the invention. It may be that the organic solvent is a suitable organic solvent as described herein, for example, tetrahydrofuran. It may be that the base is an alkaline or alkaline earth metal hydroxide (e.g. sodium hydroxide, potassium hydroxide, calcium hydroxide or magnesium hydroxide), or an ammonium base such as ammonium hydroxide. Suitably the base used in step (iii) is sodium hydroxide. It may be that the compound of the invention is dissolved and extracted from tetrahydrofuran and aqueous sodium hydroxide. The compound of the invention preferentially partitions into the aqueous layer and may be isolated by evaporation, optionally in the presence of a suitable co-solvent such as ethanol. It may be that the compound of the invention is isolated as a pharmaceutically acceptable salt, for example when the base is aqueous sodium hydroxide the compound may be isolated a sodium salt, preferably the di-sodium salt of a compound of the formula (I) or (IA).

In certain embodiments, it may be that resulting product undergoes a further extraction step to provide an acid or salt form of the compound of the invention.

Pharmaceutically acceptable salts of the compound of the invention may be prepared by contacting an aqueous solution of the compound of the invention with a suitable base, for example sodium hydroxide, potassium hydroxide, calcium hydroxide or magnesium hydroxide, and isolating the salt, for example by evaporation. The free acid form of the compound of the invention may be isolated directly from a water-immiscible organic solvent such as hexane or dichloromethane. For example the free acid form of the compound of the invention can be obtained by extracting the compound from the reaction after step (ii) into a water-immiscible organic solvent such as hexane or dichloromethane, and isolating the free acid form of the compound by, for example, evaporation.

FURTHER EMBODIMENTS

Further embodiments of the invention are set out in the following numbered clauses:
1. A compound of formula (I):

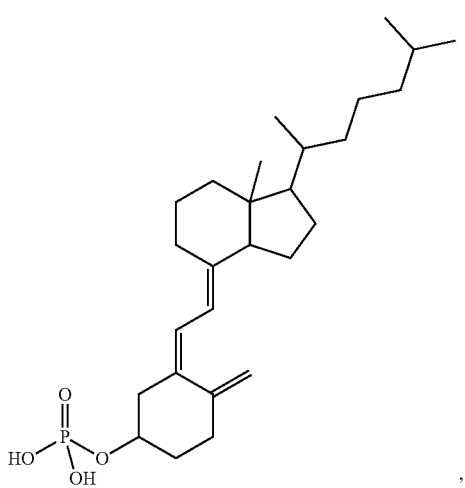

or a pharmaceutically acceptable salt thereof.
2. The compound of clause 1, wherein the compound is of formula (IA):

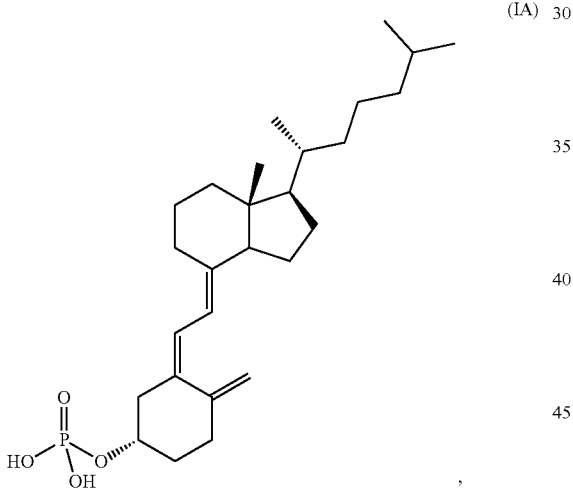

or a pharmaceutically acceptable salt thereof.
3. A pharmaceutical composition comprising a compound according to clause 1 or clause 2, or a or a pharmaceutically acceptable salt thereof and a pharmaceutically acceptable excipient.
4. The pharmaceutical composition according to clause 3 wherein the composition is adapted for topical administration, for example wherein the composition is in the form of a topical lotion, droplets, spray, cream or gel.
5. The pharmaceutical composition according to clause 3 or clause 4, wherein the pharmaceutically acceptable excipient comprises a permeation enhancer.
6. The pharmaceutical composition according to clause 5 wherein the permeation enhancer is selected from one or more of: fatty acids, aromatic organic acids, fatty alcohols, aromatic alcohols, terpenes, polyols, cyclic oligosaccharides, alkyl ethers, aryl ethers, and aromatic fatty acid esters.
7. The pharmaceutical composition according to clause 5 wherein the permeation enhancer is selected from: propylene glycol, polyethylene glycol and glycerol; optionally wherein the permeation enhancer is propylene glycol.
8. The pharmaceutical composition according to any one of clauses 3 to 7, further comprising an antioxidant; optionally wherein the antioxidant is selected from: ascorbyl palmitate, ascorbic acid, butylated hydroxyanisol, butylated hydroxytoluene, potassium metabisulphite, sodium metabisulphite, propyl gallate and vitamin E.
9. The pharmaceutical composition according to any one of clauses 3 to 8, wherein the compound is present in an amount of up to 40% by weight of the composition.
10. The pharmaceutical composition according to clause 3 or clause 4, wherein the composition is a non-aqueous composition.
11. A transdermal patch comprising a compound of clause 1 or clause 2, or a pharmaceutically acceptable salt thereof, or a composition according to any one of clauses 3 to 10.
12. A method for treating vitamin D deficiency in a subject, the method comprising administering to the subject a compound of clause 1 or clause 2, or a pharmaceutically acceptable salt thereof, or a composition according to any one of clauses 3 to 10.
13. A compound of clause 1 or clause 2, or a pharmaceutically acceptable salt thereof, or a composition according to any one of clauses 3 to 10, for use in for use in the treatment of a disease or medical condition associated with vitamin D deficiency in a subject.
14. Use of a compound of clause 1 or clause 2, or a pharmaceutically acceptable salt thereof, or a composition according to any one of clauses 3 to 10, as a vitamin D supplement.
15. The compound for use, method or use according to any one of clauses 12 to 14, wherein the compound is topically administered to the subject.
16. The compound for use, method or use according to any one of clauses 12 to 14, wherein the compound is administered transdermally to the subject.
17. The compound for use, method or use according to any one of clauses 12 to 14, wherein the compound is administered to the subject in the form of a transdermal patch comprising the compound applied to the skin of the subject.
18. A process for the preparation of a compound of formula (I):

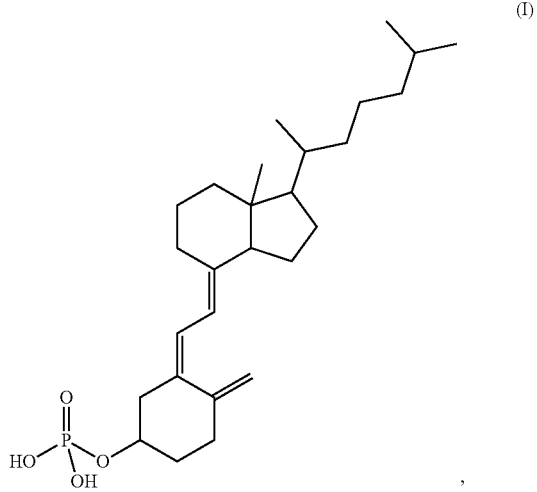 [SMILES: C=C1CCC(OP(=O)(O)O)C/C1=C/C=C1\CCCC2(C)C1CCC2C(C)CCCC(C)C]

or a pharmaceutically acceptable salt thereof,
wherein the process comprises the following steps:

Step (i) reacting vitamin D₃ with a phosphorylating agent in the presence of a suitable base, wherein the reaction is performed in the absence of water and under an inert atmosphere to provide a reaction mixture comprising a compound of formula (II):

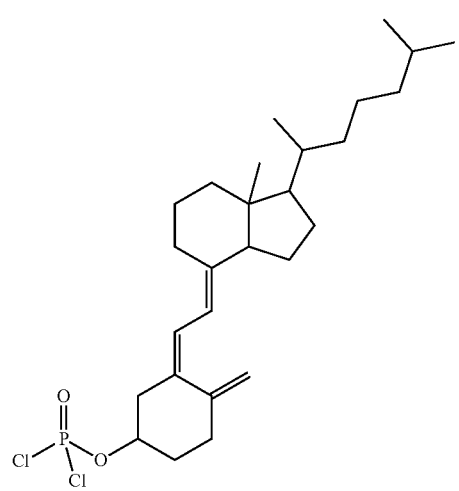
(II)

and then

Step (ii) contacting the reaction mixture comprising the compound of formula (II) with water for about 2 hours or less; and then Step (iii) isolating the compound of formula (I).

19. The process of clause 18 wherein the phosphorylating agent is phosphorus oxychloride.

20. The process of clause 18 or clause 19, wherein the base present in step (i) is a tertiary organic amine, for example triethylamine.

21. The process of any one of clauses 18 to 20, wherein in step (ii) the compound of formula (II) is contacted with water for about 1 hour.

22. The process of any one of clauses 18 to 21, wherein the reactions in steps (i) and (ii) are performed in an organic solvent, for example tetrahydrofuran.

23. The process of any one of clauses 18 to 22, wherein the reactions in steps (i) and (ii) are performed at room temperature.

24. The process of any one of clauses 18 to 22, wherein the vitamin D₃ is of the formula (IIIA), the compound of formula (II) is of the formula (IIA) and the compound of formula (I) is of the formula (IA):

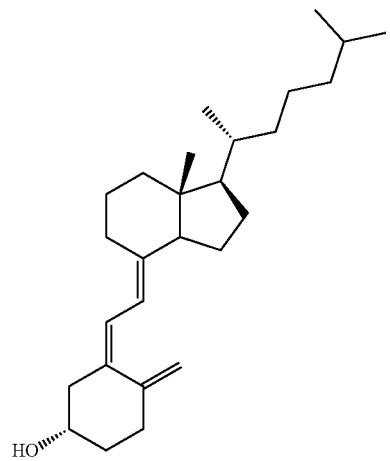
(IIIA)

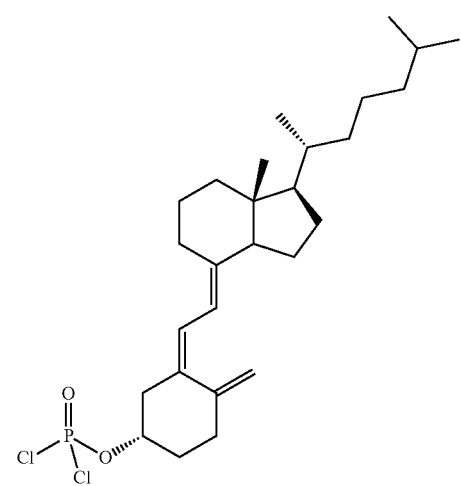
(IIA)

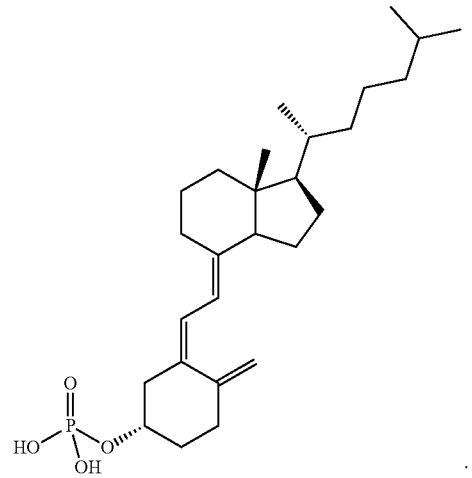
(IA)

EXAMPLES

Solvents, reagents and starting materials were purchased from commercial vendors and used as received unless otherwise described. All reactions were performed at room temperature unless otherwise stated. Starting materials were purchased from commercial sources or synthesised according to the methods described herein or using literature procedures.

Abbreviations

The following abbreviations are used in the Examples and other parts of the description.
ACN: acetonitrile
d: day(s)
ESI: electrospray ionisation
EtOH: ethanol
eq: equivalents
h: hour(s)
HPLC: High Performance Liquid Chromatography
ICH: International Conference on Harmonisation
IU: international unit
LC/MS: Liquid Chromatograph-Mass Spectroscopy
LOD: limit of detection
LOQ: limit of quantification
MeOH: methanol
min: minute(s)
$NEt_3$: triethylamine
NMR: nuclear magnetic resonance
PBS: phosphate buffered saline
PG: propylene glycol
PEG: polyethylene glycol
$POCl_3$: phosphorus oxychloride
RT: room temperature (20 to 25° C.)
s: second(s)
SC: stratum corneum
THF: tetrahydrofuran
TLC: thin-layer chromatography
UPLC/MS: Ultra-Performance Liquid Chromatography-Mass Spectrometry
VD: vitamin $D_3$ Analytical Methods NMR Spectroscopy $^1H$, $^{13}C$, and $^{31}P$ NMR spectra were recorded using a DRX 400 (Bruker, UK) at 296 K using a 5 mm switchable broadband probe. Proton NMR parameters included a sweep width of 8250.825 Hz, an acquisition time of 3.9715922 s, an interpulse delay time of 1 s, and the number of scans was set at 16 all within a zg30 pulse program. Carbon NMR parameters included a sweep width of 24038.461 Hz, an acquisition time of 1.3632196 sec, an interpulse delay time of 2 s and the number of scans was set at 1000 all within a zgpg30 pulse program. Phosphorus NMR parameters included a sweep width of 64724.918 Hz, an acquisition time of 0.5063233 s, an interpulse delay time of 2 s and the number of scans was set at 16 all within a zgpg30 pulse program. The Topspin software was used for data analysis. To prepare the samples cholecalciferol phosphate (5 mg) was dissolved in methanol-$d_4$ (500 μL), stirring overnight, and phosphorus oxychloride (1.22 μL) with phosphoric acid ($H_3PO_4$) (6 mg) and the starting material cholecalciferol (10 mg) was dissolved in $CDCl_3$ (600 μL).

Liquid Chromatograph-Mass Spectroscopy (LC/MS)

LC/MS analysis was conducted using an LC system from an Agilent 1100 series G1322A Degasser (Agilent, USA) attached to mass spectrometer from LCQ DECA XP linear ion trap, operating in positive electrospray ionisation (ESI) mode. The sample concentration was 1 mg/mL, prepared in 45% acetonitrile, 45% water, 0.1% TFA, and 10.7% methanol. The column was a Phenomenex Luna C18 (50×2 mm, 2.5 μm particle size, 100 Å diameter). The mobile phase was ACN:water (50:50), and total runtime was 14.5 min, the temperature of the autosampler was room temperature, the temperature of the column oven was 40° C., the flow rate was 0.25 mL/min, injection volume was 20 μL, the temperature of the ion source was 255° C.

Ultra-Performance Liquid Chromatography-Mass Spectrometry (UPLC/MS) Analysis

UPLC/MS analysis was conducted using an LC system from a waters Acquity attached to a binary solvent manager, (Waters, Milford, USA), equipped with mass spectrometer (Waters Xevo TQ XP with Z-spray source), operating in negative electrospray ionisation (ESI) mode. The sample concentration was 100 μg/mL, prepared in methanol. The column was a Phenomenex Kinetex C18 (50×2.1 mm, 1.7 μm particle size, 100 Å diameter). A gradient eluent method with mobile phase A (water: MeOH, 80:20 with 0.1% TFA) and mobile phase B (ACN:MeOH:water, 70:20:10 with 0.1% TFA) was performed for 20 min. The separations were achieved with B: 50% (0 min), increased to 90% (10 min), and held at 90% for 5 min, decreased back to 50% (2 min) and held at 50% for 3 min. The temperature of the autosampler was 50° C., the temperature of the column oven was 50° C., the flow rate was 0.2 mL/min, injection volume was 20 μL, the temperature of the ion source was 150° C.

Example 1—Synthesis of Vitamin $D_3$ Phosphate

Synthesis

Scheme 1

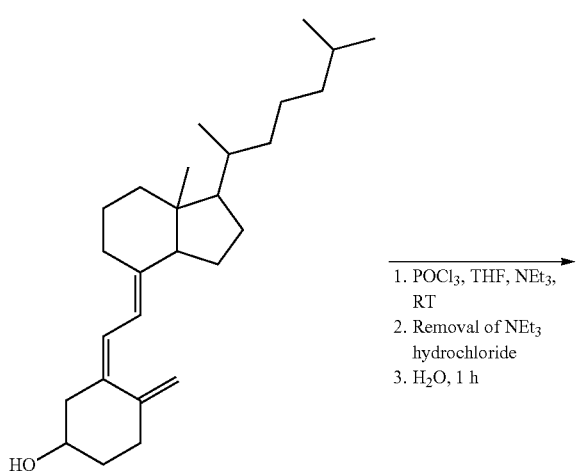

1. $POCl_3$, THF, $NEt_3$, RT
2. Removal of $NEt_3$ hydrochloride
3. $H_2O$, 1 h -continued

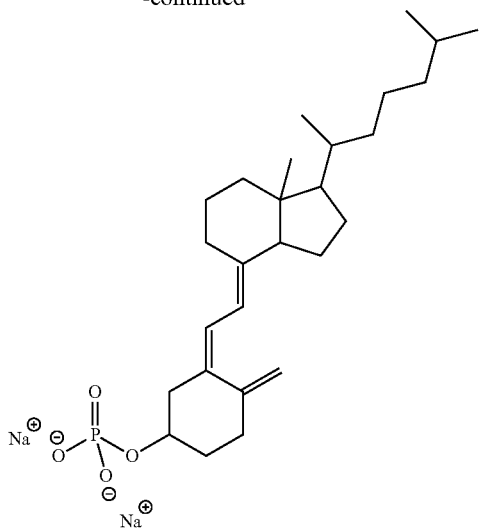

Method

Cholecalciferol (1.50 g, 3.90 mmol) in anhydrous THF (25 mL) with triethylamine (1.63 mL, 11.7 mmol, 3 eq) was added to the solution of POCl$_3$ (0.510 mL, 5.46 mmol, 1,4 eq) in anhydrous THE (15 mL) under nitrogen, stirring, at room temperature. This reaction stirred for 2.5 h. The main reaction by-product, solid white triethylamine hydrochloride powder, was removed by suction filtration.

Distilled water (7 mL) was added to the reaction mixture and it was stirred for 1 h at room temperature. The mixture was extracted with hexane and the organic layer was dried over by anhydrous MgSO$_4$.

A yellow oil obtained by a rotary evaporator was dissolved in THF (15 mL), and 3 M NaOH (5 mL), 5 stirring for a few minutes. The cholecalciferol phosphate preferentially partitioned into the aqueous layer and hence the THF layer was removed, and absolute ethanol was added to the aqueous layer and it was boiled, resulting in white/yellow precipitate of the title product as the di-sodium salt. Thin-layer chromatography (TLC) analysis was performed to confirm the reaction had proceeded.

Results

Cholecalciferol phosphate was synthesised according to Scheme 1, and repeated three times in order to obtain 3 batches of cholecalciferol phosphate as the sodium salt. The average yield of cholecalciferol phosphate was 71.93±10.70%. The retention values (Rf) indicated that starting material cholecalciferol had been converted to cholecalciferol phosphate because the Rf values of the final product were zero and there was no spot for the starting material (FIG. 1).

NMR Spectroscopy

Figure 2A:
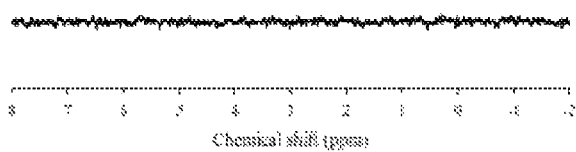
FIGS. 2A, 2B, 2C and 2D—Phosphorus NMR spectra of (FIG. 2A) the starting material cholecalciferol in deuterated chloroform, (FIG. 2B) cholecalciferol phosphate batch 1 in deuterated methanol, (FIG. 2C) cholecalciferol phosphate batch 2 in deuterated methanol, (FIG. 2D) cholecalciferol phosphate batch 3 in deuterated methanol.
Figure 2B:
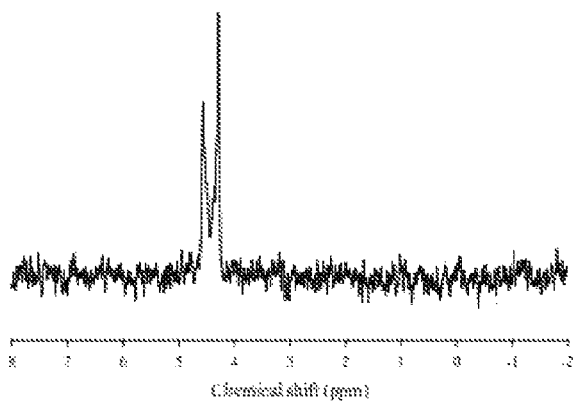
Figure 2C:
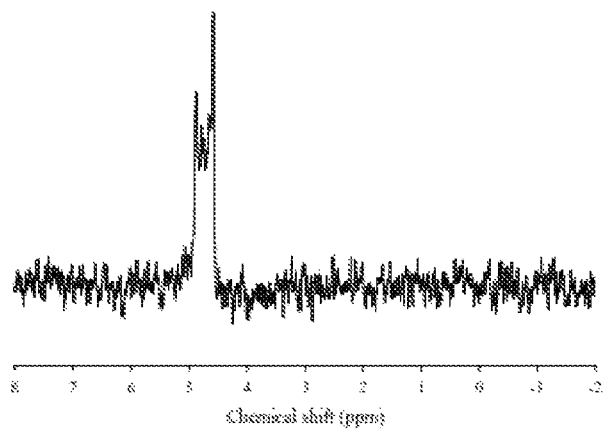
Figure 2D:
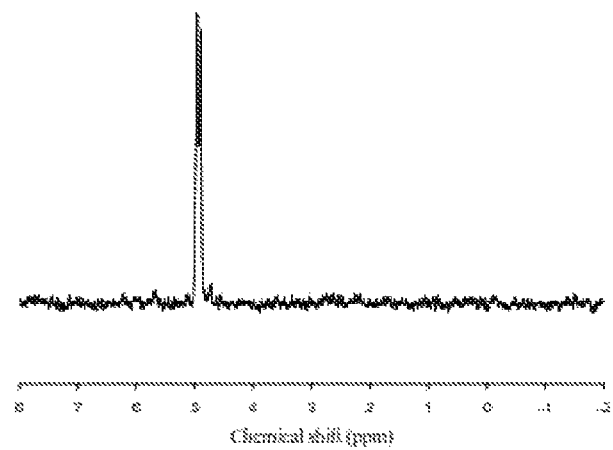

The phosphorus NMR analysis of the starting material cholecalciferol showed no signals as the structure does not contain phosphorus atoms (FIG. 2A). All batches of cholecalciferol phosphate showed one doublet at approximately 4 ppm which indicated that the monomeric form of the cholecalciferol phosphate was formed, and no bis-cholecalciferol phosphate was present (FIGS. 2B, 2C and 2D).

Figure 3A:
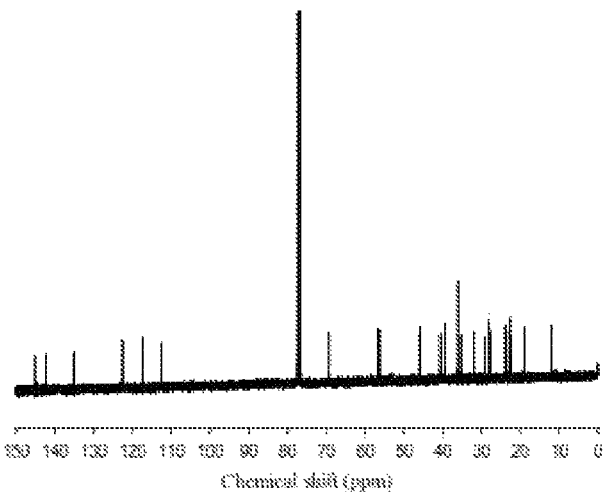
FIGS. 3A, 3B, 3C and 3D—Carbon NMR spectra of (FIG. 3A) the starting material cholecalciferol in deuterated chloroform, (FIG. 3B) cholecalciferol phosphate batch 1 in deuterated methanol, (FIG. 3C) cholecalciferol phosphate batch 2 in deuterated methanol, (FIG. 3D) cholecalciferol phosphate batch 3 in deuterated methanol.
Figure 3B:
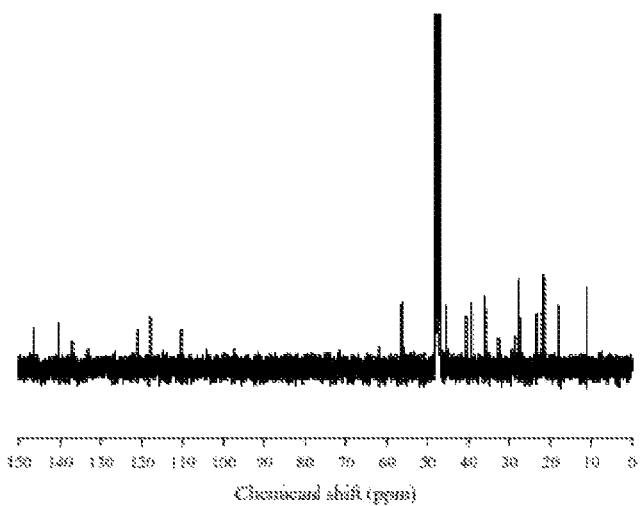
Figure 3C:
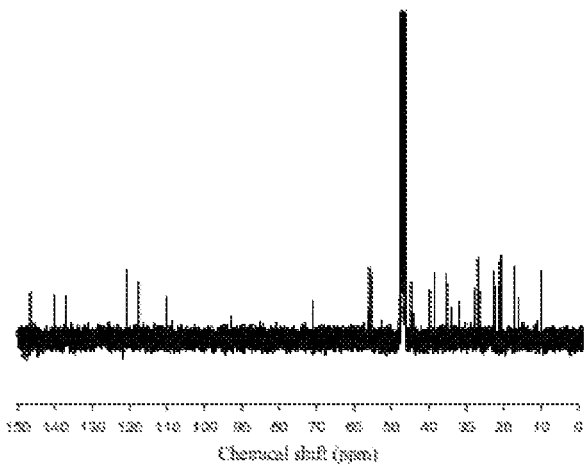
Figure 3D:
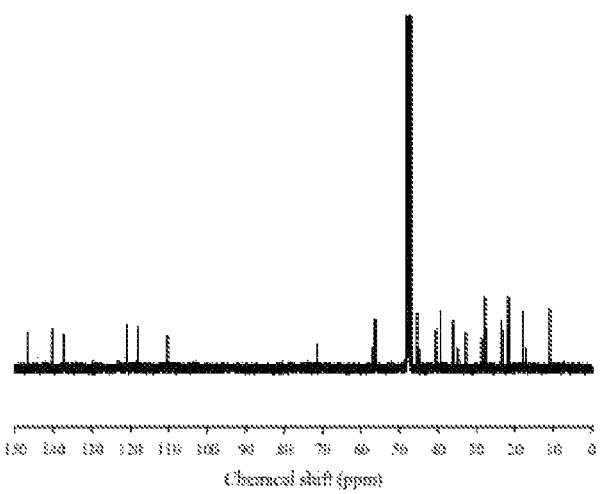

In the carbon NMR, 26 peaks were identified for the starting material cholecalciferol (FIG. 3A). All 26 peaks of the starting material were identified in the final products which showed the synthetic procedure did not degrade the vitamin's structure (FIGS. 3B, 3C, and 3D).

Figure 4A:
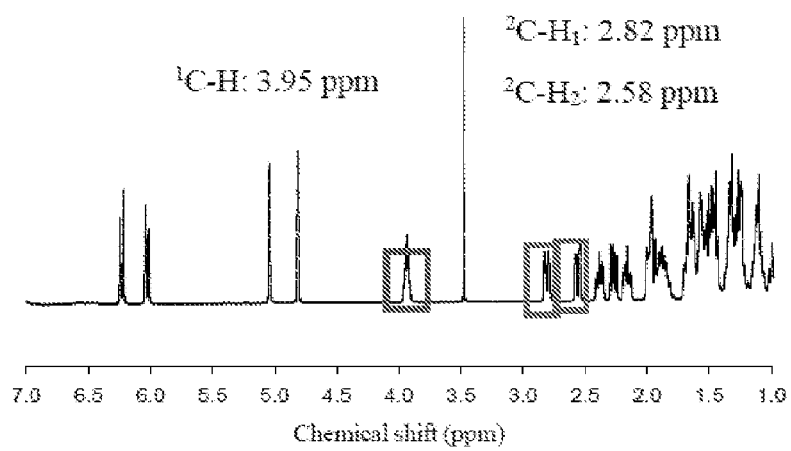
FIGS. 4A, 4B, 4C and 4D—Proton NMR spectra of (FIG. 4A) the starting material cholecalciferol in deuterated chloroform, (FIG. 4B) cholecalciferol phosphate batch 1 in deuterated methanol, (FIG. 4C) cholecalciferol phosphate batch 2 in deuterated methanol, (FIG. 4D) cholecalciferol phosphate batch 3 in deuterated methanol. The change in protons of C2 and C1 caused by phosphorylation are highlighted.
Figure 4B:
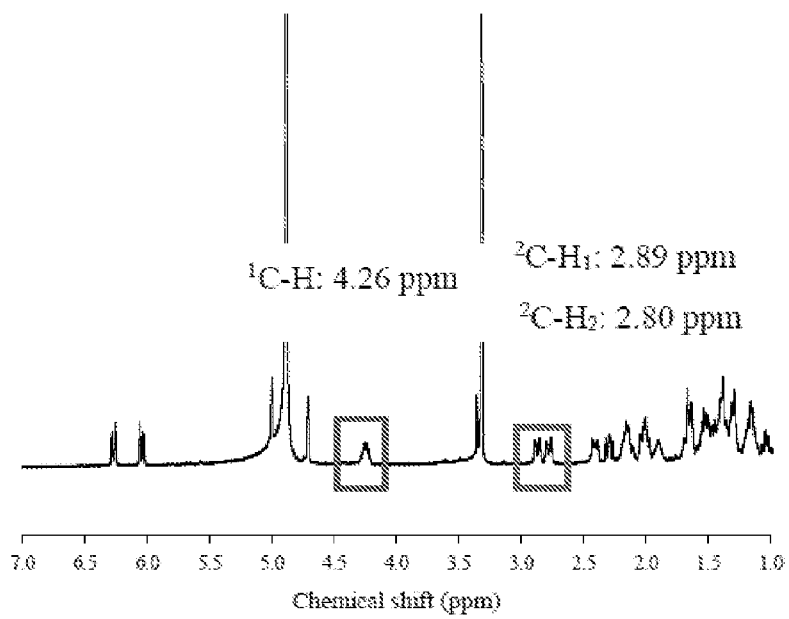
Figure 4C:
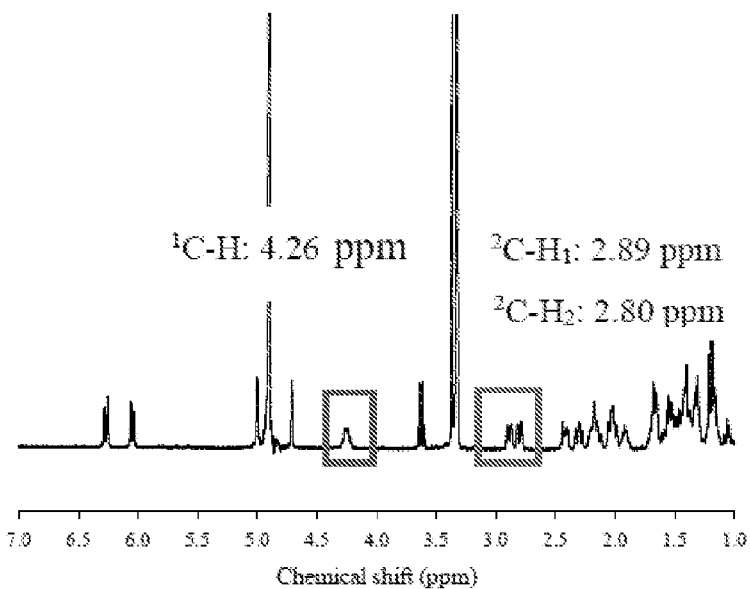
Figure 4D:
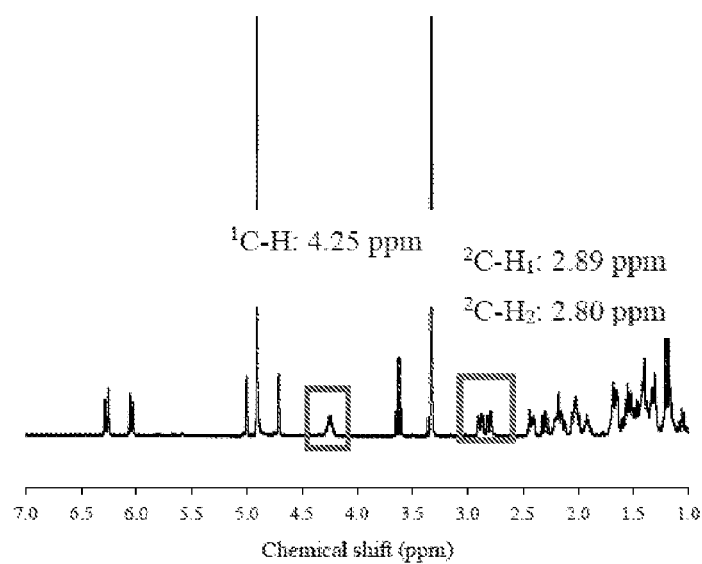

The most important protons of cholecalciferol to track in the reaction were the protons attached to C1 and C2. These were determined at 3.95 ppm, an octet peak ($^1$C—H), 2.82 ppm, a doublet of doublets ($^2$C—H$_1$) and 2.58 ppm, a doublet of doublets ($^2$C—H$_2$) in the starting material (FIG. 4A). The cholecalciferol phosphate products displayed a multiplet peak at 4.2 ppm which was assigned to be the proton of C1. This peak had changed compared to the starting material as expected, due to the introduction of the phosphorus group. The 2 protons of C2 were shifted to 2.89 ppm and 2.80 ppm from 2.82 ppm and 2.58 ppm, as a result of the phosphorus group (FIGS. 4B, 4C and 4D). These results demonstrated that phosphate had been introduced into cholecalciferol phosphate at the correct position.

The NMR analysis of the cholecalciferol phosphate show that the product was of high purity and was absent of the bis-cholecalciferol phosphate impurity. The carbon NMR analysis of cholecalciferol phosphate showed that the synthesis procedure had not degraded the hydrocarbon structure of the vitamin with all 26 peaks from the starting material identified. The proton NMR analysis showed that the electron density of the protons close to the phosphorus was reduced by introducing the electronegative phosphorus group.

LC/MS

Three batches of cholecalciferol phosphate were analysed by LC/MS to determine purity. The purity of batch 1 was 100%, the purity of batch 2 was 96.67% and the purity of batch 3 was 96.66%. The results of LC/MS analysis confirmed cholecalciferol phosphate was more polar than cholecalciferol phosphate and that the desired molecular weight of <500 Mw was achieved.

Elemental Analysis

Elemental analysis and ICP-OES analysis was carried out on the cholecalciferol phosphate acid sodium salt obtained in this example. Carbon and hydrogen compositions were assessed by microanalysis. The technique used was based on the quantitative "dynamic flash combustion" method. The samples were held in a tin capsule, placed inside the autosampler drum (FlashEA® 1112 Elemental Analyser, UK) where they were purged by a continuous flow of helium and dropped at pre-set intervals into a vertical quartz tube maintained at 900° C. When the samples were dropped inside the furnace, the helium stream was temporarily enriched with pure oxygen and the sample and its container melted with the tin promoting a violent reaction (flash combustion). Under these favourable conditions, even thermally resistant substances are completely oxidised. Quantitative combustion was then achieved by passing the mixture of gases over a catalyst layer. The mixture of combustion gases then passed over copper to remove excess oxygen and to reduce the nitrogen oxides to elemental nitrogen. The resulting mixture was then directed to a chromatographic column where the individual components were separated and eluted as carbon dioxide and water by the TCD signal, which fed the automatic workstation (EAGER300™, USA). The instrument was calibrated with the analysis of standard compounds using K factor calculations or the liner regression method incorporated in the EAGER300™ software.

Phosphorous and sodium compositions were assessed by Varian Vista MPX ICP-OES analysis equipped with CCD simultaneous detection instrument (Varian, Inc., USA). It used the plasma to produce exited atoms and ions that emit electromagnetic radiation at wavelengths characteristic of a particular element. To generate plasma, argon gas was supplied to torch coil, and high frequency electric current was applied to the work coil at the top of the torch tube. This plasma had high electron density and temperature (10000K) and this energy was used in the excitation-emission of the sample. Sample solutions were introduced into the plasma in an atomised state through the narrow tube in the centre of the torch tube. The sample introduction system consisted of quartz nebuliser, liberty axial model and cyclonic spray chamber. The sample solutions were prepared using $H_2SO_4$/$HClO_4$, and multiple standards, prepared using the same digestion method as the sample, were used to generate a calibration curve for each element to be determined. A calibration curve was prepared using the standard solutions and the concentration of metal in the sample solution was calculated by running the sample solution against the calibration curve. The results of these measurements allowed to calculate the match percentage of composition based on the theoretical compositions.

Results

The theoretical composition of carbon, hydrogen and phosphate in cholecalciferol phosphate disodium salt is 63.73%, 8.52%, 6.09%, and 9.04% respectively. The composition of cholecalciferol phosphate disodium salt prepared according to this example were found to be 57.67, 8.51, 5.6, and 7.72%, which showed a carbon match of 90.45%, a hydrogen match of 99.88%, a phosphate match of 91.95% and a sodium match of 85.34%.

Example 2—Solubility Studies

Methods
Solubility Studies

An aliquot of 2.5 mg cholecalciferol and 2.5 mg cholecalciferol phosphate disodium salt prepared according to Example 1 were weighed into glass vials and 100 µL aliquots of the test solvents with different dielectric constants; water, MeOH:water (90:10), ethylene glycol, methanol (MeOH), propylene glycol (PG), ethanol (EtOH), poly (ethylene glycol) (PEG-400), and mineral oil were added until the sample was fully dissolved visually. A precise determination of the solubility was undertaken using high-performance liquid chromatography (HPLC). In the HPLC solubility studies an excess amount of cholecalciferol and cholecalciferol phosphate was added into 2 mL of each test solvent; water, MeOH:water (90:10), MeOH, and PG, EtOH and mineral oil. The solutions were left stirring overnight at room temperature, (RT), 22° C. The saturation of the solutions was confirmed by the visual appearance of crystals and the drug suspensions were filtered through 0.2 µm syringe filters, diluted, and the concentration of each sample was assessed using the HPLC method detailed below.

HPLC Analysis

HPLC analysis was conducted using an HPLC system consisting of an auto-sample injector (Jasco AS-4050, Japan), a pump (Jasco PU-4180, Japan), and a photodiode array detector (Jasco MD-4017, Japan). The data was collected and analysed using the ChromNAV software. The HPLC column was a Phenomenex C18 Synergi Hydro-RP-column (250×4.6 mm, 4 µm particle size, 80 Å diameter) with a Phenomenex-AQ C18 guard a for cholecalciferol and a Phenomenex Kinetex Biphenyl column (250×4.6 mm, 5 Å diameter) for cholecalciferol phosphate. The mobile phase was ACN: MeOH (55:45) for cholecalciferol and MeOH: water (PBS pH 3.2) (90:10) for cholecalciferol phosphate, both of which were filtered through a nylon membrane filter and degassed using a sonicator.

Results

The rank order cholecalciferol solubility was mineral oil=PEG-400=EtOH=MeOH=Ethylene glycol >PG> MeOH:water (90:10)>water (Table 1). The rank order of cholecalciferol phosphate was almost the opposite to cholecalciferol, i.e., water>MeOH: water (90:10)>PG> MeOH>EtOH=Mineral oil. Cholecalciferol and cholecalciferol phosphate showed solubility in both MeOH and PG. Itwas unexpected that HPLC analysis detected solubility of cholecalciferol phosphate in MeCOH as visual observation could not identify that the compound was soluble.

TABLE 1

The solubility of cholecalciferol and cholecalciferol phosphate by visual observation and calculated by HPLC analysis in solvents depending on the different dielectric constants (ε) at 25° C.

| Dielectric Constant | Solvents | Cholecalciferol | | Cholecalciferol Phosphate | |
|---|---|---|---|---|---|
| | | Visual | HPLC | Visual | HPLC |
| 78.48 (Albright et al., 1946) | Water | Not detected | Not detected | <2.5 × 10$^3$ µg/mL | Data not collected |
| 37.91 (Albright et al., 1946) | MeOH:water (90:10) | Not detected | 0.083 µg/mL | <2.0 × 10$^3$ µg/mL | 3.70 × 10$^3$ µg/mL |
| 37.7 (U.S. Pat. No. 4,469,684) | Ethylene glycol | >25 × 10$^3$ µg/mL | Data not collected | Not detected | Data not collected |
| 32.73 (Albright et al., 1946) | MeOH | >25 × 10$^3$ µg/mL | Data not collected | Not detected | 2.14 × 10$^3$ µg/mL |
| 28.95 (Prasad et al., 2020) | PG | <3.57 × 10$^3$ µg/mL | 3.15 × 10$^3$ µg/mL | <3.33 × 10$^3$ µg/mL | 2.50 × 10$^3$ µg/mL |
| 24.35 (Kohns, 2020) | EtOH | >25 × 10$^3$ µg/mL | Data not collected | Not detected | Not detected |

TABLE 1-continued

The solubility of cholecalciferol and cholecalciferol phosphate
by visual observation and calculated by HPLC analysis in solvents
depending on the different dielectric constants (ε) at 25° C.

| Dielectric | | Cholecalciferol | | Cholecalciferol Phosphate | |
|---|---|---|---|---|---|
| Constant | Solvents | Visual | HPLC | Visual | HPLC |
| 12.4 (Babu et al., 2008) | PEG-400 | >25 × 10³ μg/mL | Data not collected | Not detected | Data not collected |
| 2.21 (Rajab et al., 2011) | Mineral oil | >25 × 10³ μg/mL | Data not collected | Not detected | Not detected |

Albright, P. S., and Gosting, L. J. (1946) Dielectric Constant of the Methanol-Water system from 5 to 55, *Journal of American Chemical Society*, 68 (6), 1061-1063.
Babu, P. S., et al., (2008) Solubility enhancement of cox-II inhibitors by cosolvency approach, *Dhaka University Journal of Pharmaceutical Sciences*, 7(2), 119-126.
Kohns, M. (2020) Molecular simulation study of dielectric constants of pure fluids and mixtures, *Fluid Phase Equilibria*, 506, 112393.
Prasad, T. V., et al., (2020) Frequency and temperature dependent dielectric studies of propylene glycol-sulfolane binary mixtures in the microwave frequency region, *Spectrochimica Acta Part A: Molecular and Biomolecular Spectroscopy*, 233, 118189.
Rajab, A., et al., (2011) A comparison of dielectric properties of palm oil with mineral and synthetic types insulating liquid under temperature variation, *Journal of Engineering and Technological Sciences*, 43(3), 191-208.

Cholecalciferol demonstrated solubility in the non-polar solvents while cholecalciferol phosphate dissolved in the more polar solvents and this confirmed the analytical results discussed above. Cholecalciferol is an oil-soluble vitamin $D_3$ and possesses a secosteroid structure, which is similar to steroids. It has a hydroxyl group on its C3 like steroids, but the C9-C10 carbon-carbon bond of ring B of steroid structure is broken (Norman, A. W. (2003) Cholecalciferol, *Encyclopedia of Food Sciences and Nutrition 2nd edition*, 1213-1220). The solubility of cholecalciferol and cholecalciferol phosphate (the compound of the invention) was in accordance with the Log D values of the which were calculated to be 7.13 and 3.86 (pH 7.4), respectively. Although the cholecalciferol phosphate demonstrated more ideal properties for skin delivery, the phosphate group was charged at physiological conditions and it was expected that charged molecules would not readily pass through the hydrophobic barrier of the SC (Inacio, R. (2016) An investigation into the influence of local barometric stress upon xenobiotic percutaneous penetration, King's College London, PhD thesis).

The dielectric constants (or relative permittivity) describe the polarizability of the solvent. The dielectric constant (6) is obtained by equation 7 (Onsager, L. (1936) Electric moments of molecules in liquids, *Journal of the American Chemical Society*, 58(8), 1486-1493.).

$$\frac{\varepsilon - 1}{\varepsilon + 2} = \frac{4\pi}{3} \sum N \left( \alpha + \frac{\mu^2}{3 \, kT} \right) \quad [7]$$

Where a indicates the polarizability of the molecule, p is its permanent electric moment, kT is the energy of thermal agitation, and N is the concentration of molecules. The higher dielectric constant values, the higher the solvent polarity (Wang, P., and Anderko, A. (2001) Computation of dielectric constants of solvent mixtures and electrolyte solutions, *Fluid Phase Equilibria*, 186(1-2), 103-122). According to the solubility studies, the solubility of cholecalciferol increased with a decrease in the dielectric constants while the solubility of cholecalciferol phosphate increased with an increase of solvent electric constant. This trend confirmed that cholecalciferol phosphate was more polar (Fakhree, M. A. A., et al., (2010) The importance of dielectric constant for drug solubility prediction in binary solvent mixtures: electrolytes and zwitterions in water+ ethanol, *Aaps Pharmscitech*, 11(4), 1726-1729). Furthermore, it proved that the solvents whose values of the dielectric constants were around 30 could dissolve both cholecalciferol and cholecalciferol phosphate.

Example 3—Stability and Skin Permeation Study

Methods
Preparation of Donor Solutions

Donor solutions (2.5 mg/mL, 100,000 IU), which is an infinite dose, containing cholecalciferol and cholecalciferol phosphate disodium prepared according to Example 1, were compared to PG:EtOH (50:50) for cholecalciferol and 100% water for cholecalciferol phosphate.

Skin Permeation Studies Using Franz Diffusion Cell Experiments

The Franz diffusion cell was used to investigate the permeation of cholecalciferol and cholecalciferol phosphate through porcine skin. Fresh white adult porcine ears were obtained and any damaged ears were discarded. The ears were removed from the carcass after hair removal. The ears were washed with deionised water, the residual water on the skin surface was immediately removed by blotting with a tissue, visible hairs were trimmed carefully, and the ears were stored at −20° C. for no longer than 30 days until required. On the day of the experiment the skin was defrosted, and the subcutaneous fat was removed using a scalpel. The tissue was cut into the appropriate size sections (0.25 mm thick, 2.19±0.21 cm²) to be mounted with the stratum corneum (SC) facing the donor compartment between donor and receiver compartments of Franz diffusion cells. The pieces of skins were sealed between the two compartments using parafilm, and 12 mm magnetic follows was placed into the receiver compartment. The receiver compartment in the Franz diffusion cell was filled with 100% PG for cholecalciferol; and a 1:1 mixture of PG: (MeOH:PBS (pH 32), 90:10) for cholecalciferol phosphate (9.23±0.23 mL). The cell sealing was confirmed by cell inversion and monitoring solvent back diffusion. Sink conditions were maintained throughout the transport assays. The temperature of the Franz diffusion was maintained at 37° C. in a water bath, to set up the skin temperature 32° C. (Maddock, W. G. and Coller, F. A., (1993) The role of the extremities in the dissipation of heat, *American Journal of Physiology-Legacy Content*, 106(3), 589-596). After 1 h equilibration at 37° C. in the water bath, 1 mL of receiver fluid was taken at time points 0 in 30 min and a fresh 100% PG was replaced to keep the volume content, and 1 mL of each formulation was applied in the donor compartment. After 24 h, the receiver fluid was collected and analysed by HPLC methods.

Deposition Studies in the Skin Layer

At the end of the transport studies, the Franz cells were dismantled, and the donor solution was collected into bottles containing 10 mL of extraction fluid; PG:EtOH (50:50) for cholecalciferol and MeOH:water (90:10) for cholecalciferol phosphate, by wiping the surface of the skin and inside of the donor compartment with two wet and then two dry cotton buds. The SC was removed from the epidermis by tape stripping. A 300 mg weight was used onto the skin to press the adhesive tape to apply defined pressure for 10 sec. A piece of tape that can cover the diffusion area was used to remove the SC. The first two pieces of tape were added into the donor solution, as the first 2 strips were considered as part of the applied formulation and its removal was part of the formulation wash off (Primo, F. L. et al., (2008) In vitro studies of cutaneous retention of magnetic nanoemulsion loaded with zinc phthalocyanine for synergic use in skin cancer treatment, *Journal of Magnetism and Magnetic Materials*, 320(14), e211-e214.; Sheth, N. V. et al., (1987) Measurement of the stratum corneum drug reservoir to predict the therapeutic efficacy of topical iododeoxyuridine for herpes simplex virus infection. *Journal of investigative dermatology*, 89(6), 598-602). The next 20 pieces of tapes were added into bottles containing 10 mL of extraction fluid. The epidermis was removed from the dermis and cut into small pieces by scalpels, placed in bottles containing 2 mL of extraction fluid. Furthermore, the dermis was cut into small pieces and was placed in bottles containing 2 mL of extraction fluid. All skin samples were incubated with extraction fluid detailed above for the surface wash and the samples were placed in a shaking water bath overnight at 32° C., which is the normal skin surface temperature. After homogenising solution with epidermis and dermis for 1 min by Ultra Turrax, filtered solution through 0.2 μm syringe filters of each bottle was collected and analysed by the HPLC method described above. Thus, the amount of cholecalciferol or cholecalciferol phosphate on the surface of the skin, deposited in the SC, epidermis, dermis, and passed into the receiver fluid was determined so that % mass recovery per cm$^2$ per skin could be calculated and drug deposition profile could be obtained.

Recovering the Test Agents from the Skin

To validate the method of test agent recovery from the skin, solutions (1.0 mg/mL) of cholecalciferol phosphate were prepared in 100% PG and 100% water and the same concentration of cholecalciferol was prepared in 100% PG and PG:EtOH (50:50). The precise concentrations in these samples were analysed by HPLC using the method described above.

To assess the chemical stability of cholecalciferol and cholecalciferol phosphate in the donor solutions used in the Franz cell experiments, the 1.0 mg/mL of the samples prepared in the different solvents were incubated in a water bath at 37° C. for 24 h. In addition, to understand the chemical stability of cholecalciferol and cholecalciferol phosphate in the extraction solvents used in the skin deposition studies, a 1 mL of the sample of the drug in the different solvents was added into 10 mL of extraction fluid (PG:EtOH, 50:50 for cholecalciferol and MeOH:water, 90:10 for cholecalciferol phosphate). Samples with the extraction fluid were left in the water bath overnight at 37° C. and the sample concentration was analysed by HPLC method described above.

To assess the impact of any proteins that leaked out of the skin on the HPLC fluid that had been in contact with porcine skin was generated by adding 100% PG to donor and receiver chambers of porcine skin loaded Franz cells. A 2 mL sample of the receiver fluid was collected, and 1 mL of each test solution was added to this fluid left stirring for 24 h at 37° C. and analysed by HPLC method described above.

To verify the percentage of drug that could be recovered from each layer of the skin, each layer was isolated for a 2.19±0.21 cm$^2$ piece of skin, the drug was spiked into each layer, it was incubated and then recovered. For the SC tape stripping as described above was used to isolate the skin layer. A total of 20 pieces of tape were used to remove the SC and these strips were added into sample bottles. The epidermis was removed from the dermis, cut into small pieces, and placed into bottles. The test solutions were spiked (500 μL) into a sample bottle containing the SC and (200 μL) into the sample bottles containing the epidermis and dermis. The samples containing the spiked drugs were left for 1 h for the drugs to absorb into the tissues. After the 1 h incubation period, 10 mL of extraction fluid (PG:EtOH, 50:50 for cholecalciferol and MeOH:water, 90:10 for cholecalciferol phosphate) was added into SC, and 2 mL of extraction fluid was added into epidermis and dermis then incubated in a shaking water bath overnight at 32° C. The solutions with both epidermis and dermis were then homogenised by Ultra Turrax for 1 min and filtered using 0.2 μm syringe filters and analysed by HPLC method.

Data Analysis

All data were presented as mean±standard deviation and statistical analysis of data was performed using Prism GraphPad version 8.4.3. Statistical comparison was performed using a Student's t-test. A statistically significant difference was determined at a minimal level of significance of 0.05 ($p<0.05$), and denoted as *$p<0.05$, $p<0.01$, *$p<0.001$, and ****$p<0.0001$. The number of replicates was 3 in the skin permeation studies of cholecalciferol and 6 in the skin permeation studies of cholecalciferol phosphate, 3 in the recovery studies of both cholecalciferol and cholecalciferol phosphate.

Results

HPLC Analysis for Vitamin $D_3$ Analogues and Method Validation

In order to test the skin penetration of the cholecalciferol phosphate, a new HPLC method was developed and compared with a cholecalciferol reverse phase method according to the ICH guidelines Q2 (R1) in terms of system suitability, accuracy, and precision (ICH Expert Working Group, 2005).

The HPLC chromatogram peaks for cholecalciferol and cholecalciferol phosphate were at retention times of 7.28 min and 3.46 min respectively. The calibration curves for cholecalciferol and cholecalciferol phosphate showed a linearity of 0.9998 and 0.9998 over a concentration range of 1-100 μg/mL for cholecalciferol and 2-2000 μg/mL for cholecalciferol phosphate (Table 2). The mean peak symmetry (As) and column efficiency were 1.06±0.10 and 10320.23±281.76 for cholecalciferol, but the data for cholecalciferol phosphate was not gathered. The LOD and LOQ values for each compound were calculated from inter-day calibration curves. The LOD values for cholecalciferol and cholecalciferol phosphate were 0.94 and 15.20 μg/mL, respectively, whilst the LOQ values were 2.86 μg/mL and 46.06 μg/mL, respectively. The accuracy based on three concentrations (5, 25, 100 μg/mL) for cholecalciferol was 99.02±2.66%. The mean value of the percentage of CV for intra-day and inter-day assay was 0.93±0.47% and 0.67±0.59% for cholecalciferol.

TABLE 2

Method validation parameters of the HPLC for cholecalciferol and cholecalciferol phosphate.

| Validation parameter | ICH level/ limit | Cholecalciferol (≥98%) | Cholecalciferol phosphate, sodium salt (≥96.7%) |
|---|---|---|---|
| System suitability | | | |
| Linearity range (μg/mL) | — | 1-100 | 2-2000 |
| Linearity ($R^2$, n = 3) | >0.99 | ✓ (0.9998) | ✓ (0.9998) |
| Peak symmetry As (n = 3 ± SD) | <2, Ideal As = 1 | ✓ (1.06 + 0.10) | |
| Theoretical plate number N (n = 3 ± SD) | >2000 | ✓ (10320.23 ± 281.76) | |
| LOD (μg/mL) | — | 0.94 | 15.20 |
| LOQ (μg/mL) | — | 2.86 | 46.06 |
| Accuracy % (n = 3 ± SD) | 95-105% | ✓ (99.02 ± 2.66) | |
| Precision | | | |
| Intra-day variability (repeatability, % CV) | <2% | ✓ (0.93 ± 0.47) | |

TABLE 2-continued

Method validation parameters of the HPLC for cholecalciferol and cholecalciferol phosphate.

| Validation parameter | ICH level/ limit | Cholecalciferol (≥98%) | Cholecalciferol phosphate, sodium salt (≥96.7%) |
|---|---|---|---|
| Intra-day variability (intermediate precision, % CV) | <2% | ✓ (0.67 ± 0.59) | |

The correlation coefficient (R) values for the generated calibration curves were more than 0.99, hence all calibration curves were deemed to show excellent linearity. The theoretical plate numbers showed both methods depicted good column efficiency. The calculated peak symmetry factor demonstrated that the peak of cholecalciferol was symmetrical. The accuracy and calculated percentage of CV were within 95-105% and less than 2% respectively, which satisfied ICH guidelines.

Recovery of the Actives from the Skin

The chemical stability of cholecalciferol and cholecalciferol phosphate in 100% PG were 90% and 100% respectively, which suggested that the phosphate analogue was more chemically stable compared to cholecalciferol (Table 3). The addition of ethanol to the PG reduced the chemical stability of the cholecalciferol phosphate. Likewise, cholecalciferol phosphate in water showed 20% degradation. In terms of matrix interference, both cholecalciferol and calcitriol showed a good recovery from the PG receiver fluid. When extracting the drug from the tissues the PG donor systems showed an acceptable recovery, whilst PG:EtOH (50:50) showed a lower recovery, which was particularly low in the dermis (46.63±8.37%).

TABLE 3

The recovery of all vitamin $D_3$ by matrix interference, extraction process validation, and chemical stability during skin permeation. Each data was expressed as mean ± SD (n = 3).

| % Recovery | | Cholecalciferol | | Cholecalciferol phosphate | |
|---|---|---|---|---|---|
| Solvents of samples | | 100% PG | PG:EtOH (50:50) | 100% PG | 100% water |
| Chemical stability | With extraction fluid | PG:EtOH (50:50) | | MeOH:water (90:10) | |
| | | 91.76 ± 0.87 | 90.52 ± 0.42 | 95.19 ± 5.88 | 76.01 ± 1.42 |
| | Without extraction fluid | 89.86 ± 0.94 | 90.98 ± 0.37 | 100.42 ± 1.28 | 79.74 ± 7.51 |
| Matrix interference | Receiver fluid | 94.48 ± 2.56 | 92.10 ± 3.28 | 79.25 ± 9.40 | 109.56 ± 11.70 |
| Drug extraction validation | SC | 90.76 ± 3.78 | 81.46 ± 0.78 | Data not collected | Data not collected |
| | | 92.55 ± 76.32 | 81.95 ± 1.79 | | |
| | Epidermis | 104.86 ± 0.54 | 46.63 ± 8.37 | Data not collected | Data not collected |
| | Dermis | 91.76 ± 0.87 | 90.52 ± 0.42 | Data not collected | Data not collected |

PG was chosen as a vehicle for skin permeation studies because both cholecalciferol and cholecalciferol phosphate were soluble in PG. It is one of the most commonly used vehicles for lipophilic drugs in transdermal formulations (Bendas, B. et al., (1995) Influence of propylene glycol as cosolvent on mechanisms of drug transport from hydrogels, *International journal of pharmaceutics*, 116(1), 19-30), and can enhance permeation by interacting with the polar head group of lipids (Kubota-Ishida, N., et al., (2018) In vitro human onychopharmacokinetic and pharmacodynamic analyses of ME1111, a new topical agent for onychomycosis, Antimicrobial agents and chemotherapy, 62(1), e00779-17). However, the permeation rate is dependent on the affinity of the permeant with the test molecule and the skin (Benaouda, F. (2010) A Study of In Situ Drug Supersaturation for Skin Delivery, *King's College London*, PhD thesis.). Cholecalciferol phosphate appeared chemically stable in PG and the recovery from the skin permeation processes was good. However, the other solvents showed some chemical instability issues with the actives. It was thought that EtOH might have worsened the chemical stability and the ability of the test molecule to bind to the skin (Zang, X. et al., (2003) Measurement of protein metabolism in epidermis and dermis, *American physiological society*, 286 (6), E1191-E1201). The chemical stability of cholecalciferol phosphate in water was not as good as the PG formulation, but surprisingly it still allowed the cholecalciferol phosphate to pass into the skin despite the ionisation of the molecule.

Skin Permeation Study

Figure 5A:
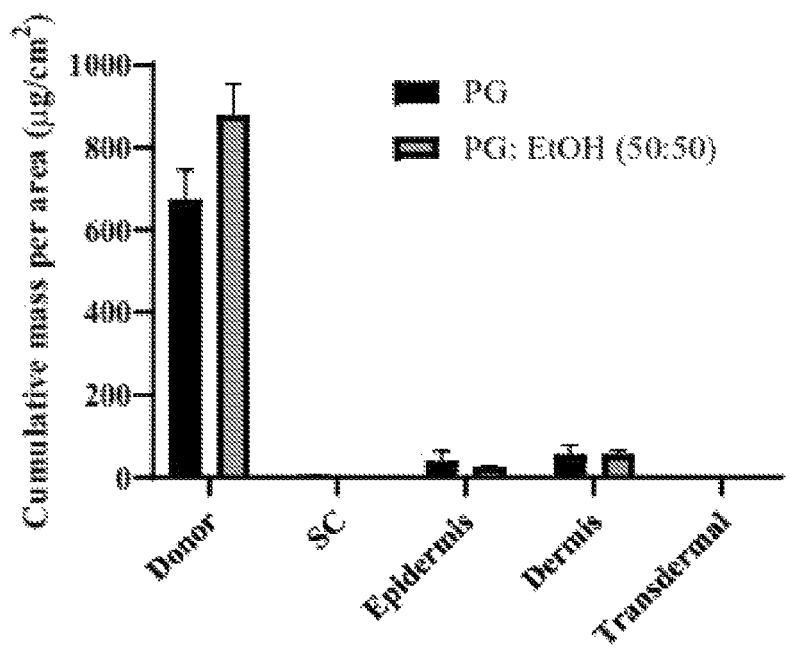
FIGS. 5A and 5B—Porcine skin permeation study of (FIG. 5A) cholecalciferol in propylene glycol or a 50:50 mix of propylene glycol and ethanol, (FIG. 5B) cholecalciferol phosphate dissolved in water or propylene glycol (PG). The receiver compartment in the Franz diffusion cell was filled with 100% PG for cholecalciferol; and a 1:1 mixture of PG:(MeOH:PBS (pH 3.2), 90:10) for cholecalciferol phosphate. Each point represents mean±SD (n=3 for cholecalciferol, n=6 for cholecalciferol phosphate). Each graph shows the level of compound in drug containing liquid applied to the skin, i.e., the donor, stratum corneum (SC), epidermis, dermis and compound delivered transdermally.
Figure 5B:
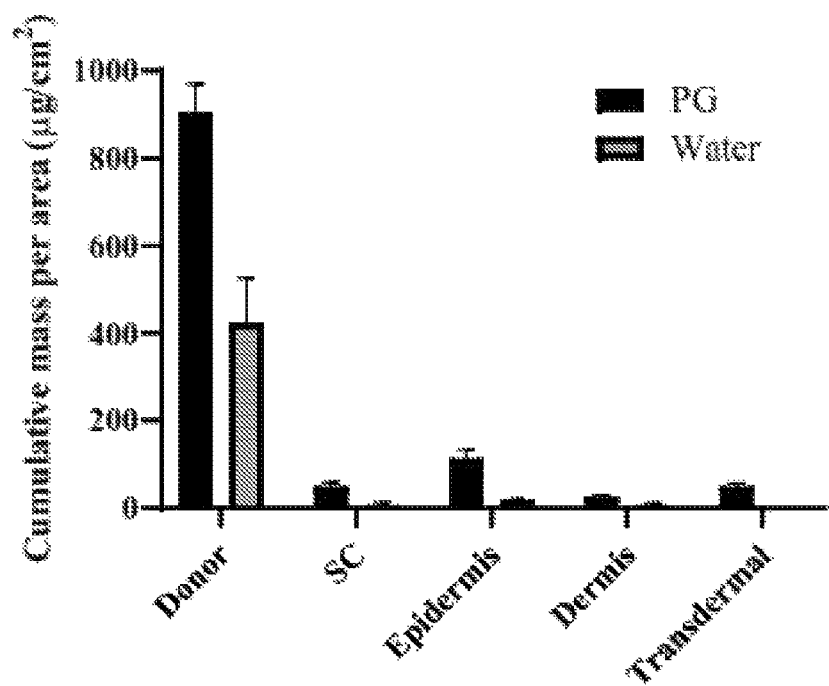

The total penetration of cholecalciferol into the skin showed no statistical difference (p>0.05, Student's t-test) using 100% PG and PG:EtOH (50:50) as the delivery vehicles with 96.51±17.88 µg/cm$^2$ and 80.63±13.23 µg/cm$^2$ passing into the skin, respectively (FIG. 5A). For cholecalciferol phosphate, 189.99±29.10 µg/cm$^2$ deposited in the skin (1.97 times more than the cholecalciferol) using PG as the solvent and 29.59±9.44 µg/cm$^2$ when water was the solvent. (FIG. 5B)

Figure 6:
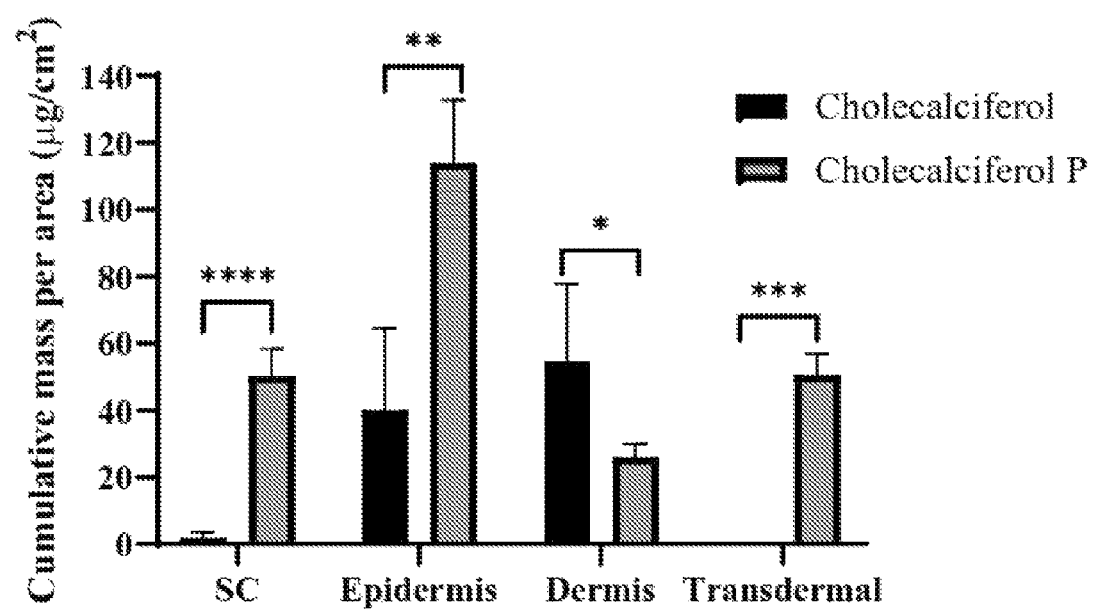
FIG. 6—Skin deposition study in porcine skin layers and transdermal permeation, showing the comparison between cholecalciferol and cholecalciferol phosphate ((cholecalciferol P) in propylene glycol (PG) found in each skin layer. Each point represents mean±SD (n=3 for cholecalciferol, n=6 for cholecalciferol phosphate). **p<0.0001, *p<0.001, **p<0.01, *p<0.05.

Cholecalciferol phosphate deposition in the SC (50.15±8.20 µg/cm$^2$) and the epidermis (113.96±18.79 µg/cm$^2$) was statistically higher (p<0.0001, p<0.01, respectively, Student's t-test) than cholecalciferol in the SC (1.79±1.80 µg/cm$^2$), the epidermis (40.13±24.26 µg/cm$^2$), but the deposition in the dermis was not statistically different (p>0.05, Student's t-test). Only cholecalciferol phosphate dissolved in PG allowed transdermal penetration and 50.50±6.40 µg/cm$^2$ passed all the way through the skin (FIGS. 5B and 6). The total recovery of the cholecalciferol from the skin permeation experiments using PG was 61% compared to the 90% for cholecalciferol phosphate in PG (Table 3). The recovery for the cholecalciferol phosphate in water was 40% and the recovery for the cholecalciferol in PG:EtOH (50:50) was 80%.

When tested in the skin, cholecalciferol did not pass through the tissue over the 24 h experiment. Surprisingly, water-soluble cholecalciferol phosphate according to the invention showed better permeation into and through the skin (FIG. 6). This implied that the introduction of a charged phosphate in the cholecalciferol improved skin absorption, especially into blood, compared to cholecalciferol. Cholecalciferol phosphate has a surfactant like structure, having both a polar head group and non-polar tail and perhaps the amphiphilic nature of the molecule allowed passage through the skin, although for cholecalciferol such a phenomenon has previously not been reported (Bernardo, F. P., and Saraiva, P. M. (2008) A theoretical model for transdermal drug delivery from emulsions and its dependence upon formulation, *Journal of pharmaceutical sciences*, 97(9), 3781-3809).

Example 4—Synthesis of Vitamin D$_3$ Phosphate Acid Form

Synthesis
Method

Cholecalciferol (1.50 g, 3.90 mmol) in anhydrous THF (25 mL) with triethylamine (1.63 mL, 11.7 mmol, 3 eq) was added to a solution of the POCl$_3$ (0.510 mL, 5.46 mmol, 1,4 eq) in anhydrous THF (15 mL) under nitrogen, stirring, at room temperature. This reaction was stirred for 2.5 h. The main reaction by-product, solid white triethylamine hydrochloride powder, was removed by suction filtration.

Distilled water (20 mL) was added to the reaction mixture, and immediately the solution was evaporated under reduced pressure. The residue was extracted with DCM. A 20 mL aliquot of saturated NH$_4$Cl was added into the collected organic layer and the organic layer was collected. A 20 mL aliquot of saturated NaCl solution was added and organic layer was collected, and the organic layer was dried over by anhydrous MgSO$_4$ overnight at −20° C. The white/yellow powder was obtained by a rotary evaporator.

Results

The synthesis of cholecalciferol phosphate acid form was successful, producing a white/yellow powder. To characterise the compound structure, NMR analysis and mass spectrometry by direct infusion in negative ion mode, and HPLC analysis were conducted.

NMR Spectroscopy

Figure 7A:
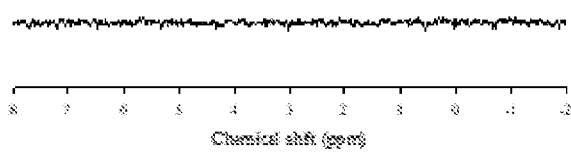
FIGS. 7A and 7B—Phosphorus NMR spectra of (FIG. 7A) the starting material cholecalciferol, and (FIG. 7B) the synthesised cholecalciferol phosphate. The sample (20 mg) was dissolved in deuterated chloroform (600 μL).
Figure 7B:
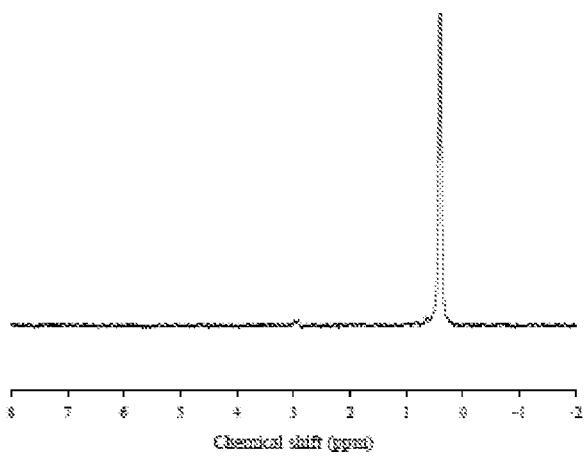

FIG. 7 shows the comparison of phosphorus NMR spectra between the starting material cholecalciferol and the synthesised cholecalciferol phosphate acid form. The phosphorus NMR analysis of the starting material cholecalciferol showed no signals as the structure does not contain any phosphorus atoms (FIG. 7A). The synthesised cholecalciferol phosphate acid form showed one split peak at approximately 0.40 ppm which indicated that the monomeric form of the cholecalciferol phosphate was formed (FIG. 7B), and no bis-cholecalciferol phosphate was present.

Figure 8A:
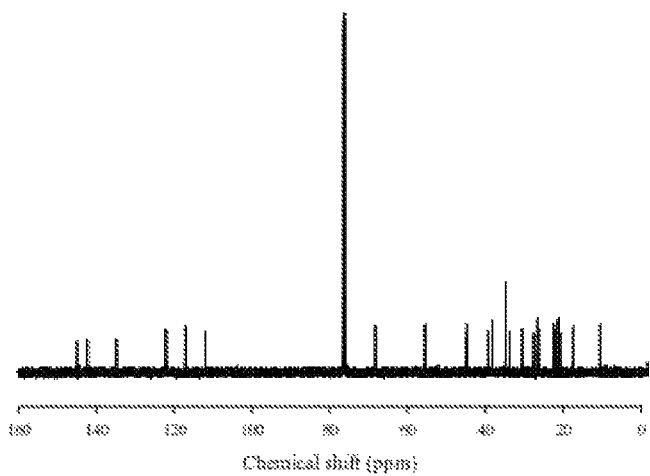
FIGS. 8A and 8B—Carbon NMR spectra of (FIG. 8A) the starting material cholecalciferol, and (FIG. 8B) the synthesised cholecalciferol phosphate. The sample (20 mg) was dissolved in deuterated chloroform (600 μL).
Figure 8B:
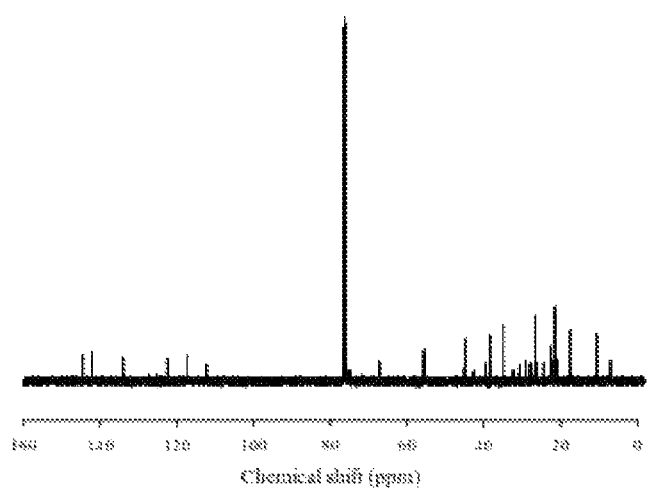

In the carbon NMR, 26 peaks were identified for the starting material cholecalciferol (FIG. 8A). The synthesised cholecalciferol phosphate acid form also generated 26 peaks (FIG. 8B). All 26 peaks of the starting material aligned in terms of ppm to the synthesised cholecalciferol phosphate acid form, which showed that the synthetic procedure did not degrade the vitamin's structure.

Figure 9A:
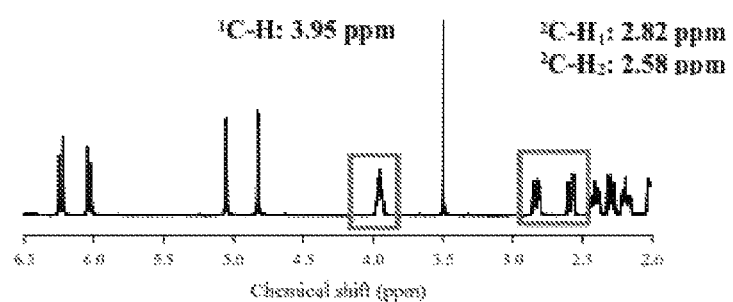
FIGS. 9A and 9B—Proton NMR spectra of (FIG. 9A) the starting material cholecalciferol, and (FIG. 9B) the synthesised cholecalciferol phosphate. The sample (20 mg) was dissolved in deuterated chloroform (600 μL). The change in protons of C2 and C1 caused by phosphorylation are highlighted.
Figure 9B:
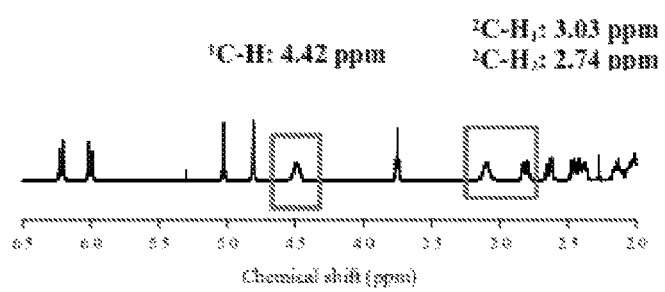

The most important protons of cholecalciferol to track in the reaction were the protons attached to C1 and C2. These were determined at 3.95 ppm, an octet peak ($^1$C—H), 2.82 ppm, a doublet of doublets ($^2$C—H$_1$) and 2.82 ppm, a doublet of doublets ($^2$C—H$_2$) in the starting material (FIG. 9A). The synthesised cholecalciferol phosphate acid form displayed a multiplet peak at 4.42 ppm which was assigned to be the proton of C1. This peak had changed compared to the starting material, as expected, due to the introduction of the phosphorus group. The 2 protons of C2 were shifted to 3.03 ppm and 2.74 ppm from 2.82 ppm and 2.58 ppm, as a result of the phosphorus group (FIG. 9B). These results demonstrated that phosphate had been introduced into cholecalciferol phosphate at the correct position.

LC/MS

The mass spectrum performed by negative ESI mode provided the compound molecular ions (m/z) are expressed as [M-H]. As the calculated m/z of cholecalciferol phosphate is 464.63 g/mol, the peak detected at m/z 463.10 was assigned to cholecalciferol phosphate acid form.

HPLC

HPLC analysis was conducted using an HPLC system consisting of an auto-sample injector, a pump, and a diode array detector (Agilent technologies, USA). The data was collected and analysed using a Chemstation data acquisition system. The HPLC column was a Phenomenex Kinetex Biphenyl column (250×4.6 mm, 5 Å diameter). A gradient eluent method with mobile phase A (water:MeOH, 80:20 and 0.1% TFA) and mobile phase B (ACN: MeOH:water, 70:20:10 and 0.1% TFA) was performed for 20 min. The separations were achieved with B: 50% (0 min), increased to 90% (10 min), and held at 90% for 5 min, decreased back to 50% (2 min) and held at 50% for 3 min. The injection volume was 50 µL, the flow rate was 1.0 mL/min. A UV detection wavelength of 265 nm was employed.

The synthesised cholecalciferol phosphate had a retention time of 12.87 min, providing one sharp peak. The purity of the cholecalciferol phosphate was 96.31±0.71%.

Elemental Analysis

Elemental analysis on the product was carried out as described in Example 1. The theoretical composition of carbon, hydrogen and phosphate in cholecalciferol phosphate acid is 69.8%, 9.76%, and 6.67%, respectively. In the elemental analysis, the composition of cholecalciferol phosphate acid was found to be 69.55%, 10.75%, 6.21% which showed a carbon match of 99.63%, a hydrogen match of 103.02%, a phosphate match of 93.10%.

Example 5—Skin Permeation and Chemical Stability of Vitamin D Phosphate Acid and Vitamin D Phosphate Sodium Salt Methods Development of Cholecalciferol Phosphate Acid/Disodium Salt Patch Formulations Pre-formulation studies were performed to assess the solubility of 2.0 mg, 5.0 mg, 7.5 mg and 10 mg of cholecalciferol phosphate acid in 500 µL hexane. To each solution, 175 µL of the transdermal adhesive DURO-TAK 87-2051 (51.5 w/v %) was added, and vortexed. Then 2.0 µL of α-tocopherol and 2.5 µL of diethylene glycol monoethyl ether were added and vortexed. The visual solubility was assessed.

Pre-formulation studies were also performed to assess the solubility of 8.0 mg, 15.0 mg, 20.0 mg, and 30.0 mg of cholecalciferol phosphate disodium salt in 4.4 mL MeOH:water (10:1). To this solution 4 mg of α-tocopherol in 3 mL ethyl acetate was added and 167 µL of the transdermal adhesive DURO-TAK 87-2051 (51.5 w/v %) in 7 mL ethyl acetate with 6 µL diethylene glycol monoethyl ether was also added.

Each solution (3×3 cm) was cast onto the backing (3M™ Scotchpak™ Polyester Backing Film Laminate 9730, UK) to determine the clarity, and the saturation limit of the test agents in the adhesive mixtures.

For the final formulation, 61.5 mg of cholecalciferol phosphate acid in 4.1 mL hexane was added into 1.435 mL DURO-TAK 87-2051 (51.5 w/v %) with 16.4 µL α-tocopherol and 20.5 µL diethylene glycol monoethyl ether. Likewise, 120 mg of cholecalciferol phosphate disodium salt in 35.2 mL MeOH:water (10:1) was added to 1.336 mL of DURO-TAK 87-2051 (51.5 w/v %) in 56 mL ethyl acetate with 32 mg of α-tocopherol and 48 µL diethylene glycol monoethyl ether. Each formulation was spread evenly on the 10×10 cm patch tray and left overnight to dry completely. Following the complete drying of the solvents, the adhesive layer was covered by the M3 Release layer (SCOTCHPAK 9755, UK), compressed, and then cut using a 34 mm circular manual die cutter (SCP Super Cutting Press, UK).

Skin Permeation Study

Preparation of Donor Solutions

Cholecalciferol, cholecalciferol phosphate salt (2.5 mg/mL, 100,000 IU) and cholecalciferol phosphate acid (4.69 mg/mL, 187,600 IU) were saturated in 100% PG. Subsequently, 1 mL aliquots were applied to the skin.

Skin Permeation Studies Using Automated Franz Diffusion Cells

The automated Franz diffusion cell was used to investigate the permeation of cholecalciferol, cholecalciferol phosphate salt and cholecalciferol phosphate acid through porcine skin. Fresh white adult porcine ears were obtained from a local butcher (Ginger Pig, UK). Any damaged ears were discarded. The ears were removed from the carcass after hair removal. The ears were washed with deionised water, the residual water on the skin surface was immediately removed by blotting with a tissue, visible hairs were trimmed carefully, and the ears were stored at −20° C. for no longer than 30 days until required. On the day of the experiment the skin was defrosted, and the subcutaneous fat was removed using a scalpel. The tissue was dermatomed (1.0 mm thick) and cut into the appropriate size sections (2.5 cm diameter) to be mounted with the stratum corneum facing the donor compartment between donor and receiver compartments of the automated Franz diffusion cell (a donor surface area of 0.95 cm$^2$). The receiver compartment was filled with 10 mL PG:water (80:20) carefully. The cell sealing was confirmed by cell inversion and monitoring solvent back diffusion. Sink conditions were maintained throughout the transport assays. The temperature of the automated Franz diffusion cell was maintained at 32° C. (Maddock and Coller, 1993). After 1 h equilibration, 450 µL of the receiver fluid was taken at time points 0 h prior to the experiment. 1 mL of each formulation was applied in the donor compartment. Samples (450 µL) of the receiver fluid were taken at predetermined time intervals over 24 h (1, 2, 4, 6, 8, 12, and 24 h), and a fresh PG:water (80:20) was replaced to keep the volume content. The collected receiver fluid was analysed by HPLC methods described previously.

Deposition Studies in the Skin

At the end of the transport studies, the Franz cells were dismantled, and the donor solution was collected into bottles containing 10 mL of extraction fluid; MeOH for cholecalciferol, cholecalciferol phosphate acid and MeOH:water (90:10) for cholecalciferol phosphate salt, by wiping the surface of the skin and the inside of the donor compartment with two wet and then two dry cotton buds. The whole skin was cut into small pieces by scalpels and placed in bottles containing 5 mL of extraction fluid. All skin samples were incubated with extraction fluid detailed above for the surface wash and the samples were placed in a shaking water bath overnight at 32° C., which is the normal skin surface temperature. All skin samples were tissue lysed as above for 40 min. After homogenising the solution with skin tissue for 1 min by Ultra Turrax, the samples were centrifuged for 15 min and the supernatant was filtered through 0.45 µm syringe filters. Each collection was analysed by the HPLC method described above. Thus, the amount of each test agent on the surface of the skin, deposited in the skin, and passed into the receiver fluid was determined so that % mass recovery per cm$^2$ per skin could be calculated and drug deposition profiles could be obtained.

Recovering the Test Agents from the Skin

To validate the method of test agent recovery from the skin, solutions (1.0 mg/mL) of each vitamin D analogue were prepared in 100% PG. The precise concentrations in these samples were analysed by HPLC method described above. To assess the chemical stability of each test agent in the donor solutions used in the Franz cell experiments, 1.0 mg/mL of the samples prepared in 100% PG were incubated in a water bath at 37° C. for 24 h. In addition, to understand the chemical stability of each test agent in the extraction solvents used in the skin deposition studies, 1 mL of the drug sample in 100% PG was added into 10 mL of extraction fluid (MeOH for cholecalciferol, cholecalciferol phosphate acid, and MeOH:water, 90:10 for cholecalciferol phosphate disodium salt). Samples in PG (n=3) and samples in PG with the extraction fluid (n=3) were left in the water bath overnight at 37° C. and the sample concentration was analysed by the HPLC method described above. To assess whether the HPLC fluid had been impacted by any proteins that had leaked out of the skin, PG:water, 80:20 was added to donor and receiver chambers of porcine skin loaded Franz cells (n=3). A 5 mL sample of the receiver fluid was collected, and 25 µL of each test solution was added to this fluid and diluted to MeOH (1:1) and analysed by the HPLC method described previously. To verify the percentage of drug that could be recovered from the skin tissue, the skin sections were dermatomed (1 mm thickness) (n=3). The test solutions were spiked (50 µL) into a sample bottle containing the chopped dermatomed skin tissue. The samples containing the spiked drugs were left for 1 h for the drugs to absorb into the tissues. After the 1 h incubation period, 5 mL of extraction fluid (MeOH for cholecalciferol, cholecalciferol phosphate acid, and MeOH:water, 90:10 for cholecalciferol phosphate disodium salt) was added into each piece of the dermatomed skin tissue, then incubated in a shaking water bath for 1 h. The solutions were then tissue lysed by a tissue lyser for 40 min and homogenised by Ultra Turrax for 1 min and filtered using 0.45 µm syringe filters, centrifuged for 10 min at 13,000 rpm, and analysed by the HPLC method described above. In terms of cholecalciferol phosphate acid, after 1 h incubation and adding 5 mL extraction fluid, immediately the solutions with skin tissues were tissue lysed by a tissue lyser for 15 min. The solutions were then centrifuged for 10 min at 13,000 rpm and the supernatants were analysed by the HPLC method described above.

Chemical Stability Study of Cholecalciferol Phosphate Acid/Disodium Salt

The chemical stability of cholecalciferol phosphate acid/disodium salt was assessed in three different conditions over a 4-week period. Aliquots of 2 mg for each sample was stored at room temperature, 4° C., and −20° C. in a glass bottle covered with foil. A 20 mL sample of MeOH and MeOH:water (90:10) was added to cholecalciferol phosphate acid and cholecalciferol phosphate disodium salt, and the concentration and purity were assessed every week by the HPLC method described previously. The peak area was used to calculate sample concentration and the gradient of the data points being used to calculate the degradation rate.

Solubility Study of Cholecalciferol Phosphate Disodium Salt in Water

Cholecalciferol phosphate disodium salt was added into 1.5 mL distilled water until it generated precipitation. The supersaturated solution was filtered into a glass bottle through a 0.45 µm syringe filter, diluted in water (1:100), then MeOH was added to make MeOH:water (90:10), and injected into the HPLC.

Data Analysis

All data were presented as mean±standard deviation and statistical analysis of data was performed using Prism GraphPad version 8.4.3. Statistical comparison was performed using a Student's t-test. A statistically significant difference was determined at a minimal level of significance of 0.05 ($p<0.05$), and denoted as *$p<0.05$, $p<0.01$, *$p<0.001$, and ****$p<0.0001$. The number of replicates was 5 in the skin permeation studies, and 3 in the recovery studies of each vitamin analogue.

Results

Development of Cholecalciferol Acid/Salt Patch Formulations

Patch formulations were produced containing 2.07, 5.02, 7.34, 9.56 (w/w %) cholecalciferol phosphate acid dissolved in hexane, 2 µL α-tocopherol, and 2.5 µL diethylene glycol monoethyl ether. Patch formulations were also produced containing 7.69, 13.57, 17.24, 23.81 (w/w %) cholecalciferol phosphate disodium salt dissolved in MeOH:water: ethyl acetate (4:0.4:7), 4 mg α-tocopherol, and 6 µL diethylene glycol monoethyl ether. The patches containing 7.34 and 9.56 (w/w %) cholecalciferol phosphate acid and 17.24 and 23.81 (w/w %) cholecalciferol phosphate disodium salt produced precipitation (FIG. 10). 5.02 (w/w %) cholecalciferol phosphate acid and 13.57 (w/w %) cholecalciferol phosphate disodium salt were selected as the saturated concentrations (the highest loading without precipitation), and they were cast on a 10×10 cm square tray made of the transdermal backing ($3M^TM$ Scotchpak™ Polyester Backing Film Laminate 9730, UK). Following the complete drying of the solvents, the adhesive layer was covered by M3 Release liner (SCOTCHPAK 9755, UK), compressed, and then cut using a 34 mm circular manual die cutter (SCP Super Cutting Press, UK). Using the solubility information, it was notable that a very similar thermodynamic activity was achieved across the different formulations and thus these were considered equivalent in terms of thermodynamic drive of the actives into the skin (Table 4).

TABLE 4

The solubility in donor solution, proposed concentration in permeation studies and thermodynamic activity of each vitamin D analogue.

| Drug | Solubility in PG (water) (mg/mL) | Proposed concentration in permeation studies (mg/mL) | Thermodynamic activity |
|---|---|---|---|
| Cholecalciferol | 3.15 (PG) | 2.5 | 0.8 |
| Cholecalciferol phosphate salt | 2.5 (PG) | 2.5 | 1.0 |
| Cholecalciferol phosphate acid | 4.69 (PG) | 4.69 | 1.0 |
| Cholecalciferol patch | Not Determined | 400 mcg/patch | Not Determined |
| Cholecalciferol phosphate salt patch | 89.82 (in adhesive) | 89.82 (in adhesive) | 1.0 |
| Cholecalciferol phosphate acid patch | 28.57 (in adhesive) | 28.57 (in adhesive) | 1.0 |

Recovery of the Actives from the Skin

The chemical stability of each test agent was between 73-88.5% with cholecalciferol phosphate acid/disodium salt more chemically stable compared to cholecalciferol (Table 5). The addition of extraction fluid increased the chemical stability of each test agent, and there was no major difference in terms of stability between each test system. In terms of matrix interference, cholecalciferol and calcitriol showed the lowest recovery. When extracting the drug from the tissues, cholecalciferol showed an acceptable recovery, but cholecalciferol phosphate salt showed only about 50%, and therefore the calibration curve in the matrix were used to take account of these low recoveries.

TABLE 5

The recovery percentage of all vitamin $D_3$ by chemical stability, matrix interference, and extraction process validation during skin permeation. Each data represents mean ± SD (n = 3).

| % Recovery | | Cholecalciferol | Cholecalciferol P acid | Cholecalciferol P salt |
|---|---|---|---|---|
| Chemical stability | With extraction fluid | MeOH | | MeOH:water (90:10) |
| | | 91.97 ± 0.63 | 92.24 ± 2.26 | 95.18 ± 4.82 |
| | Without extraction fluid | 77.46 ± 7.05 | 88.49 ± 3.35 | 81.87 ± 2.46 |
| Matrix interference | Receiver fluid | 90.31 ± 4.15 | 90.99 ± 6.25 | 84.57 ± 4.23 |
| Drug extraction validation | | 75.01 ± 3.33 | 95.77 ± 19.96 | 70.00 ± 4.67 |

Skin Permeation Study

Figure 11A:
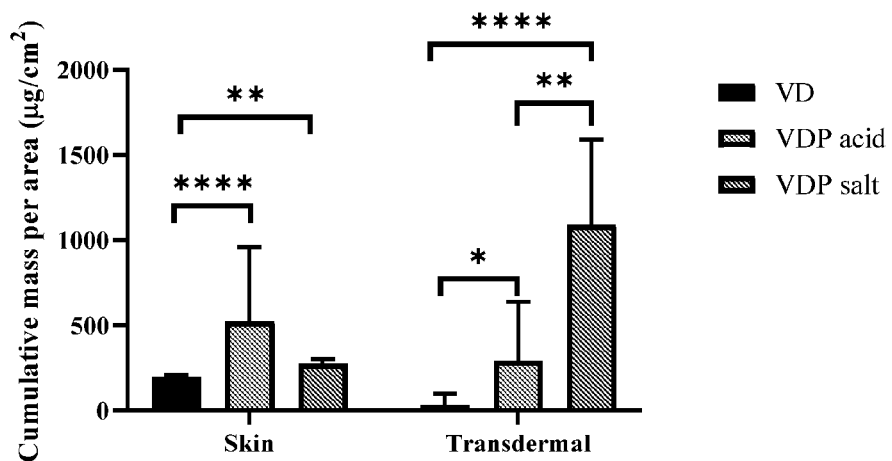
FIGS. 11A and 11B—Skin permeation study of (FIG. 11A) the comparison between cholecalciferol (VD) and cholecalciferol phosphate acid (VDP acid)/disodium salt (VDP disodium salt) in PG formulation, showing the mass deposited in the skin and receiver fluid using 1.0 mm porcine skin.

Cholecalciferol delivered 195.48±13.96 µg/cm², 7,819.1 IU, into the skin and 31.13±65.62 µg/cm², 1,245.1 IU, through the skin when formulated in PG (n=5) (FIG. 11). Both cholecalciferol phosphate acid/disodium salt PG formulations delivered significantly more into the skin (p<0.0001, p<0.005 respectively, Student's t-test) (522.79±436.69 µg/cm², 20,911.4 IU and 272.44±29.31 µg/cm², 10,897.4 IU, respectively) compared to cholecalciferol (FIG. 11A). Cholecalciferol phosphate acid and the disodium salt also showed about 9.34-fold and 35.02-fold higher transdermal permeation through the skin (290.70±344.85 µg/cm², 11,628 IU, and 1090.10±500.38 µg/cm², 43,604 IU respectively, p<0.05, p<0.0001 respectively, Student's t-test) compared to cholecalciferol (31.13±65.62 µg/cm², 1,245.2 IU). Total recovery of cholecalciferol, cholecalciferol phosphate disodium salt, and cholecalciferol phosphate acid were 94.25±5.85%, 94.84±6.47%, and 92.57±7.66%, respectively. Table 4 shows the thermodynamic activity of the agent in each formulation, which was around 1.0. As the flux of drug is proportional to its thermodynamic activity in the vehicle the initial formulation was considered equivalent and thus the differences were due to their different chemical nature.

Figure 11B:
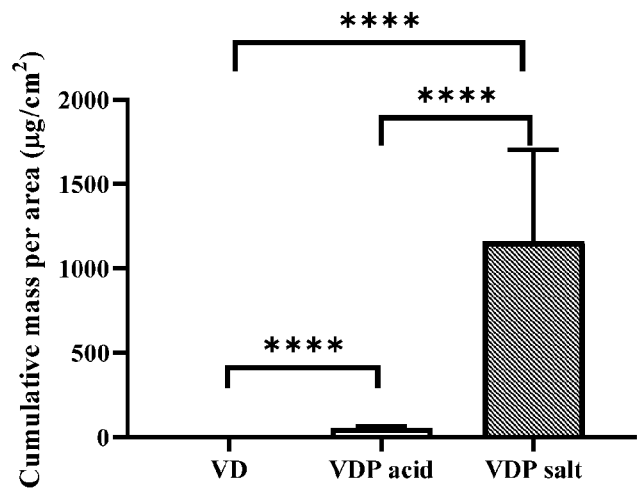
Figure 12:
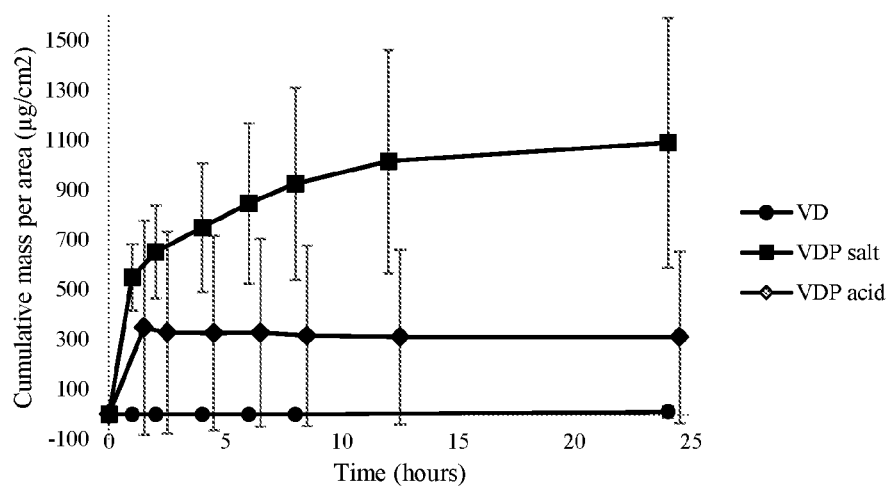
FIG. 12—The results of cumulative mass of cholecalciferol (VD) and cholecalciferol phosphate acid (VDP acid)/disodium salt (VDP disodium salt) in PG formulation detected with time points over 24 h.
Figure 13A:
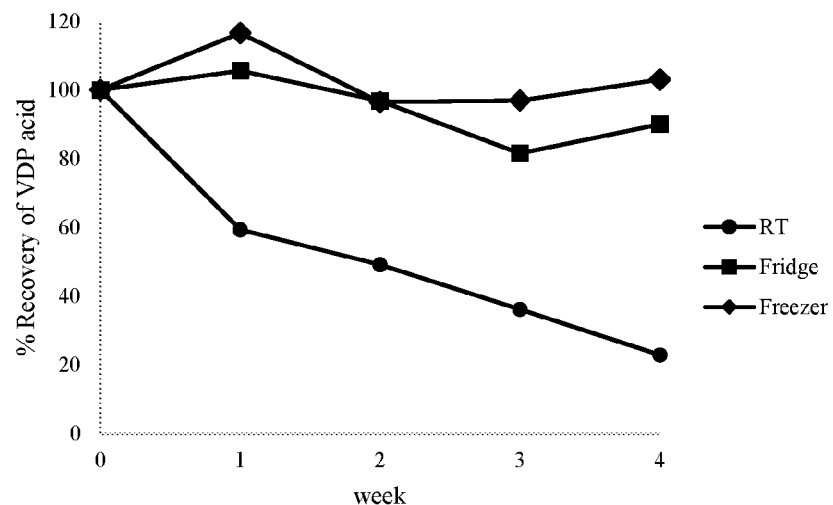
FIGS. 13A, 13B, 13C and 13D—Chemical degradation rates of (FIG. 13A) cholecalciferol phosphate acid (VDP acid), and (FIG. 13B) cholecalciferol phosphate disodium salt (VDP salt).
Figure 13B:
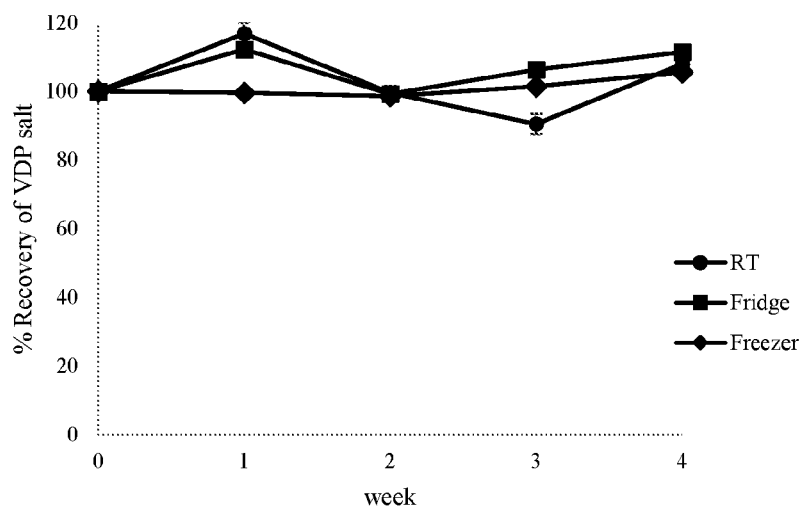
Figure 13C:
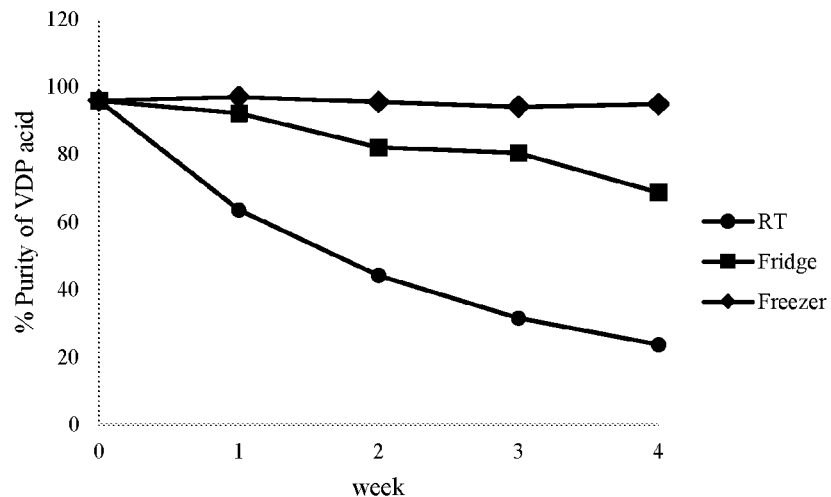
Figure 13D:
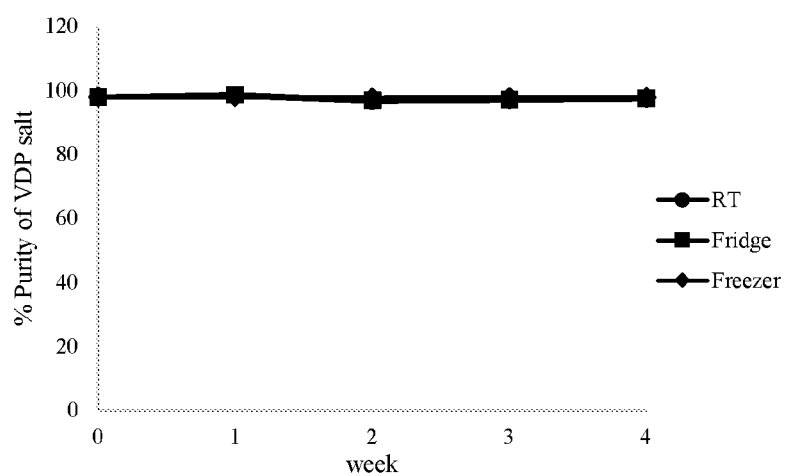

Cholecalciferol phosphate disodium salt patch formulation showed the highest deposition in the skin (1161.21±544.32 µg/cm², 46,448.4 IU), which was statistically higher (p<0.0001, Student's t-test) than cholecalciferol phosphate acid (56.54±9.39 µg/cm², 2,261.6 IU) and cholecalciferol (0.68±2.64 µg/cm², 27.2 IU) (FIG. 11B). In addition, cholecalciferol phosphate acid patch formulation deposition in the skin was statistically higher (p<0.0001, Student't-test) than cholecalciferol patch formulation. None of the patch formulations showed permeation through the 1.0 mm porcine skin but given that the epidermis is considered to be around 500 micrometres thick, the agents delivery into the tissue in this ex-vivo model was considered likely to result in dermal deposition.

Chemical Stability Study of Cholecalciferol Phosphate Acid/Disodium Salt

The chemical stability of cholecalciferol phosphate acid/disodium salt demonstrated that cholecalciferol phosphate disodium salt was more stable and kept a higher purity than cholecalciferol phosphate acid over a 4-week period in each storage condition (FIG. 13). Over 4 weeks, cholecalciferol phosphate acid (FIG. 13A) lost 77.15% and 9.98% of the original compound at room temperature and 4° C., respectively, whilst cholecalciferol phosphate disodium salt did not degrade at any of the storage conditions (FIG. 13B). The purity of cholecalciferol phosphate acid (FIG. 13C) was reduced by 72.2%, 27.18%, and 1.03% at room temperature, 4° C., and −20° C., respectively, whilst the purity of cholecalciferol phosphate disodium salt (FIG. 13D) changed less than 1% at all storage conditions.

Determination of the Solubility of Cholecalciferol Phosphate Disodium Salt in Water HPLC analysis detected the peak of cholecalciferol phosphate disodium salt in water. After calculation of the concentration of cholecalciferol phosphate disodium salt using a calibration curve described previously, the solubility was determined to be 78.7 mg/mL.

Example 6—Optimisation of the Hydrolysis Step in the Synthesis of Cholecalciferol Phosphate Method Cholecalciferol (3.00 g, 7.80 mmol) (double the amount used in the previous examples) in anhydrous THF (50 mL) with triethylamine (3.26 mL, 23.40 mmol, 3 eq) was added to the solution of the $POCl_3$ (1.021 mL, 10.92 mmol, 1,4 eq) in anhydrous THF (30 mL) under nitrogen, stirring, at room temperature. This reaction stirred for 2.5 h. The main reaction by-product, solid white triethylamine hydrochloride powder, was removed by suction filtration. The filtrate (about 80 ml) was split into 5×16 ml aliquots, and distilled water (14 ml/5=2.8 mL) was added into each aliquot of the filtrate. The reaction was allowed to stir for 10, 30, 60, 90, 1440 min at room temperature. The mixture was extracted with hexane and the organic layer was dried over by anhydrous $MgSO_4$. A yellow oil obtained by a rotary evaporator was dissolved in THF (3 mL), and 3 M NaOH (1 mL), stirring for a few minutes. Ethanol was added to the aqueous layer under heat, resulting in white/yellow precipitate of the title product as the disodium salt.

Results 5 different hydrolysis reaction times were employed on the same starting material. The starting material was the reaction mixture divided into 5 aliquots after the 2.5 h phosphorylation reaction. The yield and purity of the 5 cholecalciferol phosphate disodium salts synthesised with different hydrolysis reaction times were compared. Table 6 shows the yield of cholecalciferol phosphate disodium salt for each hydrolysis reaction time. 60 min hydrolysis reaction time showed the highest yield, whilst 10 min hydrolysis reaction time showed the lowest yield, at 74.47% and 43.14%, respectively.

HPLC analysis was also conducted to investigate the purity of each of the products (see, Table 6). 1440 min hydrolysis reaction time showed the highest purity, whilst 10 min hydrolysis reaction time showed the lowest purity, 99.30±0.07% and 67.61±0.10%, respectively.

TABLE 6

The yield and purity of synthesised cholecalciferol phosphate disodium salt for varying hydrolysis reaction times. The purity was determined via HPLC:Kinetex biphenyl column, 50 µL injection volume, flow rate 1 mL/min, and 265 nm UV detection wavelengths, mobile phase; 90% MeOH, 10% water (PBS, pH 3.2).

| Hydrolysis reaction time (min) | Yield of cholecalciferol phosphate disodium salt | Purity of cholecalciferol phosphate disodium salt |
|---|---|---|
| 10 | 0.3430 g (0.674 mmol) 43.14% | 67.61 ± 0.10% |
| 30 | 0.5882 g (1.2.4.156 mmol) 73.98% | 89.87 ± 0.05% |

TABLE 6-continued

The yield and purity of synthesised cholecalciferol phosphate disodium salt for varying hydrolysis reaction times. The purity was determined via HPLC:Kinetex biphenyl column, 50 μL injection volume, flow rate 1 mL/min, and 265 nm UV detection wavelengths, mobile phase; 90% MeOH, 10% water (PBS, pH 3.2).

| Hydrolysis reaction time (min) | Yield of cholecalciferol phosphate disodium salt | Purity of cholecalciferol phosphate disodium salt |
|---|---|---|
| 60 | 0.5921g (1.164 mmol) 74.47% | 93.78 ± 0.28% |
| 90 | 0.3473 g (0.683 mmol) 43.68% | 98.85 ± 0.06% |
| 1440 | 0.5540 g (1.089 mmol) 69.68% | 99.30 ± 0.07% |

Example 7—Optimisation of Volume of Water for Hydrolysis Reaction

Method

Cholecalciferol (1.50 g, 3.90 mmol) in anhydrous THF (25 mL) with triethylamine (1.63 mL, 11.7 mmol, 3 eq) was added to the solution of the $POCl_3$ (0.510 mL, 5.46 mmol, 1,4 eq) in anhydrous THE (15 mL) under nitrogen, stirring, at room temperature. This reaction stirred for 2.5 h. The main reaction by-product, solid white triethylamine hydrochloride powder, was removed by suction filtration. Distilled water (140 mL) was added to the reaction mixture and it was stirred for 1 h. The mixture was extracted with hexane and the organic layer was dried over by anhydrous $MgSO_4$. A yellow oil obtained by a rotary evaporator was dissolved in THF (15 mL), and 3 M NaOH (5 mL), stirring for a few minutes. Absolute ethanol was added to the aqueous layer under heat, resulting in white/yellow precipitate of the title product as the disodium salt.

Results

The yield and purity of the synthesised product was compared to the synthesised product displayed in Table 6 after a hydrolysis time of 1440 min. As can be seen in Table 7 below, increasing the volume of water to 140 mL per 1.5 g cholecalciferol for the hydrolysis reaction provided a lower yield of cholecalciferol phosphate (33.14%). Furthermore, HPLC demonstrated that the final product was of lower purity (92.92±0.05%) compared to the methods used in Examples 1 and 6, which used 7 mL water per 1.5 g cholecalciferol for the hydrolysis and had a purity of 99.30±0.07%. Accordingly, the volume of water in the hydrolysis reaction is critical.

TABLE 7

The yield and purity of synthesised cholecalciferol phosphate disodium salt for varying volumes of water in the hydrolysis reaction. The purity was determined via HPLC:Kinetex biphenyl column, 50 μL injection volume, flow rate 1 mL/min, and 265 nm UV detection wavelengths, mobile phase; 90% MeOH, 10% water (PBS, pH 3.2).

| Volume of water in hydrolysis reaction (mL) | % m/v cholecalciferol (g)/water (mL) | Yield of cholecalciferol phosphate disodium salt | Purity of cholecalciferol phosphate disodium salt |
|---|---|---|---|
| 140 | 1.1% | 0.6606 g (1.299 mmol) 33.14% | 92.92 ± 0.05% |
| 7 | 21.4% | 0.5540 g (1.089 mmol) 69.68% | 99.30 ± 0.07% |

Example 8—Further Studies

Skin Metabolism Study

To assess the metabolism of a compound of the invention in the skin, a compound of the invention could be applied to human skin and/or human cell lines to monitor the local tissue metabolism of said compound. In particular, the common metabolites including cholecalciferol and its active form calcitriol could be monitored over time using this method.

In Vivo Pharmacokinetic Study

To assess the pharmacokinetic properties of a compound of the invention following topical administration could be assessed by applying transdermal patches comprising a compound of the invention to the skin of rats and measuring the metabolites that appear in the tissue and the blood. This could be compared with the topical application of a patch comprising cholecalciferol.

COMPARATIVE EXAMPLES

The following examples are comparative examples, which are failed attempts of the synthesis of cholecalciferol phosphate.

Comparative Example 1

Step 1

Cholecalciferol was reacted with $POCl_3$ (3 eq of VD), $NEt_3$ (3 eq of VD), anhydrous THE and stirred at room temperature under nitrogen for 4 h. The side product, which was solid white triethylamine hydrochloride powder, was removed by suction filtration.

Step 2

The distilled water (200 mL) was added, and it was stirred for 24 h at RT. Hexane (150 mL) was added to generate a two-phase system. In case of generating a three-phase layer, absolute ethanol (25 mL) was added. The aqueous layer was freeze-dried for at least 24 h. No solid product was obtained.

Comparative Example 2

Step 1

Cholecalciferol was reacted with $POCl_3$ (3 eq of VD), $NEt_3$ (3 eq of VD), anhydrous THF and stirred at room temperature under nitrogen for 2.5 h. The side product, which was solid white triethylamine hydrochloride powder, was removed by suction filtration.

Step 2

The distilled water (200 mL) was added, and it was stirred for 24 h at RT. Hexane (150 mL) was added to generate a two-phase system. In case of generating a three-phase layer, absolute ethanol (25 mL) was added. The aqueous layer was freeze-dried for at least 24 h. No solid product was obtained.

Comparative Example 3

Step 1

Cholecalciferol was reacted with $POCl_3$ (3 eq of VD), $NEt_3$ (3 eq of VD), anhydrous THF and stirred at room temperature under nitrogen for 4 h. The side product, which was solid white triethylamine hydrochloride powder, was removed by suction filtration.

Step 2

The distilled water (200 mL) was added, and it was stirred for 40 h at RT. Hexane (150 mL) was added to generate a two-phase system. The aqueous layer was freeze-dried for at least 24 h. No solid product was obtained.

Comparative Example 4

Step 1

Cholecalciferol was reacted with $POCl_3$ (1.12 eq of VD), $NEt_3$ (3 eq of VD), anhydrous THE and stirred at room temperature under nitrogen for 4 h. The side product, which was solid white triethylamine hydrochloride powder, was removed by suction filtration.

Step 2

The distilled water (200 mL) was added, and it was stirred for 24 h at RT. Hexane (150 mL) was added to generate a two-phase system. The aqueous layer was freeze-dried for at least 24 h. No solid product was obtained.

Comparative Example 5

Step 1

Cholecalciferol was reacted with $POCl_3$ (3 eq of VD), $NEt_3$ (3 eq of VD), anhydrous THF and stirred at room temperature under nitrogen for 8 d. The side product, which was solid white triethylamine hydrochloride powder, was removed by suction filtration.

Step 2

The distilled water (200 mL) was added, and it was stirred for 24 h at RT. Hexane (150 mL) was added to generate a two-phase system. The aqueous layer was freeze-dried for at least 24 h. No solid product was obtained.

Comparative Example 6

Step 1

Cholecalciferol was reacted with $POCl_3$ (3 eq of VD), $NEt_3$ (3 eq of VD), anhydrous THF and stirred at room temperature under nitrogen for 4 h. The side product, which was solid white triethylamine hydrochloride powder, was removed by suction filtration.

Step 2

The distilled water (200 mL) was added, and it was stirred for 24 h at 4° C. Hexane (150 mL) was added to generate a two-phase system. The aqueous layer was freeze-dried for at least 24 h. No solid product was obtained.

Comparative Example 7

Step 1

Cholecalciferol was weighed out in the flask and closed by rubber stoppers. Nitrogen was poured into the flask. VD reacted with $POCl_3$ (3 eq of VD), $NEt_3$ (3 eq of VD), anhydrous THF and stirred at room temperature under nitrogen for 4 h. The side product, which was solid white triethylamine hydrochloride powder, was removed by suction filtration.

Step 2

The distilled water (200 mL) was added, and it was stirred for 24 h at RT. Hexane (150 mL) was added to generate a two-phase system. The aqueous layer was freeze-dried for at least 24 h. No solid product was obtained.

Comparative Example 8

Step 1

Cholecalciferol was weighed out in the flask and closed by rubber stoppers. Nitrogen was poured into the flask. VD reacted with $POCl_3$ (3 eq of VD), $NEt_3$ (3 eq of VD), anhydrous THF and stirred at room temperature under nitrogen for 4 h. The side product, which was solid white triethylamine hydrochloride powder, was removed by suction filtration.

Step 2

The distilled water (200 mL) was added, and it was stirred for 24 h at 4° C. Hexane (150 mL) was added to generate a two-phase system. The aqueous layer was freeze-dried for at least 24 h. No solid product was obtained.

Comparative Example 9

Step 1

Cholecalciferol was weighed out in the flask and closed by rubber stoppers. Nitrogen was poured into the flask. VD reacted with $POCl_3$ (3 eq of VD), $NEt_3$ (3 eq of VD), anhydrous THF and stirred at room temperature under nitrogen for 48 h. The side product, which was solid white triethylamine hydrochloride powder, was removed by suction filtration.

Step 2

The distilled water (200 mL) was added, and it was stirred for 24 h at 4° C. Hexane (150 mL) was added to generate a two-phase system. The aqueous layer was freeze-dried for at least 24 h. No solid product was obtained.

Comparative Example 10

This method follows the procedure described in CN-107674091.

Method $POCl_3$ (67.07 µL, 0.717 mmol, 0.084 eq) was added into cholecalciferol (3.3 g, 8.579 mmol) in DCM (25 mL) with triethylamine (0.15 mL, 1.076 mmol, 0.125 eq) stirring in a beaker with ice. This reaction was allowed to stir for 5 h. The solution was evaporated under reduced pressure to obtain dichloro-vitamin D phosphate ester. Distilled water (10 mL) was added to the dichloro-vitamin D phosphate ester and it was stirred for 8 h at 50-60° C. under reflux. Acetic acid was added, and the solution was extracted with ethyl acetate, and the organic layer was washed with saturated sodium bicarbonate, water, and 1 mol/L saline solution, and dried over by anhydrous sodium sulphate overnight. The solution was evaporated under reduced pressure, the residue was analysed by NMR and LC/MS. Silica gel column chromatography consisted of ethyl acetate:hexane (2:1) was conducted to obtain cholecalciferol phosphate. The final product was analysed by NMR and LC/MS.

Results

The above synthesis produced an orange powder after purification by column chromatography. To characterise the compounds obtained by this method, NMR analysis and mass spectrometry by direct infusion in negative ion mode were conducted.

When analysed by phosphorus NMR, no phosphorus signal was detected for both products obtained by this method. This confirms that there was no phosphorus group present in the structure.

Figure 14A:
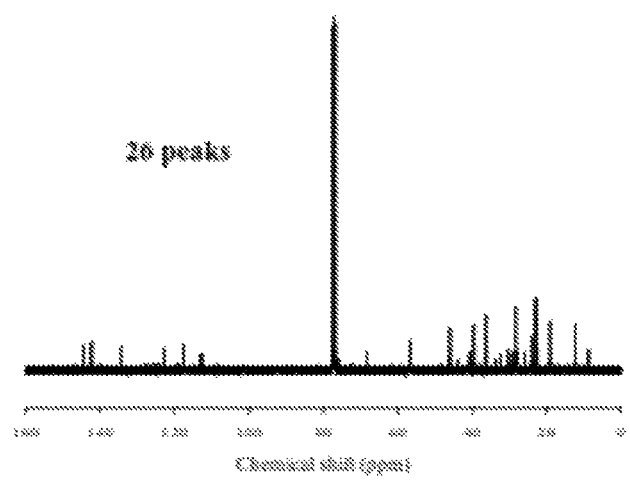
FIGS. 14A, 14B and 14C—Carbon NMR spectra of (FIG. 14A) cholecalciferol phosphate, (FIG. 14B) the product obtained by the method described in Comparative Example 10 after the hydrolysis reaction, and (FIG. 14C) the final product obtained by the method described in Comparative Example 10. The sample (20 mg) was dissolved in deuterated chloroform.
Figure 14B:
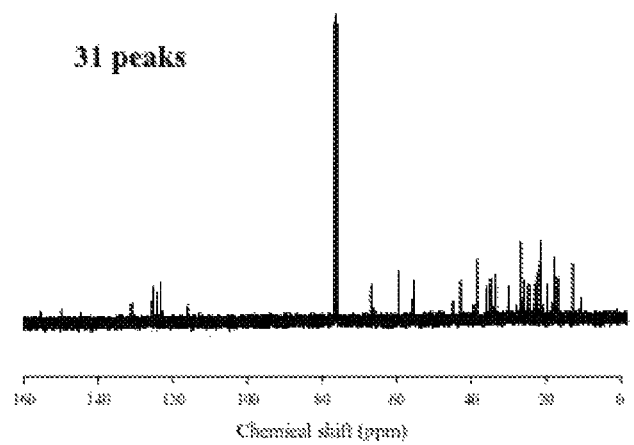
Figure 14C:
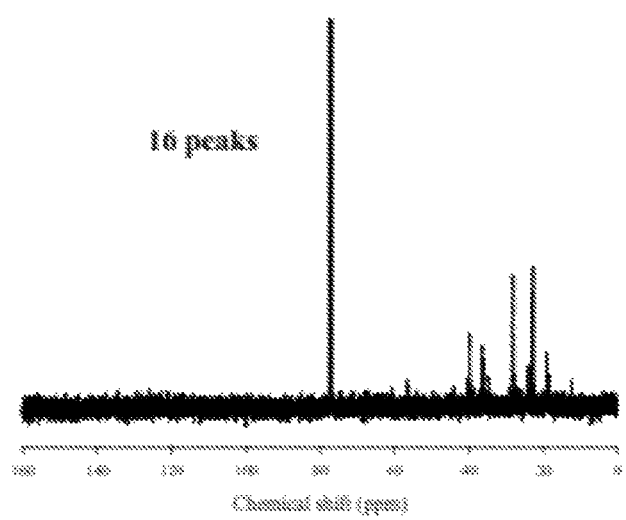

The carbon NMR displayed 31 peaks for the product isolated after the hydrolysis reaction (FIG. 14B), and only 16 peaks for the final product after purification (FIG. 14C).

Neither of these spectra matched the cholecalciferol phosphate carbon spectra which has 26 peaks (see, FIG. 14A). In the proton NMR, neither of the products synthesised by this method displayed the appropriate hydrogen peaks where the protons next to the phosphorus group in cholecalciferol phosphate should appear. The mass spectrometry analysis did not show a peak at m/z 463, which is the mass of cholecalciferol phosphate. Furthermore, HPLC analysis of the final product did not show a peak at the retention time of 12.87 min, as expected for cholecalciferol phosphate.

Together, these data demonstrate that cholecalciferol phosphate is not generated by this method.

Comparative Example 11

Synthesis of cholecalciferol phosphate using Schotten-Baumann conditions as described in EP 0603726 A2 and U.S. Pat. No. 5,478,816.
Method $POCl_3$ (10.21 µL, 0.109 mmol, 0.084 eq) was added into cholecalciferol (0.5 g, 1.2999 mmol) in DCM (10 mL) with 32.4 mM NaOH solution (5 mL, 0.162 mmol, 0.125 eq) stirring in a beaker with ice. This reaction was allowed to stir overnight. After taking off the aqueous layer, the solvent was evaporated under reduced pressure to obtain dichloro-vitamin D phosphate ester. The residue was analysed by NMR and LC/MS. Distilled water (1.5 mL) and THF (25 mL) were added to the dichloro-vitamin D phosphate ester and it was stirred for 24 h. The solution was extracted with hexane, and the organic layer was evaporated under reduced pressure. The residue was analysed by NMR and LC/MS.
Results The above synthesis produced a white powder. To characterise the compounds obtained by this method, NMR analysis and mass spectrometry by direct infusion in negative ion mode were conducted.

Two compounds were isolated from the above synthesis for analysis. The first compound was isolated after the first reaction (where dichloro-vitamin D phosphate ester should be obtained), and the second compound was the final product obtained from the synthesis. Both of these compounds displayed a singlet phosphorus peak at approximately 1.40 ppm. In contrast, the synthesised cholecalciferol phosphate showed one split peak at approximately 0.40 ppm which indicated that the monomeric form of the cholecalciferol phosphate was formed, and no bis-cholecalciferol phosphate was present.

Figure 15A:
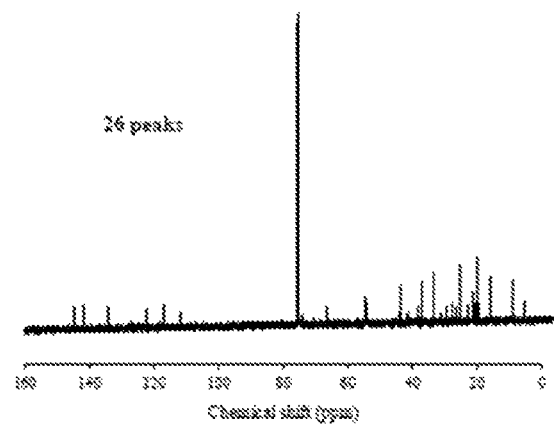
FIGS. 15A, 15B and 15C—Carbon NMR spectra of (FIG. 15A) cholecalciferol phosphate, (FIG. 15B) the product obtained by the method described in Comparative Example 11 after the hydrolysis reaction, and (FIG. 15C) the final product obtained by the method described in Comparative Example 11. The sample (20 mg) was dissolved in deuterated chloroform (600 μL).
Figure 15B:
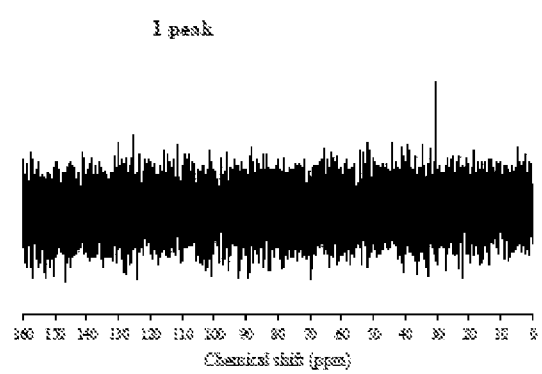
Figure 15C:
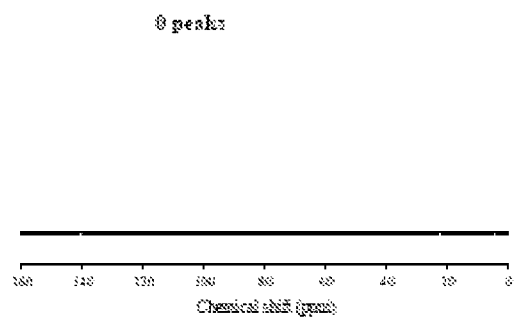

In the carbon NMR, the product obtained after the first reaction showed only 1 peak (FIG. 15B) and the final product did not generate any peaks (FIG. 15C). Cholecalciferol phosphate on the other hand should maintain the cholecalciferol chemical backbone and thus should have the same 26 peaks as cholecalciferol (FIG. 15A). The data indicated that the cholecalciferol backbone structure was degraded during the above synthetic process. The proton NMR spectra for the compound isolated after the first reaction and the final product also displayed a significant reduction in peaks compared to the cholecalciferol starting material. The mass spectrometry analysis did not show a peak at m/z 463 for either the compound isolated after the first reaction nor the final product. Furthermore, HPLC analysis of the final product did not show a peak at a retention time of 12.87 min, which is the expected retention time of cholecalciferol phosphate. Together these data demonstrated that cholecalciferol phosphate was not generated by the Schotten-Baumann conditions.

Comparative Example 12

Synthesis of cholecalciferol phosphate using Einhorn conditions as described in EP 0603726 A2 and U.S. Pat. No. 5,478,816.
Method $POCl_3$ (10.21 µL, 0.109 mmol, 0.084 eq) was added into cholecalciferol (0.5 g, 1.2999 mmol) in DCM (3.79 mL) with pyridine (13.05 µL, 0.162 mmol, 0.125 eq) stirring in a beaker with ice. This reaction was allowed to stir overnight. The solution was evaporated under reduced pressure to obtain dichloro-vitamin D phosphate ester. The residue was analysed by NMR, LC/MS. Distilled water (1.5 mL) and THF (25 mL) were added to the dichloro-vitamin D phosphate ester and it was stirred for 24 h. The solution was extracted with hexane, and the organic layer was evaporated under reduced pressure. The residue was analysed by NMR, LC/MS.
Results The above synthesis produced a brown oil. To characterise the compound structure, NMR analysis and mass spectrometry by direct infusion in negative ion mode were performed.

Figure 16A:
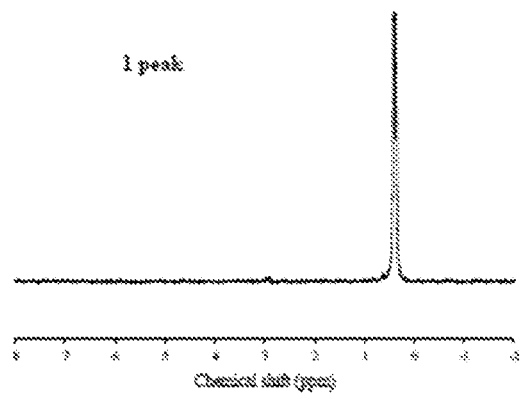
FIGS. 16A, 16B and 16C—Phosphorus NMR spectra of (FIG. 16A) cholecalciferol phosphate, (FIG. 16B) the product obtained by the method described in Comparative Example 12 after the hydrolysis reaction, and (FIG. 16C) the final product obtained by the method described in Comparative Example 12. The sample (20 mg) was dissolved in deuterated chloroform (600 μL).
Figure 16B:
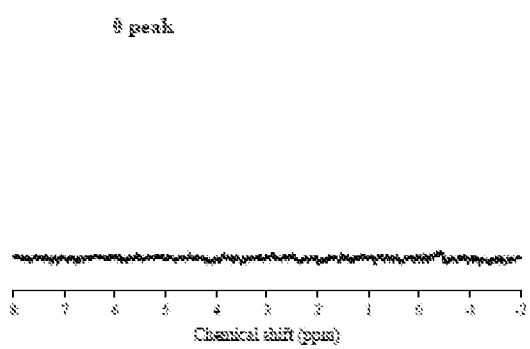
Figure 16C:
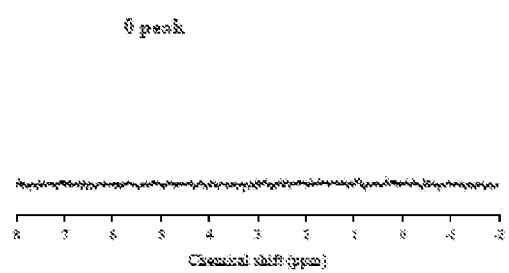

Two compounds were isolated from the above synthesis for analysis. The first compound was isolated after the first reaction (when dichloro-vitamin D phosphate should be obtained), and the second compound was the final product obtained from the synthesis. Both the product obtained after the first reaction (FIG. 16B) and the final product (FIG. 16C) showed no peaks in the phosphorus NMR. In the carbon NMR, the product obtained after the first reaction and the final product displayed 27 peaks and 25 peaks, respectively. However, the positions for 15 peaks of both products did not match the chemical shifts of the carbon NMR spectra of the starting material cholecalciferol or cholecalciferol phosphate, which suggested that the carbon backbone of the cholecalciferol had been modified by the reaction in an undesirable manner. In the proton NMR, the protons present near the phosphorus for both products obtained from this method were different from the corresponding protons in cholecalciferol phosphate acid. This suggested that the phosphorylation at the desired location had not occurred. Mass spectrometry showed a small peak at m/z 463 for both Einhorn condition products. However, as the carbon backbone had been modified in the synthesis, and the proton NMR and the phosphorus NMR did not show phosphorylation, the peak present at m/z 463 was not thought to be cholecalciferol phosphate. HPLC analysis of the final product did not show a peak at the retention time of 12.87 min which is assigned to cholecalciferol phosphate. Together, these data demonstrate that cholecalciferol phosphate is not generated under Einhorn conditions.

Comparative Example 13

Synthesis of cholecalciferol phosphate using phosphoric acid as a dehydrating agent as described in EP 0603726 A2 and U.S. Pat. No. 5,478,816.

Method

Cholecalciferol (0.5 g, 1.2999 mmol) dissolved in ethyl acetate (2 mL) was added into phosphoric acid (67.76 µL, 1.2999 mmol, 1 eq) in ethyl acetate (3.79 mL) with dicyclohexylcarbodiimide (203.19 µL, 1.2999 mmol, 1 eq) stirring in a beaker with ice. This reaction was allowed to stir overnight. The precipitated dicyclohexyl urea was removed by filtration. The solvent was evaporated under reduced pressure to obtain the dichloro-vitamin D phosphate ester. The residue was analysed by NMR and LC/MS.

Results

The synthesis of cholecalciferol phosphate was conducted using a dehydration agent. It generated a dark brown product. To characterise the compound structure, NMR analysis and mass spectrometry by direct infusion in negative ion mode were performed.

Figure 17A:
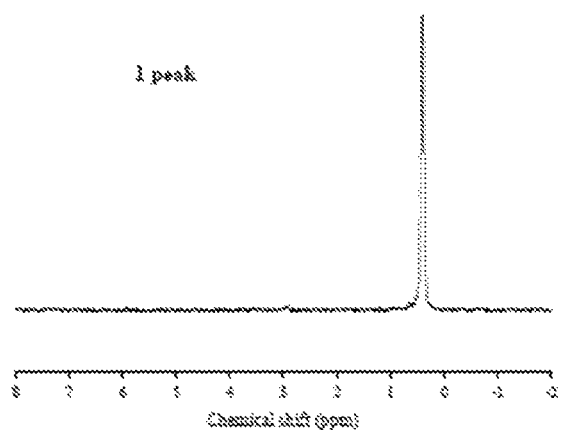
FIGS. 17A and 17B—Phosphorus NMR spectra of (FIG. 17A) cholecalciferol phosphate, and (FIG. 17B) the final product obtained by the method described in Comparative Example 13. The sample (20 mg) was dissolved in deuterated chloroform (600 μL).
Figure 17B:
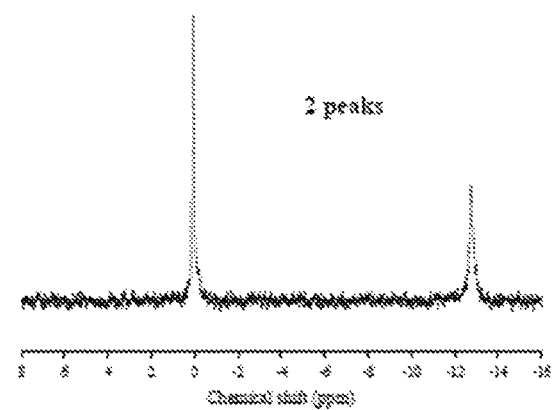

The final product obtained for the above synthesis using the dehydration agent showed 2 phosphorus peaks in phosphorus NMR (FIG. 17B), compared to 1 peak for the synthesis cholecalciferol phosphate of the claimed invention (FIG. 17A). This suggests that the phosphate product had not been formed. In the carbon NMR, the final product obtained 32 peaks, but 4 peaks were identified to be from ethyl acetate (14.32, 21.17, 60.54, 171.31 ppm) and the remaining peaks were assigned to the starting material cholecalciferol carbon backbone which did not appear to be degraded. In the proton NMR, the proton close to the proposed sited of phosphorus addition was the same as the starting material cholecalciferol, suggesting that no phosphorylation had occurred. In the mass spectrometry analysis, there was a very small peak at m/z 463. However, in light of the NMR data discussed above, this peak was not thought to be the cholecalciferol phosphate. Furthermore, HPLC analysis of the final product showed a strong peak, but this peak did not have the retention time of 12.87 min which was expected for cholecalciferol phosphate. Together these data demonstrated that cholecalciferol phosphate was not generated by the dehydrating agent conditions.

The invention claimed is:

1. A compound of the formula (I):

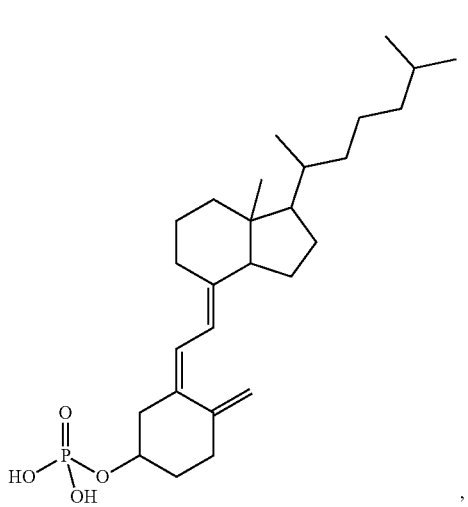

(I)

or a pharmaceutically acceptable salt thereof, wherein the compound is more than 80% pure.

2. The compound of claim 1, wherein the compound is of the formula (IA):

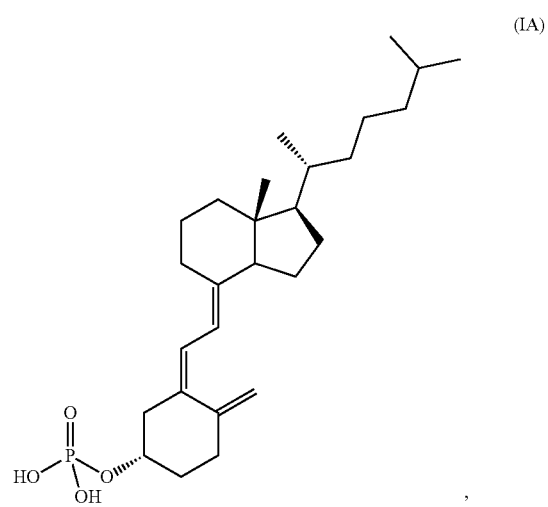

(IA)

or a pharmaceutically acceptable salt thereof.

3. The compound according to claim 2, wherein the compound is in the free acid form.

4. The compound according to claim 2, wherein the compound is in the form of a pharmaceutically acceptable salt.

5. A compound of the formula (I):

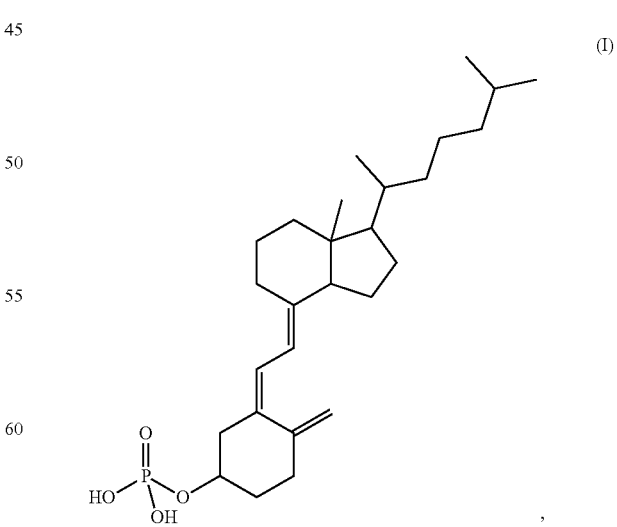

(I)

wherein the compound is in the form of a di-sodium salt the compound is more than 80% pure.

6. A compound of formula (IA):
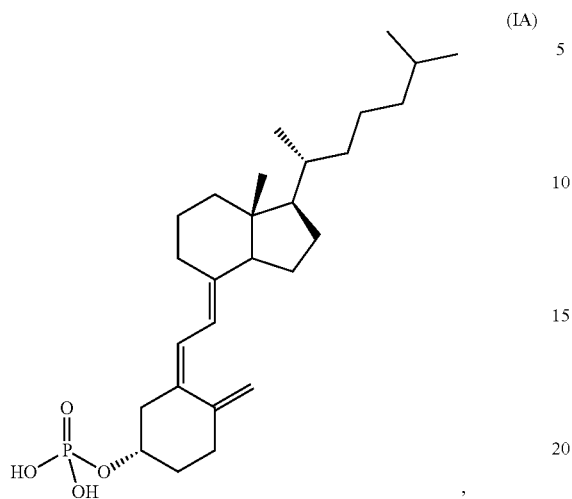
wherein the compound is in the form of a di-sodium salt the compound is more than 80% pure.